(12) United States Patent
Kang et al.

(10) Patent No.: US 10,848,758 B2
(45) Date of Patent: Nov. 24, 2020

(54) IMAGE ENCODING/DECODING IMAGE METHOD AND DEVICE, AND RECORDING MEDIUM STORING BIT STREAM

(71) Applicants: Electronics and Telecommunications Research Institute, Daejeon (KR); University-Industry Cooperation Group of Kyung Hee University, Yongin-si (KR)

(72) Inventors: Jung Won Kang, Daejeon (KR); Hyun Suk Ko, Daejeon (KR); Sung Chang Lim, Daejeon (KR); Jin Ho Lee, Daejeon (KR); Ha Hyun Lee, Seoul (KR); Dong San Jun, Daejeon (KR); Seung Hyun Cho, Daejeon (KR); Hui Yong Kim, Daejeon (KR); Jin Soo Choi, Daejeon (KR); Gwang Hoon Park, Seongnam-si (KR); Tae Hyun Kim, Hwaseong-si (KR); Dae Young Lee, Ansan-si (KR)

(73) Assignees: Electronics and Telecommunications Research Institute, Daejeon (KR); University-Industry Cooperation Group of Kyung Hee University, Yongin-si (KR)

( * ) Notice: Subject to any disclaimer, the term of this patent is extended or adjusted under 35 U.S.C. 154(b) by 0 days.

(21) Appl. No.: 16/348,522

(22) PCT Filed: Nov. 22, 2017

(86) PCT No.: PCT/KR2017/013377
§ 371 (c)(1),
(2) Date: May 9, 2019

(87) PCT Pub. No.: WO2018/097607
PCT Pub. Date: May 31, 2018

(65) Prior Publication Data
US 2020/0059642 A1 Feb. 20, 2020

(30) Foreign Application Priority Data

Nov. 22, 2016 (KR) ........................ 10-2016-0155814
Nov. 22, 2016 (KR) ........................ 10-2016-0155815

(51) Int. Cl.
*H04N 11/02* (2006.01)
*H04N 19/105* (2014.01)
(Continued)

(52) U.S. Cl.
CPC ......... *H04N 19/105* (2014.11); *H04N 19/117* (2014.11); *H04N 19/132* (2014.11);
(Continued)

(58) Field of Classification Search
CPC .. H04N 19/105; H04N 19/117; H04N 19/132; H04N 19/159; H04N 19/172;
(Continued)

(56) References Cited

U.S. PATENT DOCUMENTS 8,204,120 B2  6/2012 Lim et al.
2008/0304759 A1* 12/2008 Lee ...................... H04N 19/176
382/238
(Continued)

FOREIGN PATENT DOCUMENTS

KR    10-0772576 B1    11/2007
KR    10-2009-0058954 A    6/2009
(Continued)

OTHER PUBLICATIONS

International Search Report dated Mar. 7, 2018 in counterpart International Application No. PCT/KR2017/0133277 (2 pages in English and 2 pages in Korean).

*Primary Examiner* — Howard D Brown, Jr.
(74) *Attorney, Agent, or Firm* — NSIP Law

(57) ABSTRACT

An image encoding/decoding method and apparatus are provided. An image encoding method performed by an
(Continued)

image encoding apparatus may comprise determining an intra-prediction mode of a current block, configuring a reference sample of intra prediction by using at least one of a neighbor pixel of the current block in a current picture and a pixel of a reference picture, and performing intra prediction for the current block based on the intra-prediction mode and the reference sample.

5 Claims, 44 Drawing Sheets

(51) Int. Cl.
*H04N 19/117* (2014.01)
*H04N 19/132* (2014.01)
*H04N 19/159* (2014.01)
*H04N 19/172* (2014.01)
*H04N 19/176* (2014.01)
*H04N 19/182* (2014.01)
*H04N 19/46* (2014.01)
*H04N 19/52* (2014.01)

(52) U.S. Cl.
CPC ......... *H04N 19/159* (2014.11); *H04N 19/172* (2014.11); *H04N 19/176* (2014.11); *H04N 19/182* (2014.11); *H04N 19/46* (2014.11); *H04N 19/52* (2014.11)

(58) Field of Classification Search
CPC .... H04N 19/176; H04N 19/182; H04N 19/46; H04N 19/52; H04N 19/139; H04N 19/513; H04N 19/86
See application file for complete search history.

(56) References Cited

U.S. PATENT DOCUMENTS

| | | | |
|---|---|---|---|
| 2008/0304760 A1* | 12/2008 | Lee .................. | H04N 19/57 382/238 |
| 2009/0046778 A1* | 2/2009 | Lee .................. | H04N 19/124 375/240.03 |
| 2009/0147855 A1* | 6/2009 | Song ................ | H04N 19/61 375/240.16 |
| 2009/0147856 A1* | 6/2009 | Song ................ | H04N 19/102 375/240.23 |
| 2011/0249741 A1* | 10/2011 | Zhao ................ | H04N 19/196 375/240.15 |
| 2012/0314767 A1 | 12/2012 | Wang et al. | |
| 2013/0266234 A1 | 10/2013 | Cho et al. | |
| 2016/0021382 A1 | 1/2016 | Lee et al. | |

FOREIGN PATENT DOCUMENTS

| | | |
|---|---|---|
| KR | 10-2013-0067038 A | 6/2013 |
| KR | 10-2015-0050560 A | 5/2015 |
| WO | WO 2014/051372 A1 | 4/2014 |

* cited by examiner

Current block

FIG. 8
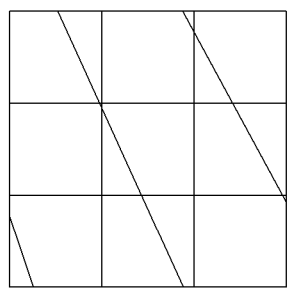
(a)
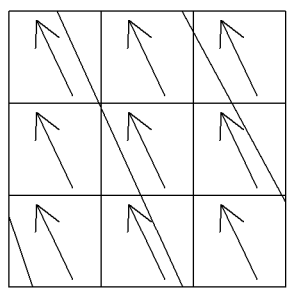
(b)
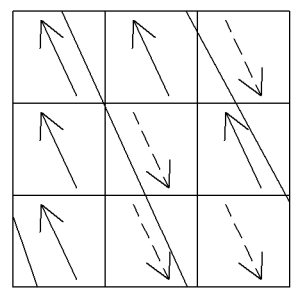
(c)

FIG. 9
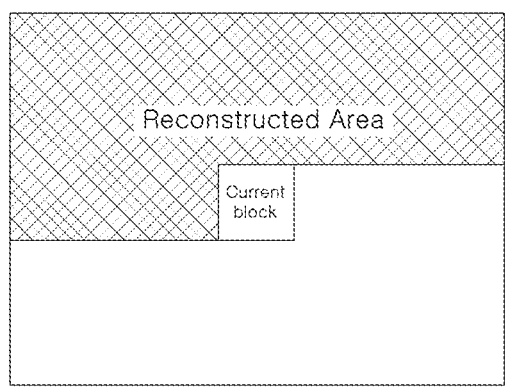
(a)
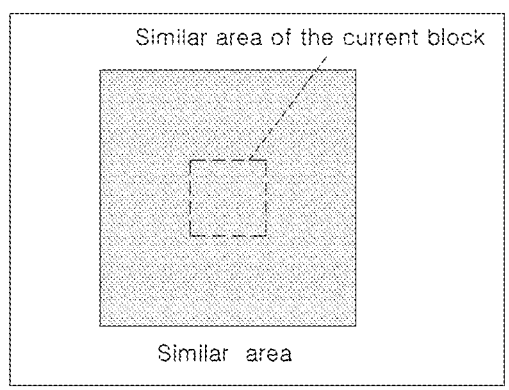
(b)

FIG. 12
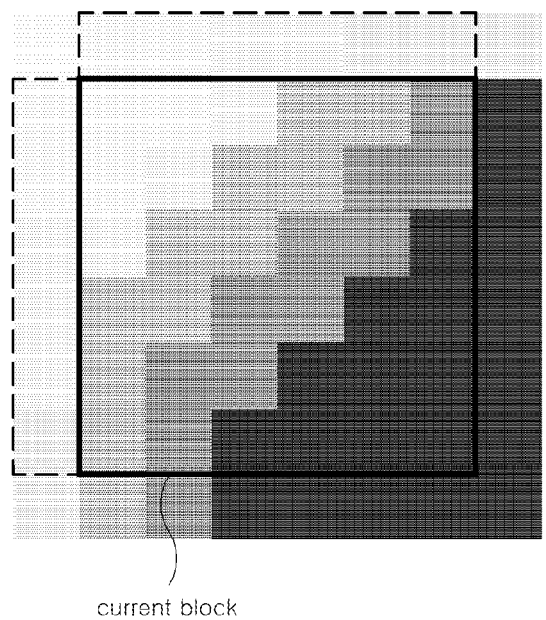
current block
(a)
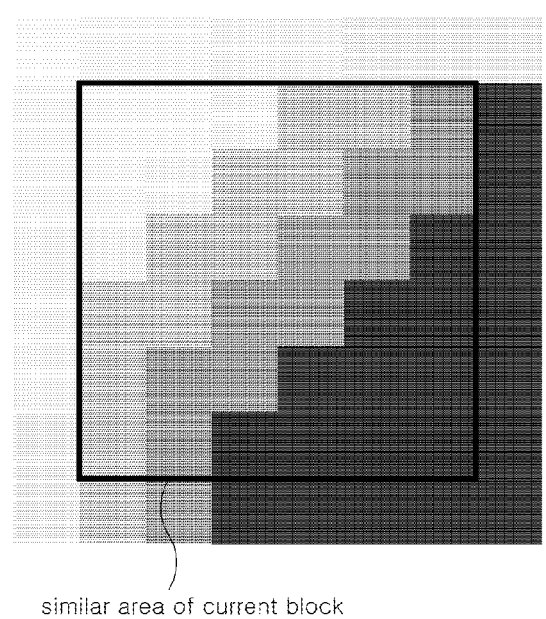
similar area of current block
(b)

FIG. 15
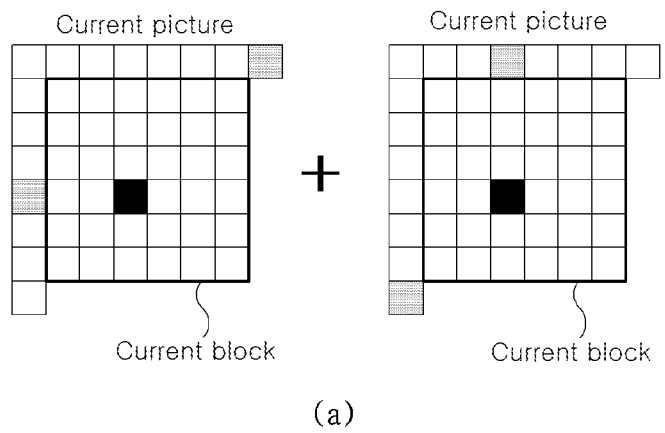
(a)
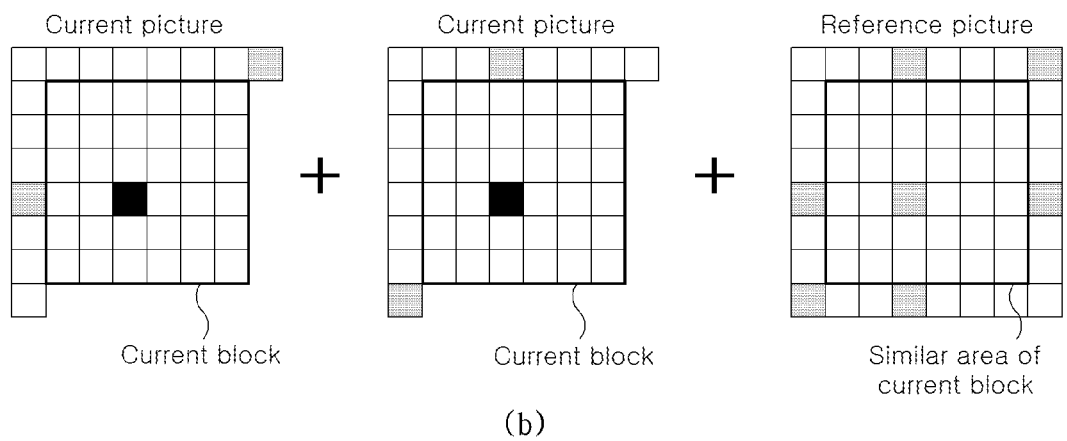
(b)
FIG. 16
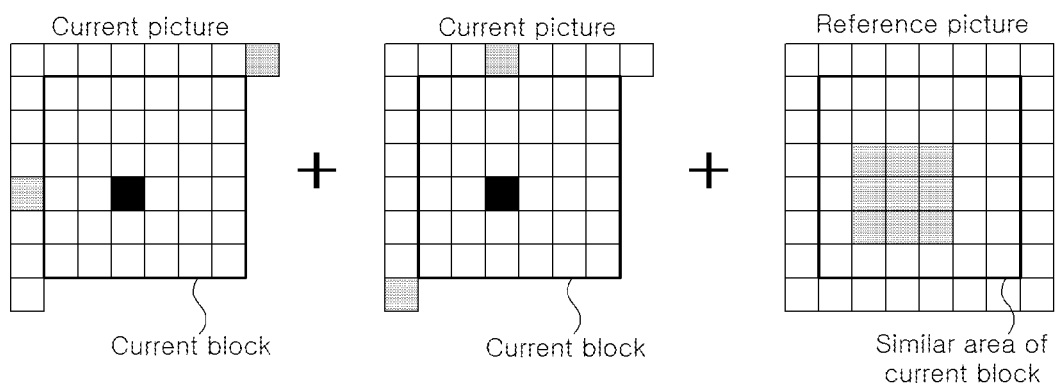

FIG. 31
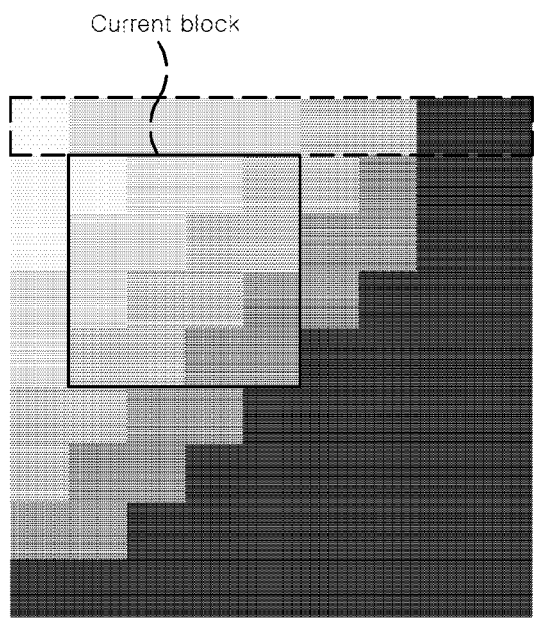
(a)
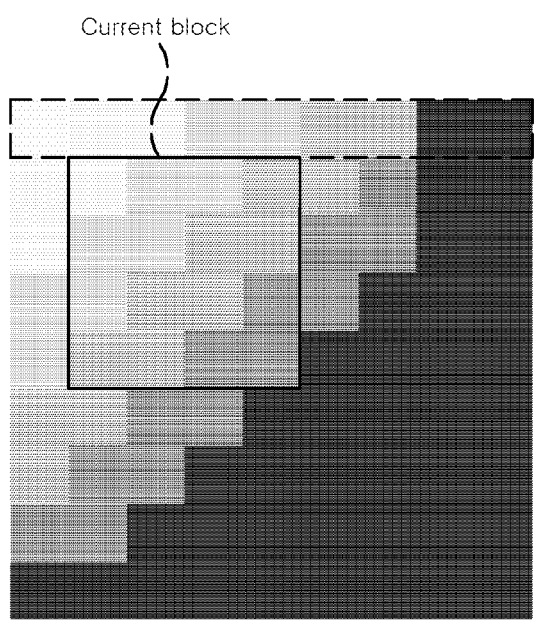
(b)

FIG. 48

$p' = Hp$ $$H = \begin{bmatrix} h_1 & h_2 & h_3 \\ h_4 & h_5 & h_6 \\ h_7 & h_8 & h_9 \end{bmatrix} \quad p = \begin{bmatrix} x \\ y \\ 1 \end{bmatrix} \quad p' = \begin{bmatrix} x' \\ y' \\ 1' \end{bmatrix}$$

$$x' = \frac{h_1 x + h_2 y + h_3}{h_7 x + h_8 y + h_9}$$

$$y' = \frac{h_4 x + h_5 y + h_6}{h_7 x + h_8 y + h_9}$$

$k_n = h_n/h_9$ $\Rightarrow$ $$x' = \frac{k_1 x + k_2 y + k_3}{k_7 x + k_8 y + 1}$$

$$y' = \frac{k_4 x + k_5 y + k_6}{k_7 x + k_8 y + 1}$$

$\Rightarrow$ $k_1 x + k_2 y + k_3 - k_7 x x' - k_8 y x' = x'$ $k_4 x + k_5 y + k_6 - k_7 x x' - k_8 y x' = y'$

FIG. 49

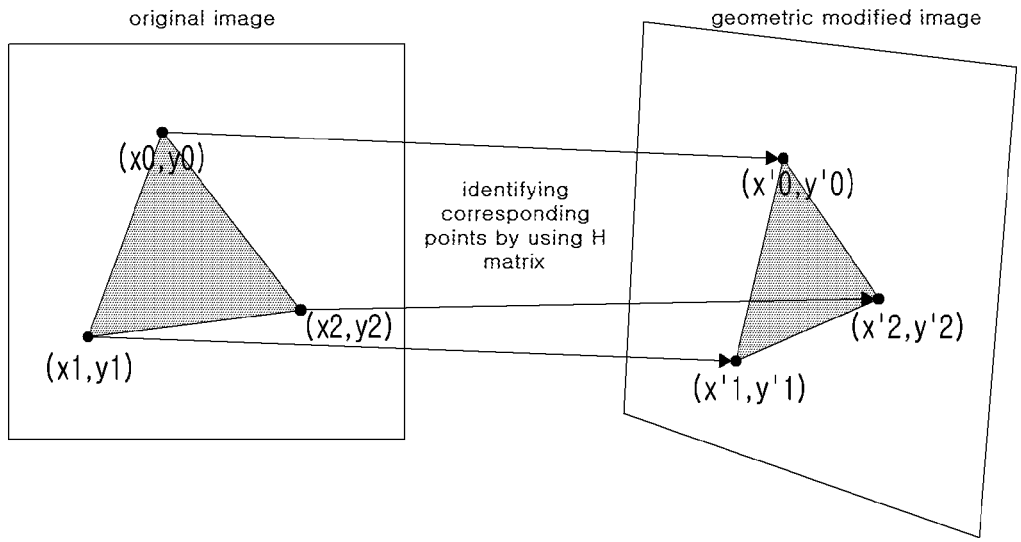

$x' = f(x, y, \alpha)$
$y' = g(x, y, \beta)$ $\Rightarrow$ $$\begin{bmatrix} x' \\ y' \\ 1 \end{bmatrix} = H \begin{bmatrix} x \\ y \\ 1 \end{bmatrix} \quad H = \begin{bmatrix} h_1 & h_2 & h_3 \\ h_4 & h_5 & h_6 \\ h_7 & h_8 & h_9 \end{bmatrix}$$

IMAGE ENCODING/DECODING IMAGE METHOD AND DEVICE, AND RECORDING MEDIUM STORING BIT STREAM

CROSS REFERENCE TO RELATED APPLICATIONS

This application is a U.S. National Stage Application of International Application No. PCT/KR2017/013377, filed on Nov. 22, 2017, which claims the benefit under 35 USC 119(a) and 365(b) of Korean Patent Application No. 10-2016-0155814, filed on Nov. 22, 2016 and Korean Patent Application No. 10-2016-0155815, filed on Nov. 22, 2016 in the Korean Intellectual Property Office, the entire disclosure of which is incorporated herein by reference for all purposes.

TECHNICAL FIELD

The present invention relates to a method and apparatus for encoding/decoding an image and a recording medium storing a bitstream. Particularly, the present invention relates to a method and apparatus for encoding/decoding an image performing intra prediction using a sample of a reference picture and a recording medium storing a bitstream generated by an image encoding method/apparatus of the present invention.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency; etc. Image data may be effectively compressed by using such image compression technology, and may be transmitted or stored.

DISCLOSURE

Technical Problem

An object of the present invention is to provide a method and apparatus for encoding and decoding an image to enhance compression efficiency.

Another object of the present invention is to provide a method and apparatus for encoding and decoding an image performing intra prediction using a sample of a reference picture.

Another object of the present invention is to provide a recording medium storing a bitstream generated by an image encoding method/apparatus of the present invention.

Technical Solution

An image encoding method performed by an image encoding apparatus according to the present invention may comprise determining an intra-prediction mode of a current block, configuring a reference sample of intra prediction by using at least one of a neighbor pixel of the current block in a current picture and a pixel of a reference picture, and performing intra prediction for the current block based on the intra-prediction mode and the reference sample.

In the image encoding method according to the present invention, the pixel of the reference picture may be a pixel included in a similar area in the reference picture of the current block.

In the image encoding method according to the present invention, the similar area in the reference picture may be specified based on similarity calculation using the current block and the reference picture.

In the image encoding method according to the present invention, the similar area in the reference picture may be an area in the reference picture having a same position as the current block.

In the image encoding method according to the present invention, the similar area in the reference picture may be specified based on prediction information of a neighbor block of the current block.

The image encoding method according to the present invention may further comprise encoding information for specifying the similar area in the reference picture.

In the image encoding method according to the present invention, the intra-prediction mode may include a directionality mode using omni-directional prediction, and a same intra-prediction mode number may be assigned to directionality modes in 180-degree opposite directions.

The image encoding method according to the present invention may further comprise encoding information on whether an intra-prediction direction is a direction indicating a right or a bottom of the current block.

In the image encoding method according to the present invention, the configuring of the reference sample may include, by using the pixel of the reference picture, padding an unavailable reference sample or filtering the configured reference sample.

An image encoding apparatus according to the present invention may comprise an intra-prediction unit which is configured to determine an intra-prediction mode of a current block, configure a reference sample of intra prediction by using at least one of a neighbor pixel of the current block in a current picture and a pixel of a reference picture, and perform intra prediction for the current block based on the intra-prediction mode and the reference sample.

An image decoding method performed by an image decoding apparatus according to the present invention may comprise decoding an intra-prediction mode of a current block, configuring a reference sample of intra prediction by using at least one of a neighbor pixel of the current block in a current picture and a pixel of a reference picture, and performing intra prediction for the current block based on the intra-prediction mode and the reference sample.

In the image decoding method according to the present invention, the pixel of the reference picture may be a pixel included in a similar area in the reference picture of the current block.

In the image decoding method according to the present invention, the similar area in the reference picture may be specified based on similarity calculation using the current block and the reference picture.

In the image decoding method according to the present invention, the similar area in the reference picture may be an area in the reference picture having a same position as the current block.

In the image decoding method according to the present invention, the similar area in the reference picture may be specified based on prediction information of a neighbor block of the current block.

The image decoding method according to the present invention may further comprise decoding information for specifying the similar area in the reference picture.

The image decoding method according to the present invention may further comprise decoding information on whether an intra-prediction direction is a direction indicating a right or a bottom of the current block when the intra-prediction mode is a directionality mode, and the intra-prediction direction may include the directionality mode using omni-directional prediction, a same intra-prediction mode number may be assigned to directionality modes in 180-degree opposite directions, and the intra-prediction mode of the current block may be decoded based on the intra-prediction mode number and the information on whether the intra-prediction direction is the direction indicating the right or the bottom of the current block.

In the image decoding method according to the present invention, the configuring of the reference sample may include, by using the pixel of the reference picture, padding an unavailable reference sample or filtering the configured reference sample.

The image decoding apparatus according to the present invention may comprise an intra-prediction unit which is configured to decode an intra-prediction mode of a current block, configure a reference sample of intra prediction by using at least one of a neighbor pixel of the current block in a current picture and a pixel of a reference picture, and perform intra prediction for the current block based on the intra-prediction mode and the reference sample.

A recording medium according to the present invention may store a bitstream generated by an image encoding method according to the present invention.

Advantageous Effects

According to the present invention, a method and apparatus for encoding and decoding an image to enhance compression efficiency may be provided.

According to the present invention, a method and apparatus for encoding and decoding an image performing intra prediction using a sample of a reference picture.

According to the present invention, a recording medium storing a bitstream generated by an image encoding method/apparatus of the present invention may be provided.

DESCRIPTION OF DRAWINGS

FIG. 8 is a view illustrating directionality of an intra-prediction mode for an area having pixel distribution with directionality.

FIG. 9 is a view illustrating a method of configuring a reference pixel for intra prediction of the current block by using the pixel of the current picture and the pixel of the reference picture.

FIG. 12 is a view illustrating Inter_DC prediction according to the present invention.

FIG. 15 is a view illustrating Inter_Planar prediction according to the present invention.

FIG. 16 is a view illustrating another embodiment of the reference pixel that may be used in Inter_Planar prediction.

FIG. 31 is a view illustrating reference sample filtering.

FIG. 48 is an example method of deriving a relational formula between two points corresponding within two images according to the present invention.

FIG. 49 is a diagram showing a method of generating a geometrically modified image based on a geometric modification matrix and an original image according to the present invention.

MODE FOR CARRYING OUT THE INVENTION

Figure 1:
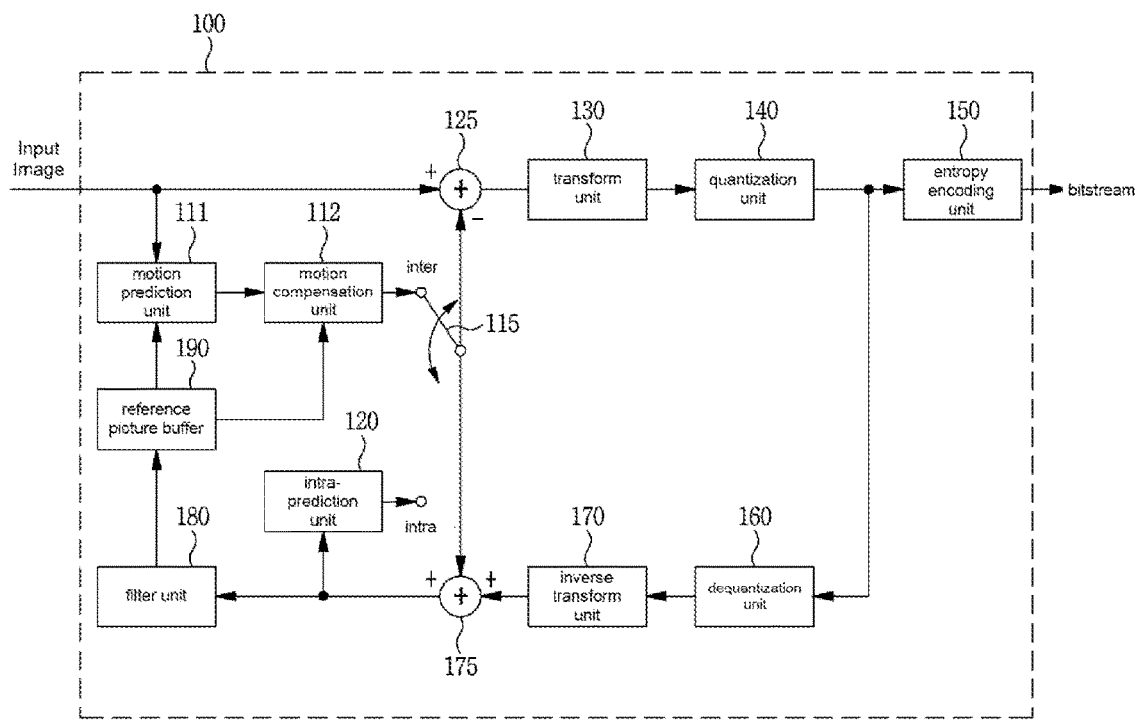
FIG. 1 is a block diagram showing configurations of an encoding apparatus according to an embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

In addition, hereinafter, an image may mean a picture configuring a video, or may mean the video itself. For example, "encoding or decoding or both of an image" may mean "encoding or decoding or both of a video", and may mean "encoding or decoding or both of one image among images of a video." Here, a picture and the image may have the same meaning.

Description of Terms

Encoder: means an apparatus performing encoding.
Decoder: means an apparatus performing decoding
Block: is an M×N array of a sample. Herein, M and N mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth ($B_d$). In the present invention, the sample may be used as a meaning of a pixel.

Unit: refers to an encoding and decoding unit. When encoding and decoding an image, the unit may be a region generated by partitioning a single image. In addition, the unit may mean a subdivided unit when a single image is partitioned into subdivided units during encoding or decoding. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a rectangular shape, a square shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method and a binary-tree partitioning method to configure a lower unit such as coding unit, prediction unit, transform unit, etc. It may be used as a term for designating a pixel block that becomes a process unit when encoding/decoding an image as an input image.

Coding Tree Block: may be used as a term for designating any one of a Y coding tree block, Cb coding tree block, and Cr coding tree block.

Neighbor Block: means a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: means a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at the same position as the current block of the current picture within a reference picture, or a neighbor block thereof.

Unit Depth: means a partitioned degree of a unit. In a tree structure, a root node may be the highest node, and a leaf node may be the lowest node. In addition, when a unit is expressed as a tree structure, a level in which a unit is present may mean a unit depth.

Bitstream: means a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, and tile header information.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Unit: means a basic unit when performing prediction such as inter-prediction, intra-prediction, inter-compensation, intra-compensation, and motion compensation. A single prediction unit may be partitioned into a plurality of partitions with a small size, or may be partitioned into a lower prediction unit.

Prediction Unit Partition: means a form obtained by partitioning a prediction unit.

Reference Picture List: means a list including one or more reference pictures used for inter-picture prediction or motion compensation. LC (List Combined), L0 (List 0), L1 (List 1), L2 (List 2), L3 (List 3) and the like are types of reference picture lists. One or more reference picture lists may be used for inter-picture prediction.

Inter-picture prediction Indicator: may mean an inter-picture prediction direction (uni-directional prediction, bi-directional prediction, and the like) of a current block. Alternatively, the inter-picture prediction indicator may mean the number of reference pictures used to generate a prediction block of a current block. Further alternatively, the inter-picture prediction indicator may mean the number of prediction blocks used to perform inter-picture prediction or motion compensation with respect to a current block.

Reference Picture Index: means an index indicating a specific reference picture in a reference picture list.

Reference Picture: may mean a picture to which a specific block refers for inter-picture prediction or motion compensation.

Motion Vector: is a two-dimensional vector used for inter-picture prediction or motion compensation and may mean an offset between a reference picture and an encoding/decoding target picture. For example, (mvX, mvY) may represent a motion vector, mvX may represent a horizontal component, and mvY may represent a vertical component.

Motion Vector Candidate: may mean a block that becomes a prediction candidate when predicting a motion vector, or a motion vector of the block. A motion vector candidate may be listed in a motion vector candidate list.

Motion Vector Candidate List: may mean a list of motion vector candidates.

Motion Vector Candidate Index: means an indicator indicating a motion vector candidate in a motion vector candidate list. It is also referred to as an index of a motion vector predictor.

Motion Information: may mean information including a motion vector, a reference picture index, an inter-picture prediction indicator, and at least any one among reference picture list information, a reference picture, a motion vector candidate, a motion vector candidate index, a merge candidate, and a merge index.

Merge Candidate List: means a list composed of merge candidates.

Merge Candidate: means a spatial merge candidate, a temporal merge candidate, a combined merge candidate, a combined bi-prediction merge candidate, a zero merge candidate, or the like. The merge candidate may have an inter-picture prediction indicator, a reference picture index for each list, and motion information such as a motion vector.

Merge Index: means information indicating a merge candidate within a merge candidate list. The merge index may indicate a block used to derive a merge candidate, among reconstructed blocks spatially and/or temporally adjacent to a current block. The merge index may indicate at least one item in the motion information possessed by a merge candidate.

Transform Unit: means a basic unit when performing encoding/decoding such as transform, inverse-transform, quantization, dequantization, transform coefficient encoding/decoding of a residual signal. A single transform unit may be partitioned into a plurality of transform units having a small size.

Scaling: means a process of multiplying a transform coefficient level by a factor. A transform coefficient may be generated by scaling a transform coefficient level. The scaling also may be referred to as dequantization.

Quantization Parameter: may mean a value used when generating a transform coefficient level of a transform coefficient during quantization. The quantization parameter also may mean a value used when generating a transform coefficient by scaling a transform coefficient level during dequantization. The quantization parameter may be a value mapped on a quantization step size.

Delta Quantization Parameter: means a difference value between a predicted quantization parameter and a quantization parameter of an encoding/decoding target unit.

Scan: means a method of sequencing coefficients within a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: means a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: means a transform coefficient having a value other than zero, or a transform coefficient level having a value other than zero.

Quantization Matrix: means a matrix used in a quantization process or a dequantization process performed to improve subjective or objective image quality. The quantization matrix also may be referred to as a scaling list.

Quantization Matrix Coefficient: means each element within a quantization matrix. The quantization matrix coefficient also may be referred to as a matrix coefficient.

Default Matrix: means a predetermined quantization matrix preliminarily defined in an encoder or a decoder.

Non-default Matrix: means a quantization matrix that is not preliminarily defined in an encoder or a decoder but is signaled by a user.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a pixel value of a block that has been already encoded/decoded and is adjacent to a current block as a reference pixel. The intra-prediction unit 120 may perform spatial prediction by using a reference pixel, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. The reference image may be stored in the reference picture buffer 190.

The motion compensation unit 112 may generate a prediction block by performing motion compensation using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a residual of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of pixel information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level, the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), an intra-prediction mode/direction, a reference sample filtering method, a prediction block filtering method, a prediction block filter tap, a prediction block filter coefficient, an inter-prediction mode, motion information, a motion vector, a reference picture index, a inter-prediction angle, an inter-prediction indicator, a reference picture list, a reference picture, a motion vector predictor candidate, a motion vector candidate list, whether to use a merge mode, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive in-loop filter, an adaptive in-loop filter coefficient, an adaptive in-loop filter tab, an adaptive in-loop filter shape/form, a binarization/inverse-binarization method, a context model determining method, a context model updating method, whether to perform a regular mode, whether to perform a bypass mode, a context bin, a bypass bin, a transform coefficient, a transform coefficient level, a transform coefficient level scanning method, an image displaying/outputting sequence, slice identification information, a slice type, slice partition information, tile identification information, a tile type, tile partition information, a picture type, a bit depth, and information of a luma signal or chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to the reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based pixels included in several rows or columns which are included in the block. When a deblocking filter is applied to a block, another filter may be applied according to a required deblocking filtering strength.

In order to compensate an encoding error, a proper offset value may be added to a pixel value by using a sample adaptive offset. The sample adaptive offset may correct an offset of a deblocked image from an original image by a pixel unit. A method of partitioning pixels of an image into a predetermined number of regions, determining a region to which an offset is applied, and applying the offset to the determined region, or a method of applying an offset in consideration of edge information on each pixel may be used.

The adaptive loop filter may perform filtering based on a comparison result of the filtered reconstructed image and the original image. Pixels included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

Figure 2:
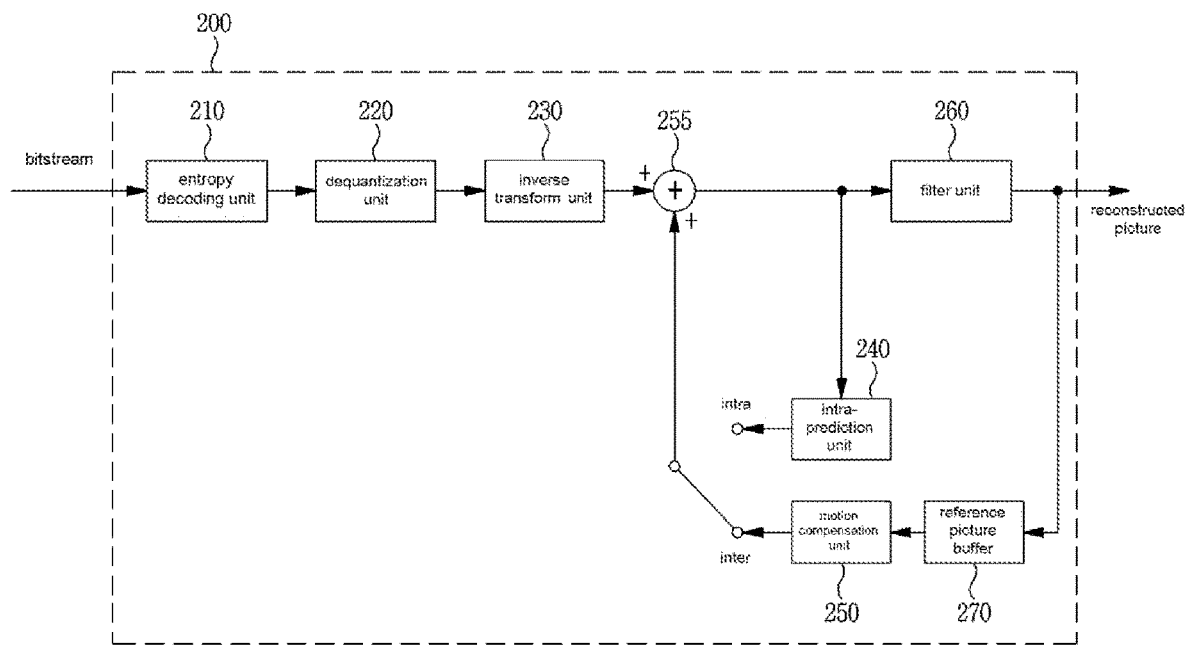
FIG. 2 is a block diagram showing configurations of a decoding apparatus according to an embodiment of the present invention.

The reconstructed block or the reconstructed image having passed through the filter unit 180 may be stored in the reference picture buffer 190. FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, a inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be a inverse-process of the entropy encoding method described above.

In order to decode a transform coefficient level, the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing spatial prediction that uses a pixel value of a block adjacent to a decoding target block and which has been already decoded.

When an inter mode is used, the motion compensation unit 250 may generate a prediction block by performing motion compensation that uses a motion vector and a reference image stored in the reference picture buffer 270. When the value of the motion vector is not an integer, the motion compensation unit 250 may generate the prediction block by applying the interpolation filter to a partial region of a reference picture. In order to perform motion compensation on a coding unit, it may be first determined that which mode among a skip mode, a merge mode, an AMVP mode, and a current picture reference mode is to be used for motion compensation of a prediction unit included in the corresponding coding unit, and the motion compensation may then be performed according to the determined mode.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction.

Figure 3:
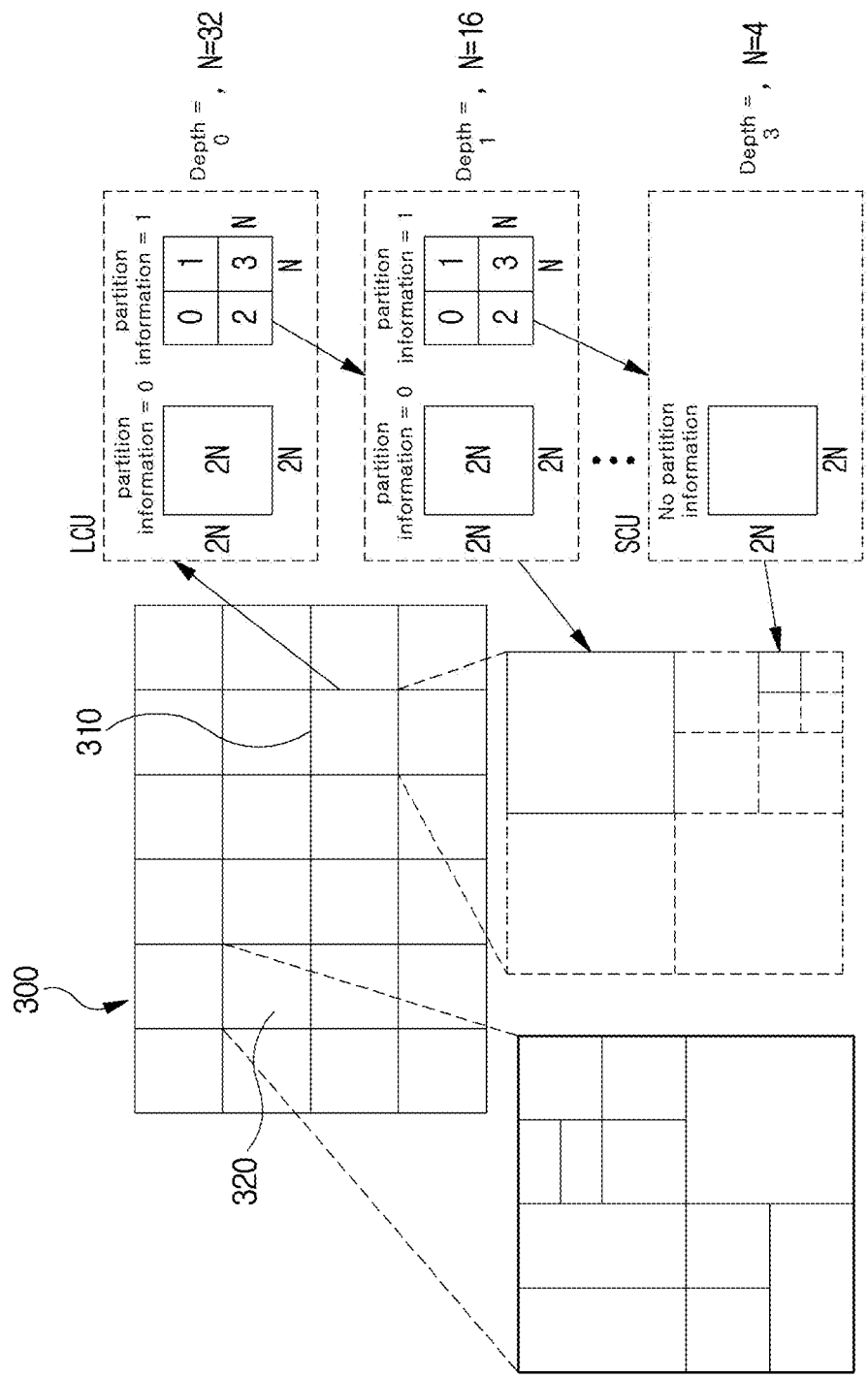
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra mode and an inter mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned in a layer associated with depth information based on a tree structure. Each of partitioned lower unit may have depth information. Depth information may be information representing a size of a CU, and may be stored in each CU.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned.

Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when a single coding unit is partitioned into two coding units, a horizontal or vertical size of the two coding units may be a half of a horizontal or vertical size of the coding unit before being partitioned. For example, when a coding unit having a 32×32 size is partitioned in a vertical direction, each of two partitioned coding units may have a size of 16×32. When a single coding unit is partitioned into two coding units, it may be called that the coding unit is partitioned in a binary-tree form. An LCU 320 of FIG. 3 is an example of an LCU to which both of partitioning of a quad-tree form and partitioning of a binary-tree form are applied.

Figure 4:
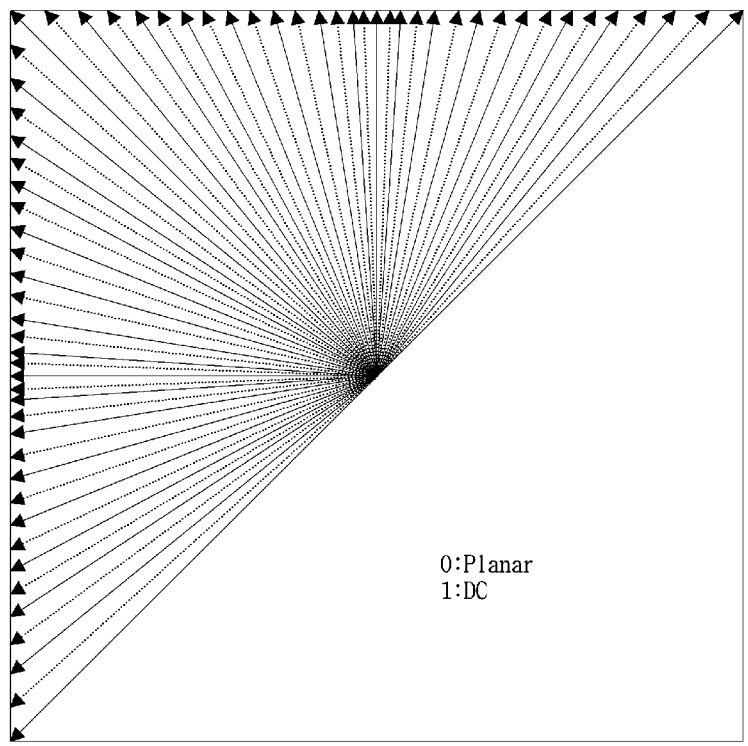
FIG. 4 is a view for explaining an embodiment of a process of intra prediction.

FIG. 4 is a view showing an intra-prediction process.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, and a mode angle. A number of intra-prediction modes may be M, which is larger than 1, including the non-angular and the angular mode.

A number of intra-prediction modes may be fixed to N regardless of a block size. Alternatively, a number of intra-prediction modes may vary according to a block size or a color component type or both. For example, as a block size becomes large, a number of intra-prediction modes may increase. Alternatively, a number of intra-prediction modes of a luma component block may be larger than a number of intra-prediction modes of a chroma component block.

In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
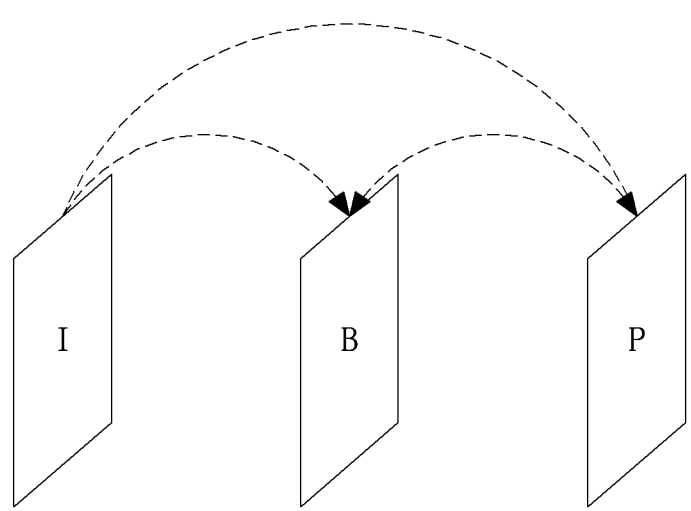
FIG. 5 is a diagram illustrating an embodiment of an inter-picture prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

A method of deriving the motion information of the current block may vary depending on a prediction mode of the current block. For example, as prediction modes for inter-picture prediction, there may be an AMVP mode, a merge mode, a skip mode, a current picture reference mode, etc. The merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least either one of the zero merge candidate and new motion information that is a combination of the motion information (spatial merge candidate) of one neighboring block adjacent to the current block, the motion information (temporal merge candidate) of the collocated block of the current block, which is included within the reference picture, and the motion information exiting in the merge candidate list.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The current picture reference mode may mean a prediction mode in which a previously reconstructed region within a current picture to which the current block belongs is used for prediction. Here, a vector may be used to specify the previously-reconstructed region. Information indicating whether the current block is to be encoded in the current picture reference mode may be encoded by using the reference picture index of the current block. The flag or index indicating whether or not the current block is a block encoded in the current picture reference mode may be signaled, and may be deduced based on the reference picture index of the current block. In the case where the current block is encoded in the current picture reference mode, the current picture may be added to the reference picture list for the current block so as to be located at a fixed position or a random position in the reference picture list. The fixed position may be, for example, a position indicated by a reference picture index of 0, or the last position in the list. When the current picture is added to the reference picture list so as to be located at the random position, the reference picture index indicating the random position may be signaled.

A decoder may perform intra prediction on the current block by referring to a pixel of an already reconstructed area (hereinafter, referred to as a "pre-reconstructed area") before a current block, which is a decoding target block. The pre-reconstructed area may be, for example, at least one of the left, upper, upper left, and upper right neighbor areas of the current block. Efficiency in intra prediction is high when similarity between the pre-reconstructed area and the current block is high. However, in prediction of the current block, even though similarity between an area not reconstructed yet (hereinafter, referred to as an "unreconstructed area") and the current block is high, the pixel of the unreconstructed area may not be referenced, and thus efficiency in intra prediction is constrained to be enhanced. The unreconstructed area may be, for example, at least one of the right, lower, lower left, and lower right neighbor areas of the current block.

As described above, when a pixel that may be referenced does not exist in the unreconstructed area, intra prediction where a pixel of the unreconstructed area is referenced is generally impossible. In the present invention, a pixel of the unreconstructed area is generated to solve the problem, and is used in performing intra prediction. According to the present invention, the pixel of the unreconstructed area may be generated using a pixel of a reference picture. That is, since a pixel of another picture (reference picture) is referenced, intra prediction according to the present invention may not have a precise meaning of intra prediction. However, in intra prediction according to the present invention, the operation other than configuration of a reference sample by using a reference picture is the same as or similar to the general operation of intra prediction.

An intra-prediction mode may include a non-directionality mode, such as a DC mode and a PLANAR mode, and a directionality mode (an angular mode). In the description, intra prediction using the pixel of the current picture is defined as Intra_DC prediction, Intra_PLANAR prediction, Intra_Angular prediction, etc., and intra prediction using the pixel of the reference picture is defined as Inter_DC prediction, Inter_PLANAR prediction, Inter_Angular prediction, etc.

Accordingly, in the description, "intra prediction" is different from intra prediction in a general sense. General intra prediction and intra prediction according to the present invention may be distinguished depending on whether the pixel of the current picture is used or the pixel of the reference picture is used in configuring a reference sample. Also, in intra prediction of the present invention, when configuring a reference sample, at least one of the pixel of current picture, the pixel of the reference picture, and the pixel of the geometric-transform reference picture may be used.

Figure 6:
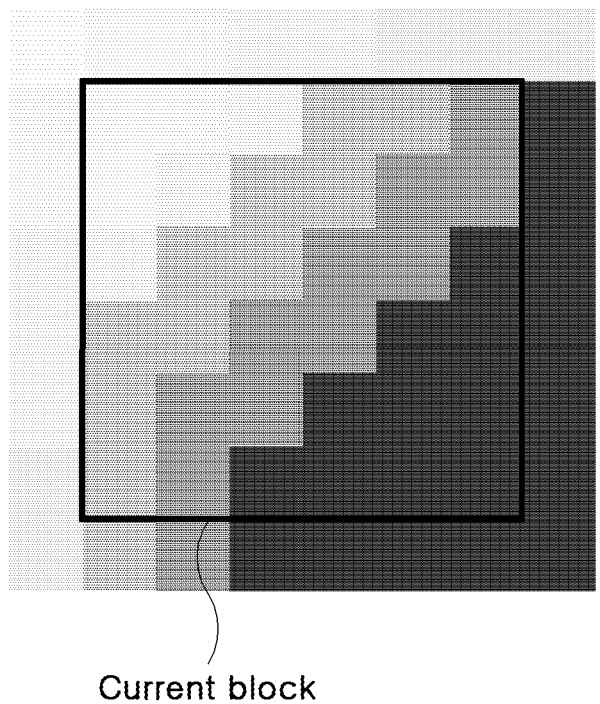
FIG. 6 is a view illustrating the case where similarity between the current block and the unreconstructed area is high.

FIG. 6 is a view illustrating the case where similarity between the current block and the unreconstructed area is high.

In the example shown in FIG. 6, similarity between the current block and the pre-reconstructed area is on average low, and similarity between the current block and the pre-reconstructed area is on average high. Therefore, intra prediction where the pixel of the pre-reconstructed area is referenced is more advantageous than intra prediction where the pixel of the unreconstructed area is referenced in terms of encoding efficiency. The present invention proposes, for example, a method of referring to the pixel of the unreconstructed area in the example shown in FIG. 6.

Figure 7:
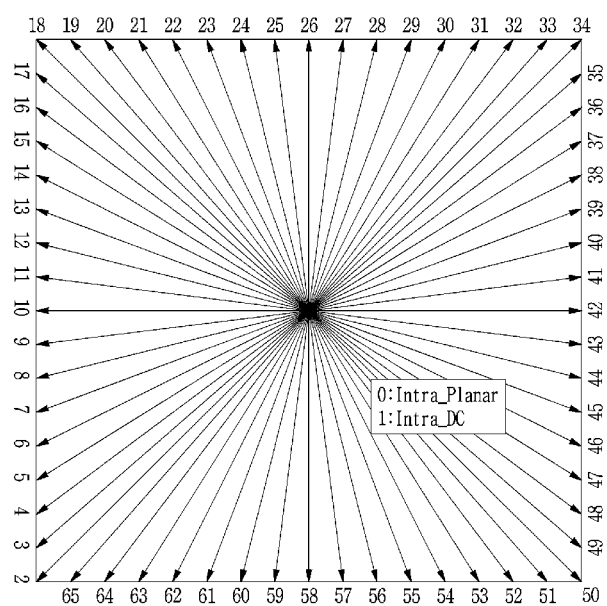
FIG. 7 is a view illustrating an intra-prediction mode according to the present invention.

FIG. 7 is a view illustrating an intra-prediction mode according to the present invention.

In the intra-prediction mode where only the pixel of the pre-reconstructed area in the current picture is referenced, as described with reference to FIG. 4, there is only a prediction direction indicating the pixel of the pre-reconstructed area in the current picture. However, in intra prediction according to the present invention, the pixel of the pre-reconstructed area as well as the pixel at a position corresponding to unreconstructed area may be referenced. Accordingly, as shown in FIG. 7, the intra-prediction mode may include a prediction mode in all directions (omni-direction).

When the intra-prediction mode of the current block indicates a position of the unreconstructed area, the unreconstructed area in the current picture may not be referenced. Therefore, the unreconstructed area may be configured using a pixel of another picture that is already reconstructed. For example, when the current picture is an inter picture, the unreconstructed area may be configured using a pixel of a reference picture. A method of configuring the unreconstructed area by using a pixel of an already reconstructed picture or a pixel of a reference picture will be described in detail later.

FIG. 8 is a view illustrating directionality of an intra-prediction mode for an area having pixel distribution with directionality.

FIG. 8(a) illustrates an example of partitioning an image area having pixel distribution with particular directionality into units of a block. In FIG. 8(a), adjacent blocks may have the same or similar directionality. FIG. 8(b) illustrates an example of directionality of the intra-prediction mode of each block in the case where only the pixel of the pre-reconstructed area is referenced. FIG. 8(c) illustrates an example of directionality of the intra-prediction mode of each block in the case where the pixel of the pre-reconstructed area and the pixel of the unreconstructed area are referenced.

In FIGS. 8(b) and 8(c), prediction direction referring to the pixel of the pre-reconstructed area is designated as a solid line arrow, and prediction direction referring to the pixel of the unreconstructed area is designated as a broken line arrow. Prediction directions of the solid line arrows or the broken line arrows are equal to each other, and the solid line arrow and the broken line arrow are symmetrical with respect to the center of the block.

As shown in FIG. 7, the solid line arrow and the broken line arrow in FIG. 8(c) may be indicated as different types of mode information (e.g., the mode number). In contrast, in FIG. 8(b), mode information of the blocks is the same. Therefore, in FIG. 8(c), selectivity of an MPM (Most Probable Mode) where the prediction mode of the current block is derived from information on the neighbor block is low, compared to the case in FIG. 8(b). That is, as shown in FIG. 8(c), when an omni-directional prediction mode can be used, selectivity of the MPM is low, and thus the number of bits for signaling the prediction mode of the current block may be increased.

FIG. 9 is a view illustrating a method of configuring a reference pixel for intra prediction of the current block by using the pixel of the current picture and the pixel of the reference picture.

FIG. 9(a) illustrates a current picture containing a current block, and FIG. 9(b) illustrates a reference picture. As shown in FIG. 9 (a), intra prediction for the current block may be performed using the pixel of the pre-reconstructed area adjacent to the current block in the current picture. Alternatively, as shown in FIG. 9(b), intra prediction for the current block may be performed using the pixel of an area (hereinafter, referred to as "a similar area of the current block") similar to the current block in the reference picture. The similar area of the current block means an area in a reference picture having pixel distribution similar to that of the current block. In the description, the similar area of the current block may be indicated as the similar area in the reference picture. The similar area in the reference picture may be an area in the reference picture having the same size as the current block. Alternatively, the similar area in the reference picture may include an area in the reference picture having the same size as the current block and an area adjacent thereto.

The similar area in the reference picture may be specified based on prediction information (e.g., a motion vector) of the current block. Here, in order to estimate prediction information of the current block, prediction information of the neighbor area of the current block may be utilized. Alternatively, the similar area in the reference picture may be searched by comparing similarity of the neighbor pixel of the current block and the pixel in the reference picture. For example, in order to compare similarity, an area of an original picture corresponding to the current block and an arbitrary area in the reference picture are specified, and cost may be calculated by applying various cost functions to pixel values in the areas. For example, in order to compare similarity, a neighbor area of the current block and an arbitrary area in the reference picture are specified, and cost may be calculated by applying various cost functions to pixel values in the areas. For example, cost function includes SAD (sum of absolute difference), SSD (sum of squared difference), MAD (mean absolute difference), MSD (mean squared difference), etc. When cost is calculated using the cost functions, whether two areas are similar may be determined by comparing the calculated cost and a threshold. Alternatively, the similar area in the reference picture may be determined by using prediction information (e.g., a motion vector) transmitted from the encoder to the decoder, the prediction information being information for determining an area having high similarity to the current block in the reference picture.

According to the present invention, intra prediction of the current block may be performed using the pixel of the similar area in the reference picture in addition to the pre-reconstructed area of the current picture. That is, intra prediction according to the present invention may refer to the pixel in the reference picture. Accordingly, intra prediction of the current block according to the present invention may be indicated as Inter_DC prediction, Inter_Planar prediction, or Inter_Angular prediction.

According to another embodiment of the present invention, the reference picture is transformed to generate a geometric transform picture (warped picture), and the geometric transform picture is used as a reference picture to determine the similar area. Based on information on geometric transform, the reference picture of the current picture is reconfigured to be similar to the current picture such that the geometric transform picture is generated. The geometric transform picture may be used as a reference picture of inter prediction and intra prediction according to the present invention. The geometric transform reference picture is a picture reconfigured to be similar to the current picture, and thus accuracy of prediction using the similar area pixel may increase.

The similar area of the current block is likely to be the area in the reference picture having the same position as the current block. Therefore, the area in the reference picture having the same position as the current block and/or an area adjacent thereto may be determined as the similar area of the current block.

Figure 10:
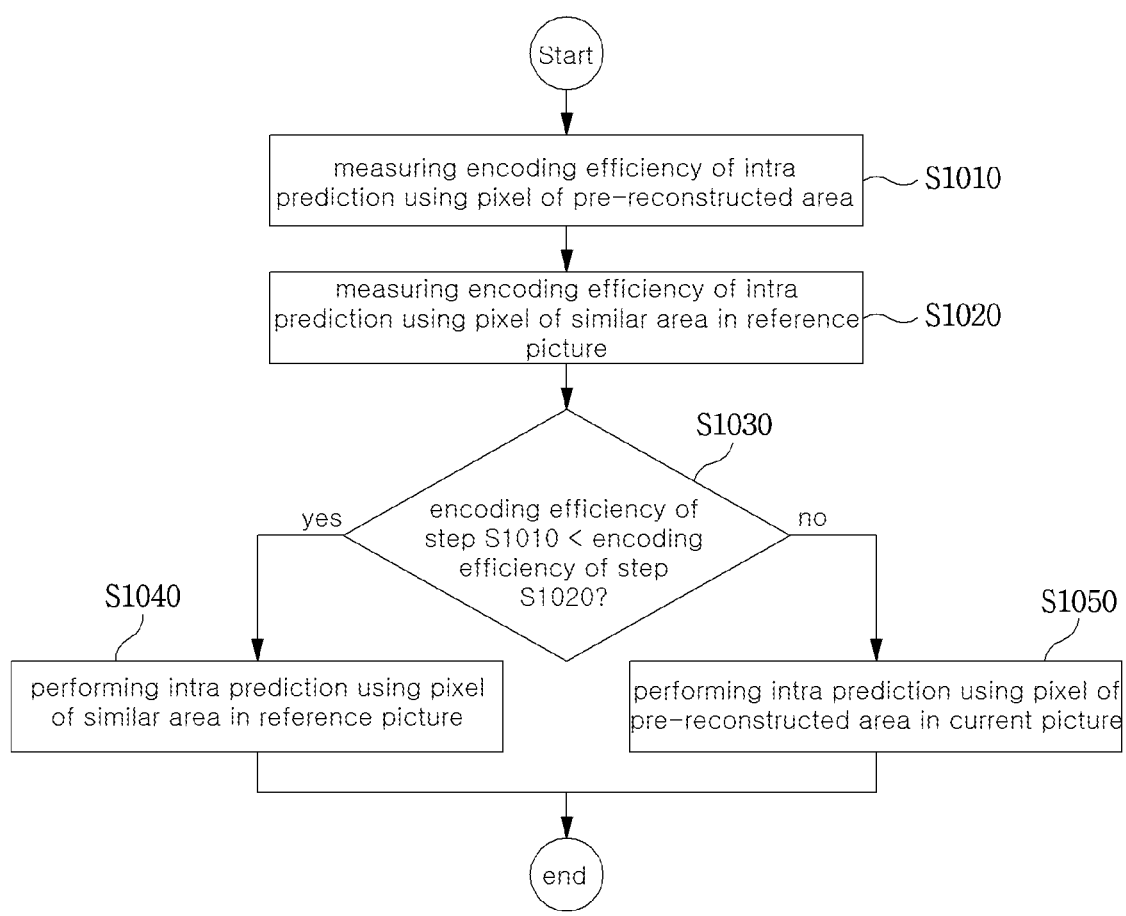
FIG. 10 is a view illustrating operation of an encoder performing intra prediction according to the present invention.

FIG. 10 is a view illustrating operation of an encoder performing intra prediction according to the present invention.

At step S1010, intra prediction may be performed using, as a reference sample, a pixel of the pre-reconstructed area in the current picture and encoding efficiency may be estimated. At step S1020, intra prediction may be performed using, as a reference sample, a pixel of the similar area in the reference picture and encoding efficiency may be estimated. Inter_DC prediction, Inter_Planar prediction, and Inter_Angular prediction that may be performed at step S1020 will be described later.

Next, encoding efficiency estimated at steps S1010 and S1020 is compared at step S1030, and intra prediction may be performed using a method for higher encoding efficiency at step S1040 or S1050.

At step S1040, additional information may be signaled from the encoder to the decoder, and the additional information includes at least one piece of information of prediction information containing a prediction mode, information on the similar area, and mode information using the similar area. The decoder decodes the signaled additional information to perform intra prediction performed by the encoder. Information on the similar area may be equally derived by the encoder and the decoder by using pixel distribution of a neighbor area of the current block or prediction information of a motion vector, etc. In this case, information on the similar area may not be signaled.

In the example explained referring to FIG. 10, at steps S1020 and S1040, intra prediction is performed using a pixel of the similar area in the reference picture. However, these are not limited thereto, for example, at steps S1020 and S1040, intra prediction may be performed using both the pixel of the similar area in the reference picture and the pixel of the pre-reconstructed area in the current picture.

Figure 11:
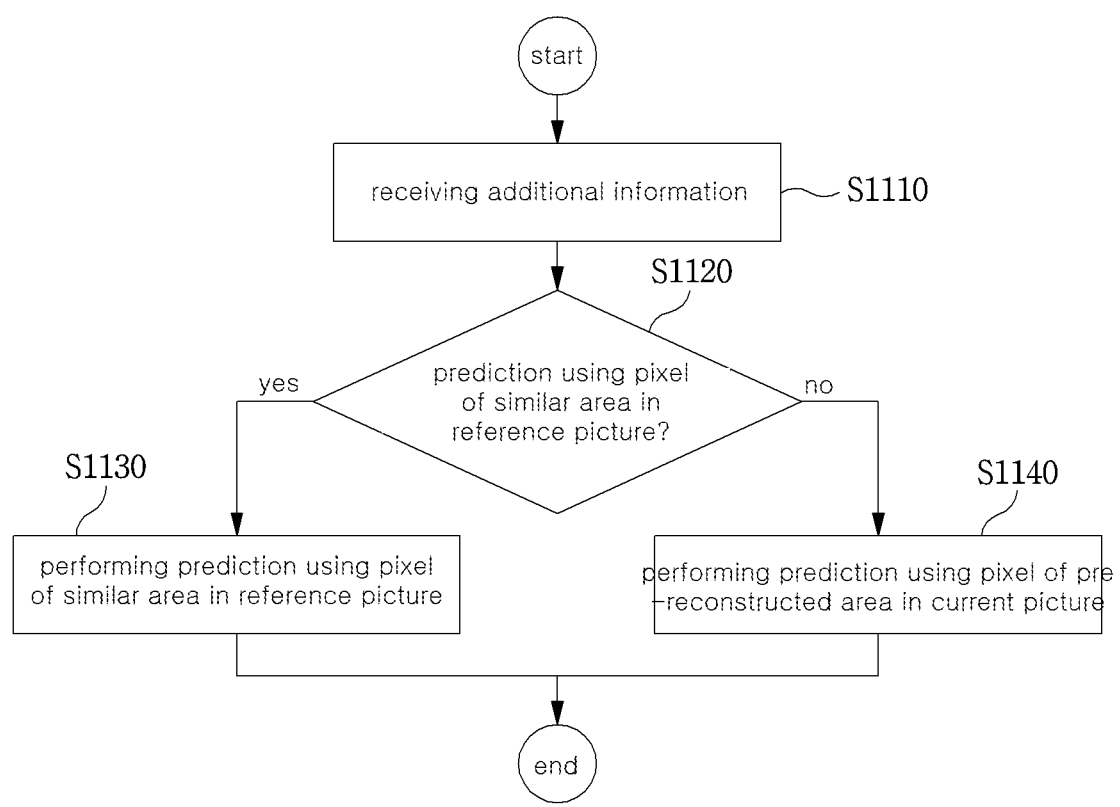
FIG. 11 is a view illustrating operation of a decoder performing intra prediction according to the present invention.

FIG. 11 is a view illustrating operation of a decoder performing intra prediction according to the present invention.

At step S1110, the decoder may receive additional information from the encoder. The decoder may determine, based on the additional information, whether the current block is predicted using the pixel of the similar area in the reference picture or is predicted using the pixel of the pre-reconstructed area in the current picture at step S1120. Next, depending on the result of determination at step S1120, the decoder may selectively perform step S1130 or step S1140. When the prediction mode of the current picture can be determined with receiving the additional information, step S1110 in FIG. 11 may be omitted.

Hereinafter, Inter_DC prediction according to the present invention will be described.

In a DC mode (hereinafter, referred to as "intra DC" or "Intra_DC") using the pixel of the pre-reconstructed area in the current picture, left and upper neighbor pixels of the current block are used. That is, the current block is predicted using an average value of pixel values of the left and upper neighbor pixels. Therefore, when the left and upper neighbor pixels of the current block are similar to the pixel of the current block, accuracy of intra DC prediction is high. In contrast, the left and upper neighbor pixels of the current block is greatly different from the pixel of the current block, accuracy of intra DC prediction is low. In the latter case, accuracy of prediction may be enhanced using the pixel of the similar area in the reference picture.

FIG. 12 is a view illustrating Inter_DC prediction according to the present invention.

FIG. 12($a$) illustrates a current block and neighbor pixels in the current picture. In FIG. 12($a$), broken line areas are areas of the left and upper neighbor pixels of the current block used in intra DC prediction. Also, the bold solid line area indicates the current block. FIG. 12($b$) illustrates a pixel of the similar area in the reference picture. In FIG. 12($b$), the bold solid line area indicates the similar area in the reference picture corresponding to the current block.

For Inter_DC prediction according to the present invention, all or at least some of pixels of the similar area in the reference picture and the left and upper neighbor pixels of the current block in the current picture may be used as reference pixels. The pixels of the similar area in the reference picture used in Inter_DC prediction of the present invention may include the pixel of the bold solid line area and/or an area adjacent thereto in FIG. 12($b$).

Inter_DC prediction may be performed in units of sub-blocks constituting the current block. A range of pixels of the similar area in an available reference picture may vary depending on the position of the sub-block. The size and/or shape of the sub-block may be a fixed size and/or shape predetermined by the encoder/decoder, or may be derived depending on the size and/or shape of the current block. A plurality of sub-blocks constituting the current block may be predicted sequentially according to a predetermined priority order. The predetermined priority order may be from the left to the right or from the top to the bottom. Alternatively, the predetermined priority order may be from the right to the left or from the bottom to the top. When the first sub-block in the current block is reconstructed before the second sub-block, a reconstructed pixel of the first sub-block may be used as a reference pixel for prediction of the second sub-block.

A prediction value of Inter_DC prediction may be derived by using an average or a weighted average of available reference pixels. When applying the weighted average, a weighting for each pixel may be determined in various ways.

Figure 13:
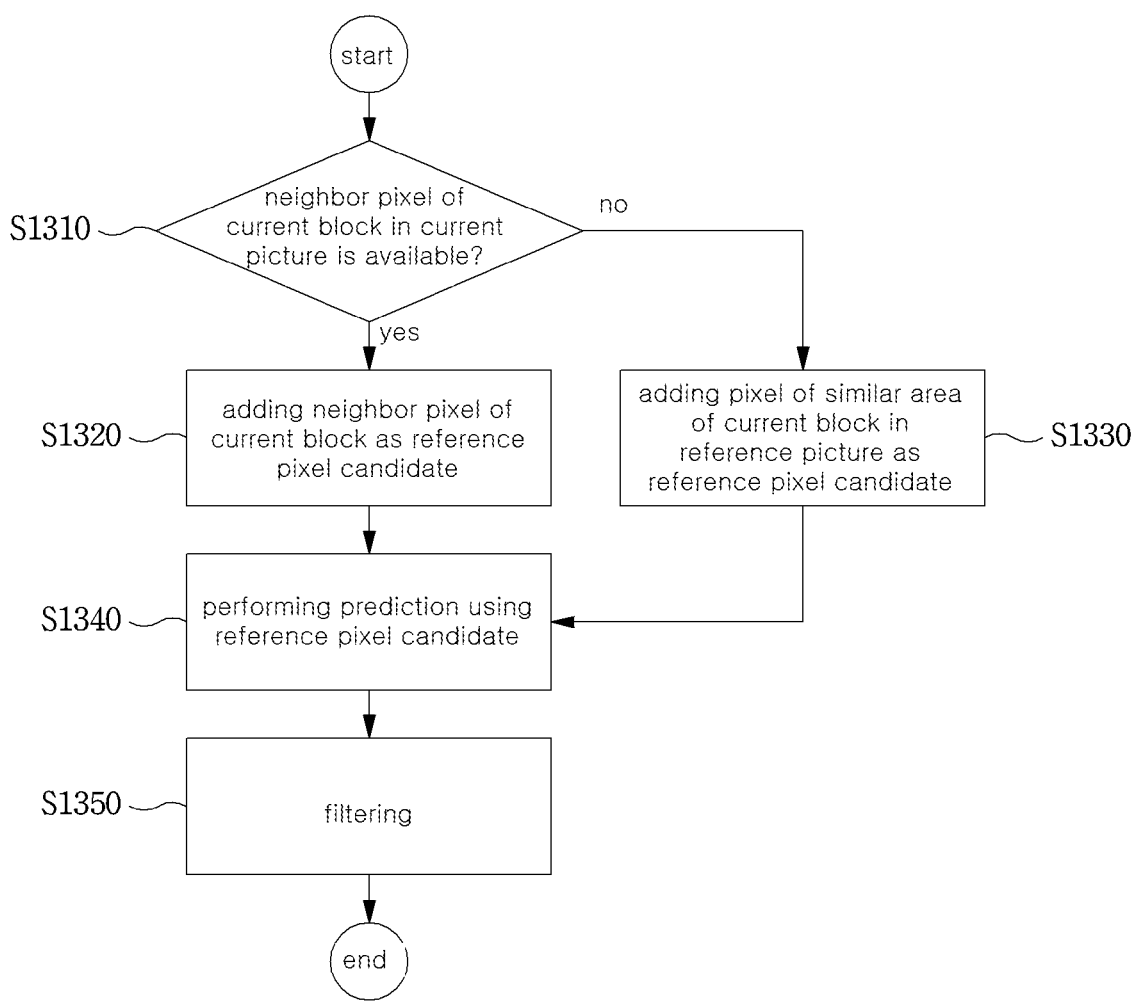
FIG. 13 is a view illustrating an embodiment of Inter_DC prediction according to the present invention.

FIG. 13 is a view illustrating an embodiment of Inter_DC prediction according to the present invention.

At step S1310, whether the neighbor pixel of the current block in the current picture is available may be determined. The neighbor pixel may include, for example, a pixel adjacent to the left and/or the top of the current block. When the neighbor pixel is available, the available neighbor pixel may be added as a reference pixel candidate of the current block at step S1320.

When the neighbor pixel is unavailable, the pixel of the similar area in the reference picture may be added as a reference pixel candidate at step S1330. A method of specifying the similar area in the reference picture is the same as described above.

Next, a prediction value of the current block is calculated using the reference pixel candidate such that prediction may be performed at step S1340. The prediction value may be calculated using an average or a weighted average for all or some of reference pixel candidates.

Also, among pixels in the current block, filtering may be performed on a pixel adjacent to the boundary at step S1350. The boundary on which filtering is performed may include, for example, at least one of left, top, right, and bottom boundaries of the current block. Filtering on the pixel adjacent to the left and/or top boundary of the current block may be performed using the pixel of the pre-reconstructed area in the current picture and/or the pixel of the similar area in the reference picture. Filtering on the pixel adjacent to the right and/or bottom boundary of the current block may be performed using the pixel of the similar area in the reference picture.

The embodiment explained referring to FIG. 13 may be effectively applied, when, for example, there is no neighbor pixel to be referenced since the current block is adjacent to the boundary of a particular area. The particular area may be, for example, at least one of a picture, a slice, and a tile. Alternatively, the particular area may be an area that is the unit of parallel processing. When the area is the unit of parallel processing, the area is encoded so as not to refer to information on the neighbor area.

The embodiment explained referring to FIG. 13 is equally performed by the encoder and the decoder based on whether the neighbor pixel of the current block is available, and thus additional information required in prediction may not be transmitted.

In the embodiment explained referring to FIG. 13, after determining whether the neighbor pixel of the current block is available, the reference pixel is differently used. However, regardless of whether the neighbor pixel of the current block is available, Inter_DC prediction may be performed using only the pixel of the similar area in the reference picture. In this case, information indicating that Inter_DC prediction has been performed (e.g., mode information) and/or information on the similar area (e.g., position information) may be signaled from the encoder to the decoder.

Also, in the embodiment explained referring to FIG. 13, only one of the neighbor pixel of the current block and the pixel of the similar area in the reference picture can be referenced, but without being limited thereto, both the available neighbor pixel of the current block and the pixel of the similar area in the reference picture may be used as reference pixel candidates. Also, all or some of reference pixel candidates may be used for prediction.

Figure 14:
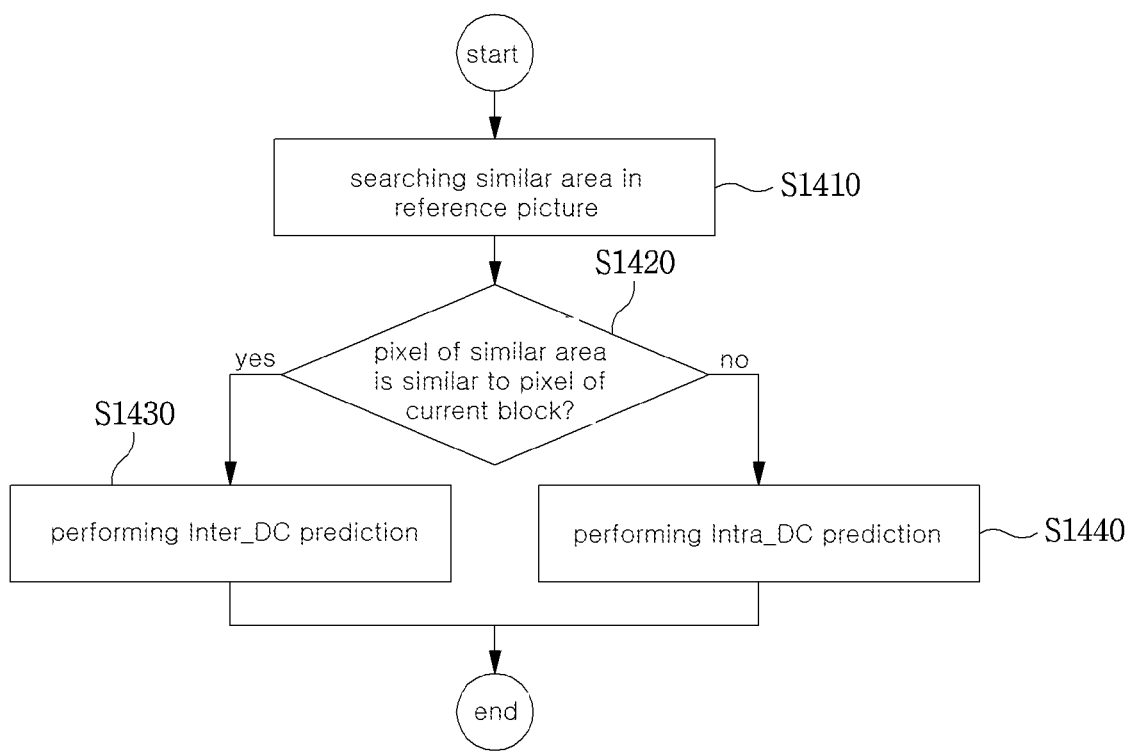
FIG. 14 is a view illustrating operation of an encoder performing another embodiment of DC prediction according to the present invention.

FIG. 14 is a view illustrating operation of an encoder performing another embodiment of DC prediction according to the present invention.

At step S1410, the encoder may search the similar area of the current block in the reference picture. A method of specifying the similar area in the reference picture is the same as described above.

At step S1420, whether the pixel of the similar area is similar to the pixel of the current block may be determined. When pixel similarity between two areas is high, Inter_DC prediction is performed at step S1430. When the pixel similarity is low, Intra_DC prediction is performed at step S1440. A method of comparing similarity between pixels is the same as described above.

In the embodiment explained referring to FIG. 14, based on similarity between areas, the encoder and the decoder may perform the same process, and thus information on a mode may not be transmitted.

At step S1420 in FIG. 14, similarity between the similar area in the reference picture and the current block is determined. However, without being limited thereto, similarity between the pre-reconstructed area and the current block in the current picture may be determined. For example, when similarity between the pre-reconstructed area and the current block in the current picture is high, Intra_DC prediction is performed. When the similarity is low, Inter_DC prediction is performed.

Alternatively, similarity of both cases may be determined. In this case, similarity between two cases is compared. When the current block is more similar to the pre-reconstructed area in the current picture rather than to the similar area in the reference picture, Intra_DC prediction is performed, and otherwise, Inter_DC prediction is performed.

As another embodiment, the encoder may perform both Intra_DC prediction and Inter_DC prediction, and after comparing encoding efficiency of two prediction modes, prediction having higher encoding efficiency may be determined. In this case, information on prediction may be signaled from the encoder to the decoder. When Inter_DC prediction is selected, information on prediction may include information on the similar area and/or information on the selected mode.

FIG. 15 is a view illustrating Inter_Planar prediction according to the present invention.

FIG. 15(a) illustrates an example of planar prediction (hereinafter, referred to as "Intra_Planar prediction") using only the pixel of the pre-reconstructed area in the current picture. FIG. 15(b) illustrates an example of Inter_Planar prediction using the pixel of the pre-reconstructed area in the current picture and/or the pixel of the similar area in the reference picture. In the case of Inter_Planar prediction, all or some of pixels of the pre-reconstructed area in the current picture and the similar area in the reference picture may be used in performing prediction.

In FIG. 15, the gray-colored pixel indicates a reference pixel that may be used in Intra_Planar prediction or Inter_Planar prediction. Also, the black-colored pixel indicates a pixel in the current block that is a target of prediction.

In Intra_Planar prediction, only the pixel of the pre-reconstructed area in the current picture (e.g., the left and/or upper neighbor pixel of the current block) is used in predicting the current block. Therefore, when similarity between the pixel of the pre-reconstructed area in the current picture and the pixel of the current block is low, accuracy of prediction decreases and encoding efficiency is low. In this case, the pixel of the similar area in the reference picture is used, such that accuracy of prediction may be enhanced.

In planar prediction, a weighting may be applied based on the distance between the reference pixel and a current prediction target pixel. For example, a high weighting may be applied to the near reference pixel. Alternatively, different weightings may be applied to the reference pixel in the current picture and the reference pixel in the reference picture. For example, a high weighting may be applied to the reference pixel having high similarity to the current block. That is, when the current block is more similar to the similar area in the reference picture rather than to the pre-reconstructed area in the current picture, a higher weighting may be applied to the reference pixel in the reference picture.

FIG. 16 is a view illustrating another embodiment of the reference pixel that may be used in Inter_Planar prediction.

As shown in FIG. 16, the reference pixel in the reference picture may be a pixel in a particular area including a current prediction target pixel.

According to an embodiment of a planar prediction method of the present invention, Intra_Planar prediction and Inter_Planar prediction are performed and encoding efficiency of two prediction modes may be compared. When encoding efficiency in Intra_Planar prediction is higher, Intra_Planar prediction may be performed on the current block. When encoding efficiency in Inter_Planar prediction is higher, Inter_Planar prediction may be performed on the current block. When Inter_Planar prediction is performed on the current block, information on prediction may be signaled from the encoder to the decoder.

The embodiment of Inter_DC prediction explained referring to FIG. 14 may be applied in Inter_Planar prediction. That is, the similar area in the reference picture is searched and similarity between the similar area and the current block is determined. When similarity is high, Inter_Planar prediction is performed. When similarity is low, Intra_Planar prediction is performed.

Figure 17:
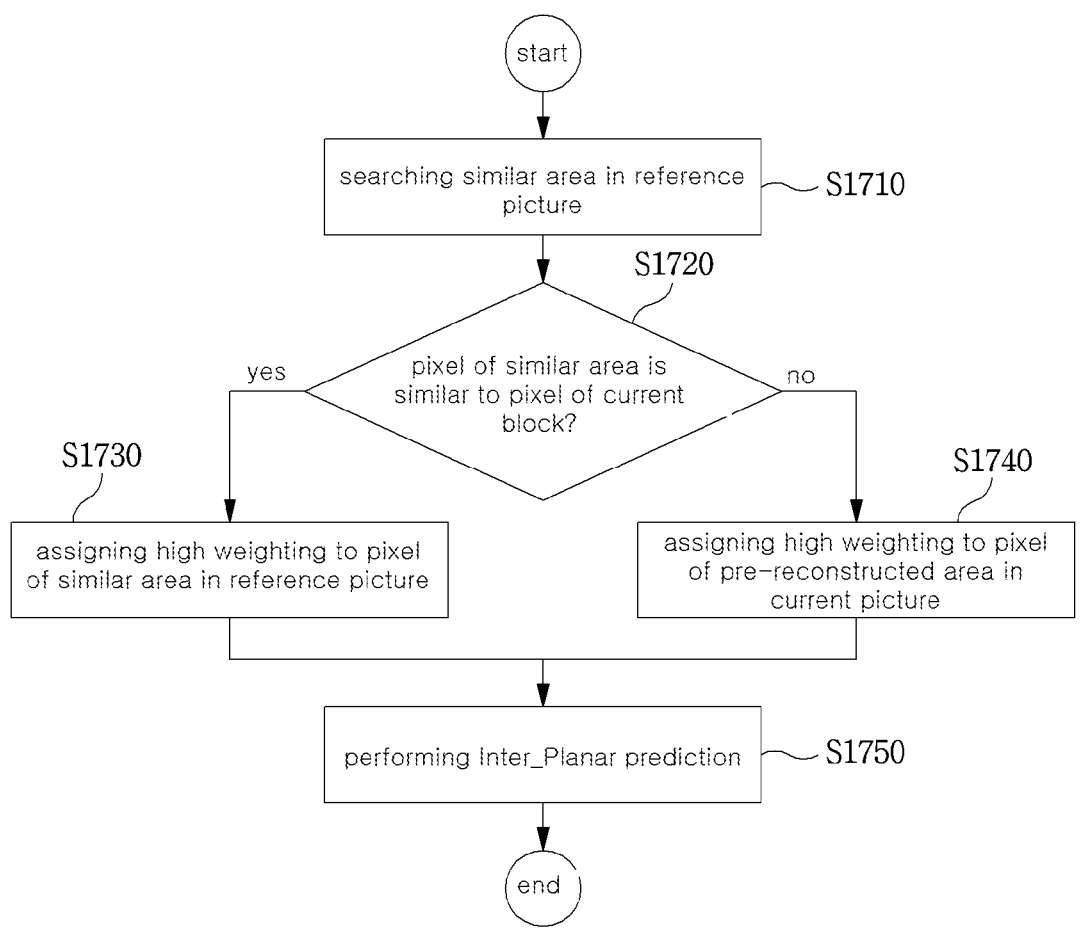
FIG. 17 is a view illustrating another embodiment of Inter_Planar prediction according to the present invention.

FIG. 17 is a view illustrating another embodiment of Inter_Planar prediction according to the present invention.

At step S1710, the similar area in the reference picture may be searched. A method of searching the similar area is the same as described above. When the similar area is determined, similarity between the similar area and the current block may be determined at step S1720. A method of comparing similarity between pixels is the same as described above.

Based on the result of similarity determination at step S1720, the first weighting may be applied to the pixel of the similar area in the reference picture and the second weighting may be applied to the pixel (e.g., the left and/or upper neighbor pixel of the current block) of the pre-reconstructed area in the current picture. The first weighting and the second weighting may be the same or different from each other. For example, when similarity between the similar area and the current block is high, the first weighting may be larger than the second weighting at step S1730. Otherwise, the second weighting may be larger than the first weighting at step S1740. When the weighting is determined, Inter_Planar prediction may be performed based on the reference pixel and the weighting at step S1750.

Inter_Planar prediction explained referring to FIG. 17 may be equally performed by the encoder and the decoder based on the result of similarity determination, and thus information on the prediction mode may not be signaled.

Hereinafter, Inter_Angular prediction according to the present invention will be described.

As described referring to FIG. 7, since intra prediction according to the present invention may refer to the pixel of the similar area in the reference picture, omni-directional prediction may be performed.

When pixel similarity between the pre-reconstructed area and the current block in the current picture is low, accuracy of prediction referring to the pixel of the pre-reconstructed area in the current picture may decrease. In this case, prediction is performed referring to the pixel of the similar area in the reference picture, such that accuracy of prediction may be enhanced. Since the pixel in the reference picture is already reconstructed at the time of prediction of the current block, omni-directional prediction is possible as described later.

Figure 18:
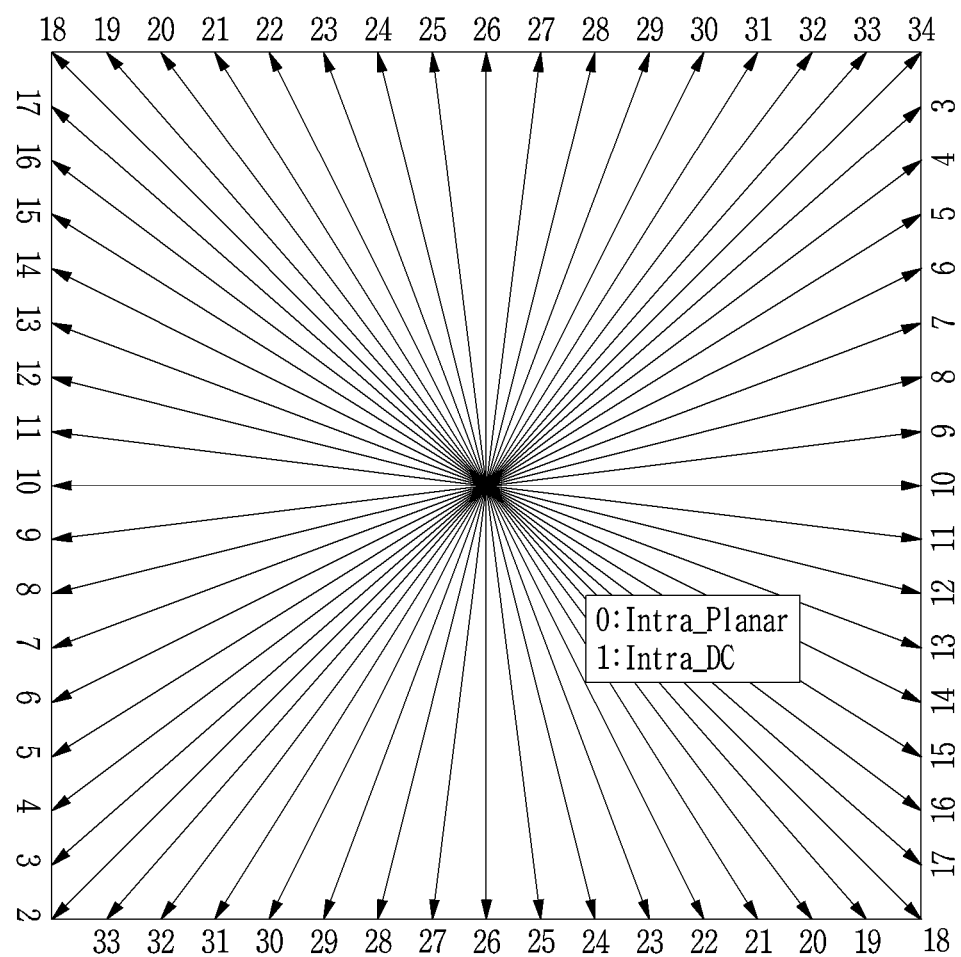
FIG. 18 is a view illustrating another embodiment of an omni-directional prediction mode according to the present invention.

FIG. 18 is a view illustrating another embodiment of an omni-directional prediction mode according to the present invention. In FIG. 18, the direction of the arrow indicates the position of the reference pixel, and a number at the head of each arrow indicates a symbol (a mode number) of an intra prediction direction.

As shown in FIG. 18, the same symbols may be assigned to 180-degree opposite prediction directions. As described above, in omni-directional prediction, when the symbol indicating a prediction direction (a prediction mode) is large, selectivity of the MPM is low and encoding efficiency of the prediction mode is likely to be decreased. As shown in FIG. 18, the same symbols are assigned to opposite prediction directions, such that the problem of decreased encoding efficiency of the prediction mode caused by the increased number of symbols indicating prediction modes may be solved. In this case, one prediction direction may be specified based on information indicating whether the pixel (e.g., the pixel of the left or upper area) of the pre-reconstructed area in the current picture is used or the pixel (e.g., the pixel of the right or lower area) at the position of the unreconstructed area is used. For example, the 18th symbol may indicate a left-upward diagonal direction or a right-downward diagonal direction. When the pixel at the position of the unreconstructed area is used as the reference pixel of the current block, the 18th symbol may be specified as a right-downward diagonal direction.

Figure 19:
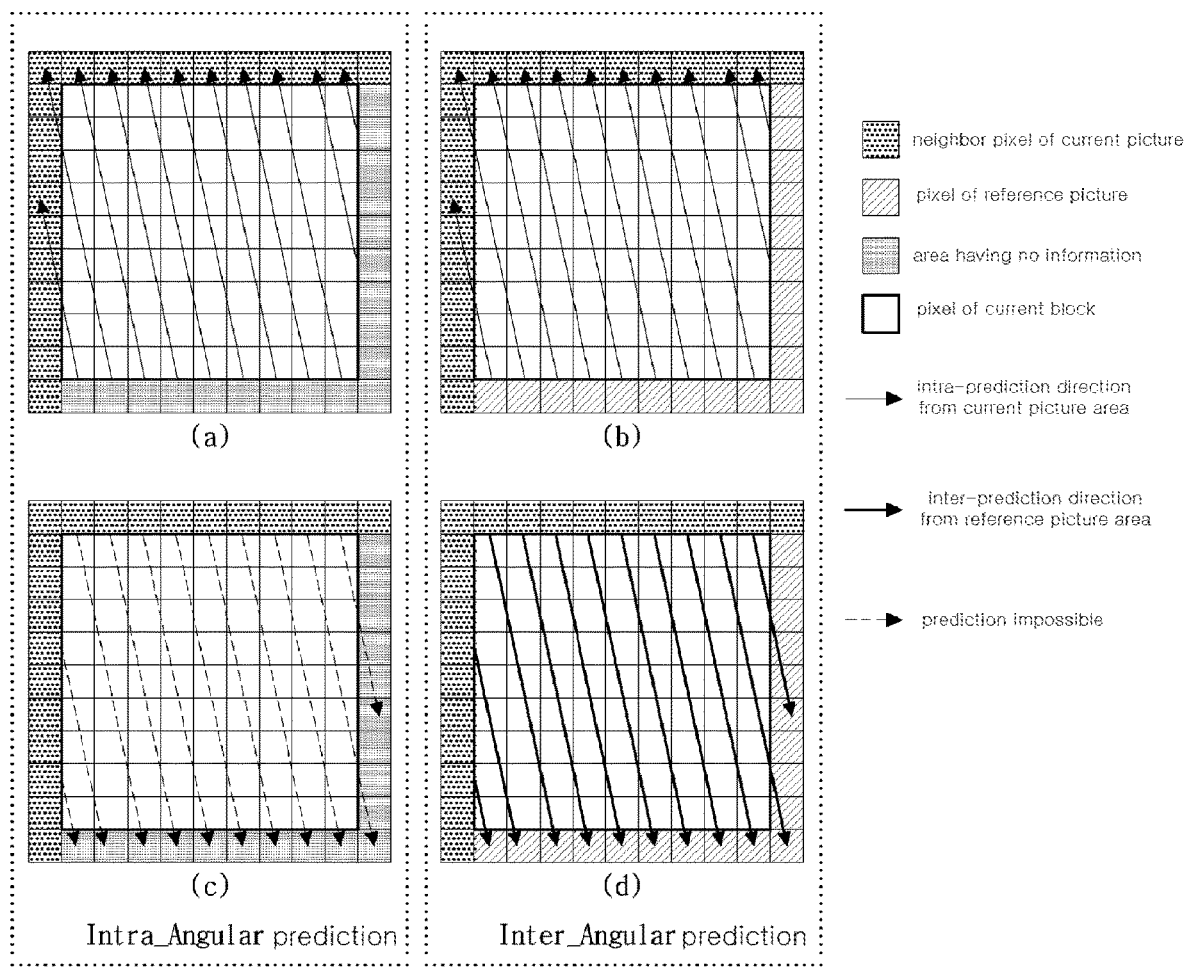
FIG. 19 is a view illustrating directionality prediction referring to the pixel of the similar area in the reference picture.

FIG. 19 is a view illustrating directionality prediction referring to the pixel of the similar area in the reference picture.

FIGS. 19(a) and 19(c) are views illustrating directionality intra prediction (hereinafter, referred to as "Intra_Angular prediction") referring to only the pixel of the pre-reconstructed area in the current picture. FIGS. 19(b) and 19(d) are views illustrating directionality intra prediction (Inter_Angular prediction) referring to the pixel of the pre-reconstructed area in the current picture and the pixel of the similar area in the reference picture.

In FIG. 19, the dot-patterned area means the pre-reconstructed area (e.g., the left and/or upper neighbor area of the current block) in the current picture. The slash-patterned area means the pixel area (e.g., the similar area in the reference picture) in the reference picture, and the gray-colored area means an area having no pixel information that may be referenced. The solid line arrow indicates a direction for prediction referring to the pixel of the pre-reconstructed area in the current picture, and the bold solid line arrow indicates a direction for prediction referring to the pixel in the reference picture. The broken line arrow indicates a direction where prediction is impossible.

As shown in FIG. 19(a), in Intra_Angular prediction, since only the pixel of the pre-reconstructed area in the current picture is referenced, the left and/or upper neighbor pixel of the current block may be referenced. However, as shown in FIG. 19(c), prediction may not be performed on an area that is not reconstructed yet.

In Inter_Angular prediction, since the pixel of the pre-reconstructed area in the current picture and the pixel in the reference picture are referenced, omni-directional prediction is possible as shown in FIGS. 19(b) and (d).

The pixel in the reference picture that may be used in Inter_Angular prediction of the present invention may be all or some of the pixel of the similar area in the reference picture.

Figure 20:
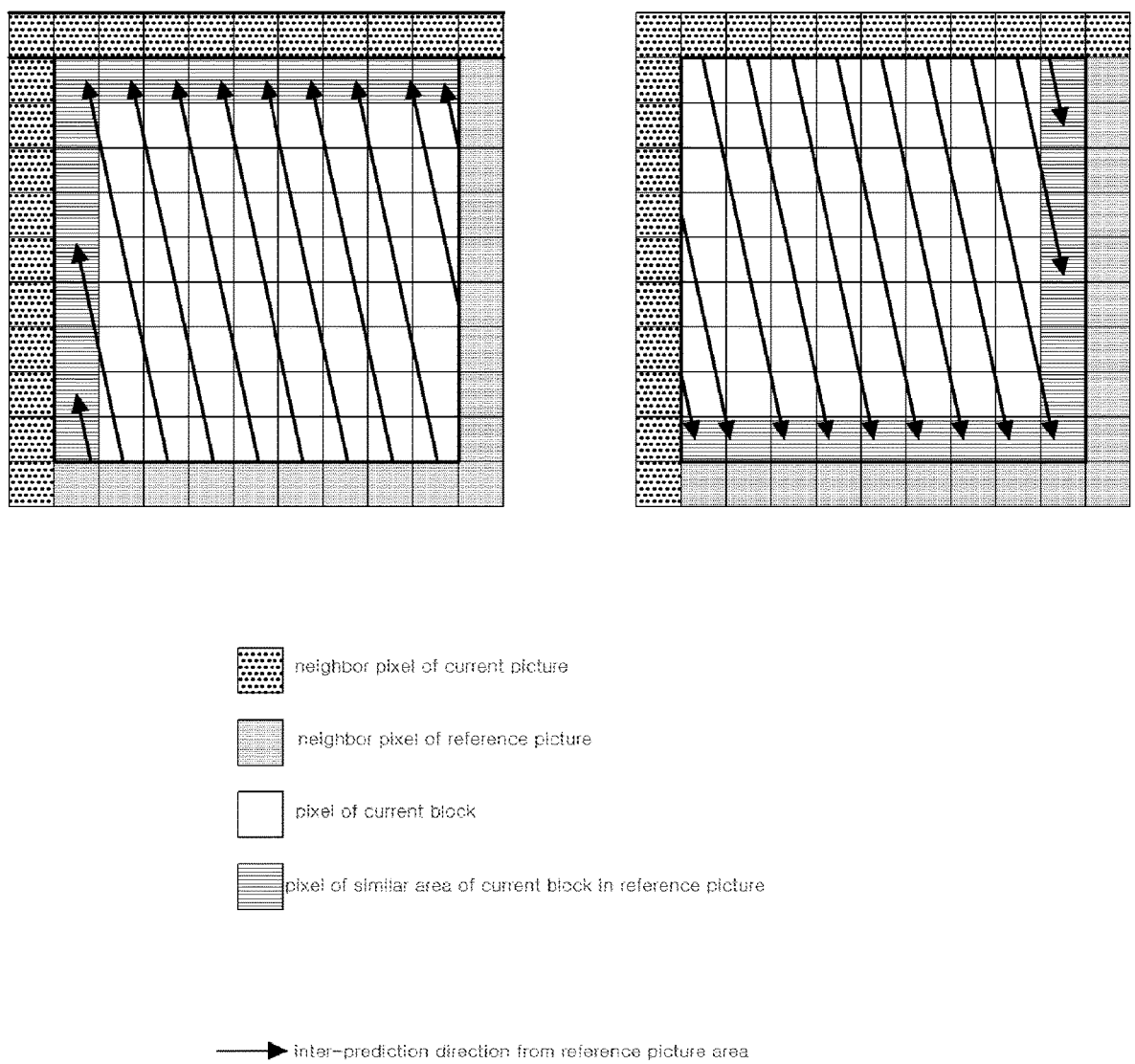
FIG. 20 is a view illustrating Inter_Angular prediction according to another embodiment of the present invention.

FIG. 20 is a view illustrating Inter_Angular prediction according to another embodiment of the present invention. As shown in FIG. 20, the pixel of the similar area in the reference picture and all or some of neighbor pixels may be used in Inter_Angular prediction.

The encoder performing Inter_Angular prediction of the present invention may perform both Intra_Angular prediction and Inter_Angular prediction and may measure encoding efficiency. Next, encoding efficiency in both prediction is compared, and prediction having better encoding efficiency may be performed. Alternatively, a weighted sum of Intra_Angular prediction and Inter_Angular prediction may be used in prediction.

After prediction, filtering may performed on the current block. Filtering for the current block may include the first filtering for the left and/or top boundary area of the current block and the second filtering for the right and/or bottom boundary area of the current block. The first filtering may be performed based on at least one of the pixel of the pre-reconstructed area in the current picture (the left and/or upper neighbor pixel of the current block) and the pixel of the reference picture. The second filtering may be performed based on the pixel of the pre-reconstructed area in the current picture (the left and/or upper neighbor pixel of the current block) or the pixel of the reference picture. The first filtering and the second filtering may be different in at least one of the position, the number, and the range of pixels used in filtering.

Figure 21:
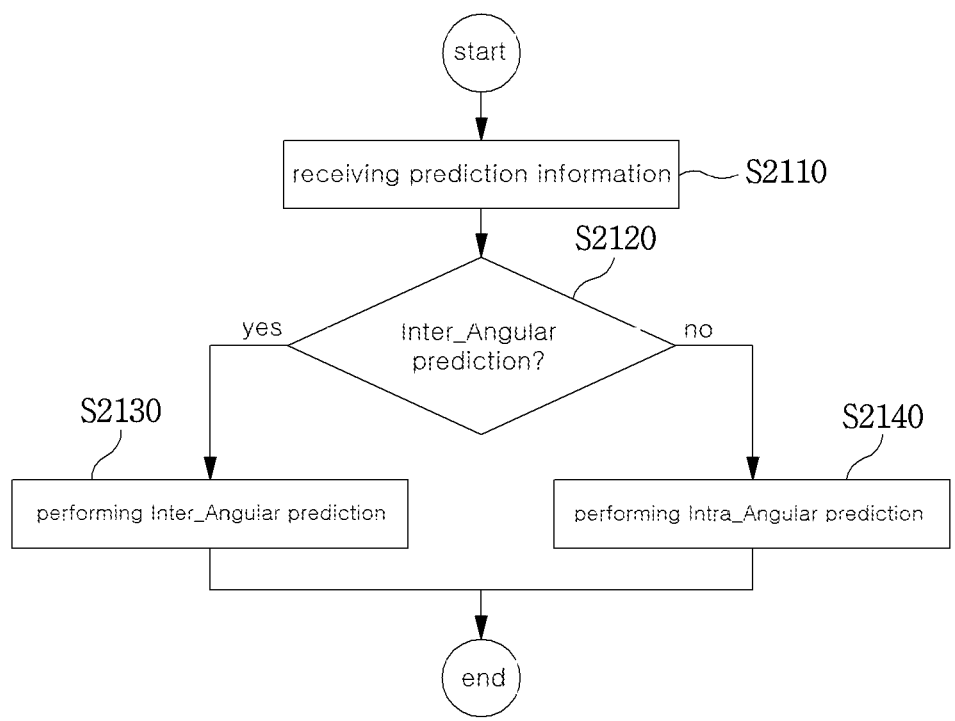
FIG. 21 is a view illustrating operation of a decoder performing angular prediction according to the present invention.

FIG. 21 is a view illustrating operation of a decoder performing angular prediction according to the present invention.

The encoder according to the present invention may signal prediction information indicating Inter_Angular prediction has been performed to the decoder. The decoder receives prediction information at step S2110, and determines whether Inter_Angular prediction or Intra_Angular prediction is performed on the current block at step S2120, and performs Inter_Angular prediction at step S2130 or Intra_Angular prediction at step S2140.

Figure 22:
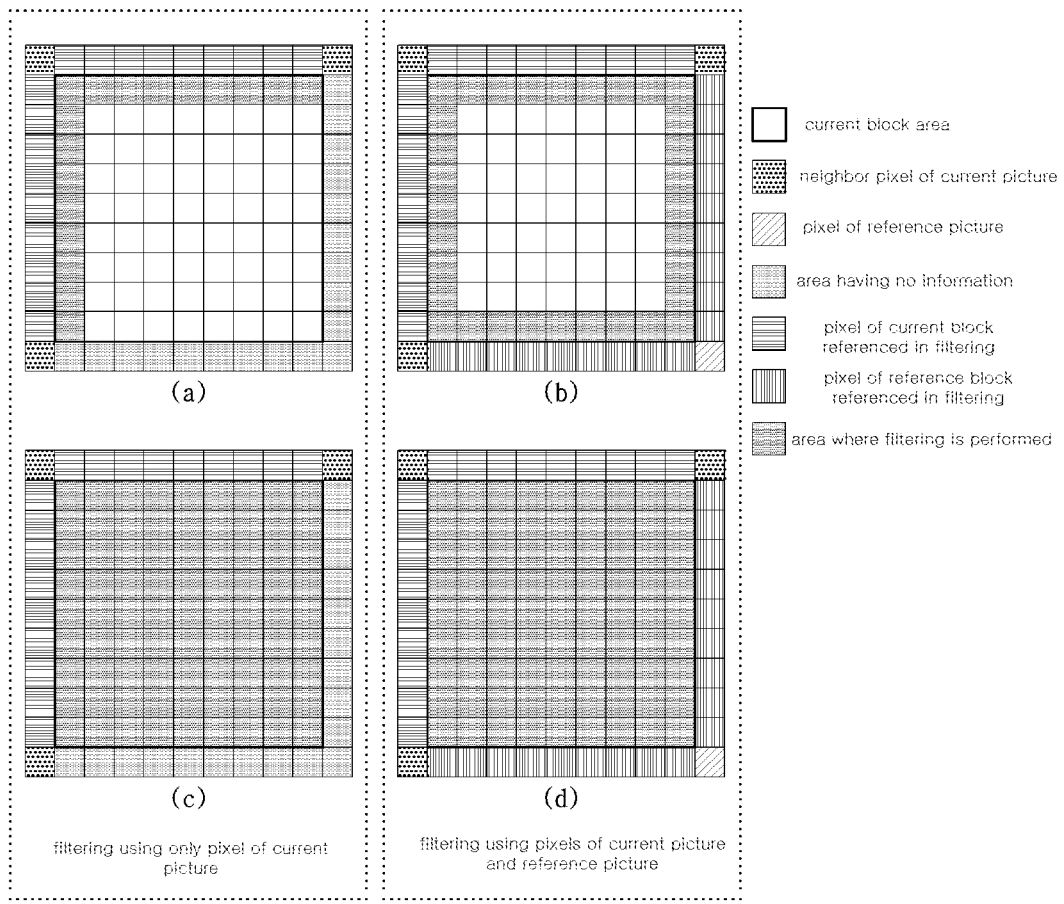
FIG. 22 is a view illustrating a filtering method using the pixel of the similar area in the reference picture.

FIG. 22 is a view illustrating a filtering method using the pixel of the similar area in the reference picture.

In FIG. 22, the bold solid line square area means an area of the current block. The horizontal line patterned area means the left and/or upper neighbor pixel of the current block referenced in filtering, and the vertical line patterned area means the right and/or lower neighbor pixel of the similar area in the reference picture referenced in filtering. The gray-colored area means an area where filtering is performed.

FIG. 22($a$) is a view illustrating filtering using only the pixel in the current picture, as a filtering method performed in Intra_DC prediction. FIG. 22($c$) is a view illustrating filtering using only the pixel in the current picture, as a filtering method performed in Intra_Angular prediction. As shown in FIGS. 22($a$) and ($c$), only the pixel of the pre-reconstructed area in the current picture (e.g., the left and/or upper neighbor pixel of the current block) is used in performing filtering.

In FIGS. 22($b$) and ($d$), filtering may be performed by referring to both the pixel of the pre-reconstructed area in the current picture (e.g., the left and/or upper neighbor pixel of the current block) and the pixel of the similar area in the reference picture (e.g., the right and/or lower neighbor pixel of the current block).

FIG. 22($b$) illustrates a method of performing filtering only on the boundary area of the current block. In this case, filtering for the left and/or top boundary area of the current block may be performed using the left and/or upper neighbor pixel of the current block. Also, filtering for the right and/or bottom boundary area of the current block may be performed using the right and/or lower neighbor pixel of the similar area in the reference picture.

FIG. 22($d$) illustrates a method of performing filtering on all inner areas of the current block. In this case, the left neighbor pixel and the upper neighbor pixel of the current block and all or some of pixels of the similar area in the reference picture may be used. Different weightings may be assigned to reference pixels used in filtering. The weighting may be determined based on a distance between a filtering target pixel and a reference pixel. Alternatively, depending on whether the reference pixel is in the current picture or in the reference picture, different weighting may be assigned.

Filtering explained with reference to FIGS. 22($b$) and ($d$) may be performed on a block where Inter_DC prediction, Inter_Planar prediction, or Inter_Angular prediction is performed. However, at least one of four types of filtering explained with reference to FIG. 22 may be applied to a block where Intra_DC prediction, Inter_DC prediction, Intra_Planar prediction, Inter_Planar prediction, Intra_Angular prediction, or Inter_Angular prediction is performed.

Figure 23:
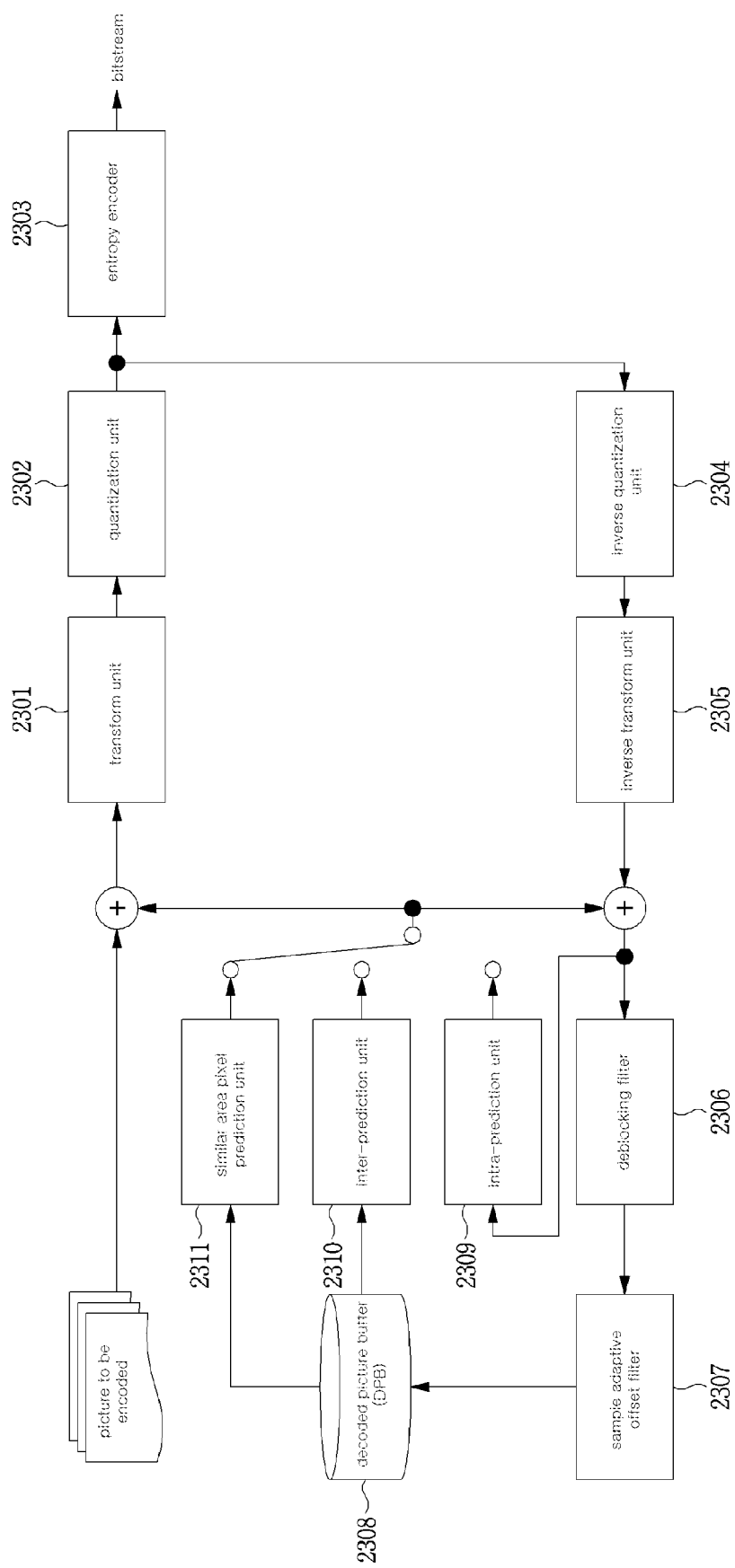
FIG. 23 is a view illustrating an embodiment of an encoder performing prediction using the pixel of the similar area in the reference picture.

FIG. 23 is a view illustrating an embodiment of an encoder performing prediction using the pixel of the similar area in the reference picture.

The encoder as shown in FIG. 23 according to the present invention may include a transform unit 2301, a quantization unit 2302, an entropy encoder 2303, an inverse quantization unit 2304, an inverse transform unit 2305, a deblocking filter 2306, a sample adaptive offset filter 2307, a decoded picture buffer (DPB) 2308, an intra-prediction unit 2309, an inter-prediction unit 2310, and/or a similar area pixel prediction unit 2311.

The similar area pixel prediction unit 2311 receives the reference picture from the decoded picture buffer 2308 and performs prediction on the current picture. When the current picture is an inter picture, the similar area pixel prediction unit 2311 may perform Inter_DC prediction, Inter_Planar prediction, and/or Inter_Angular prediction by referring to the pixel of the similar area in the reference picture. In FIG. 23, the similar area pixel prediction unit 2311 is shown as a separate component, but may be included in the intra-prediction unit 2309 or the inter-prediction unit 2310. Alternatively, a function of the similar area pixel prediction unit 2311 may be realized by extending the configuration of the intra-prediction unit 2309 or the inter-prediction unit 2310.

Figure 24:
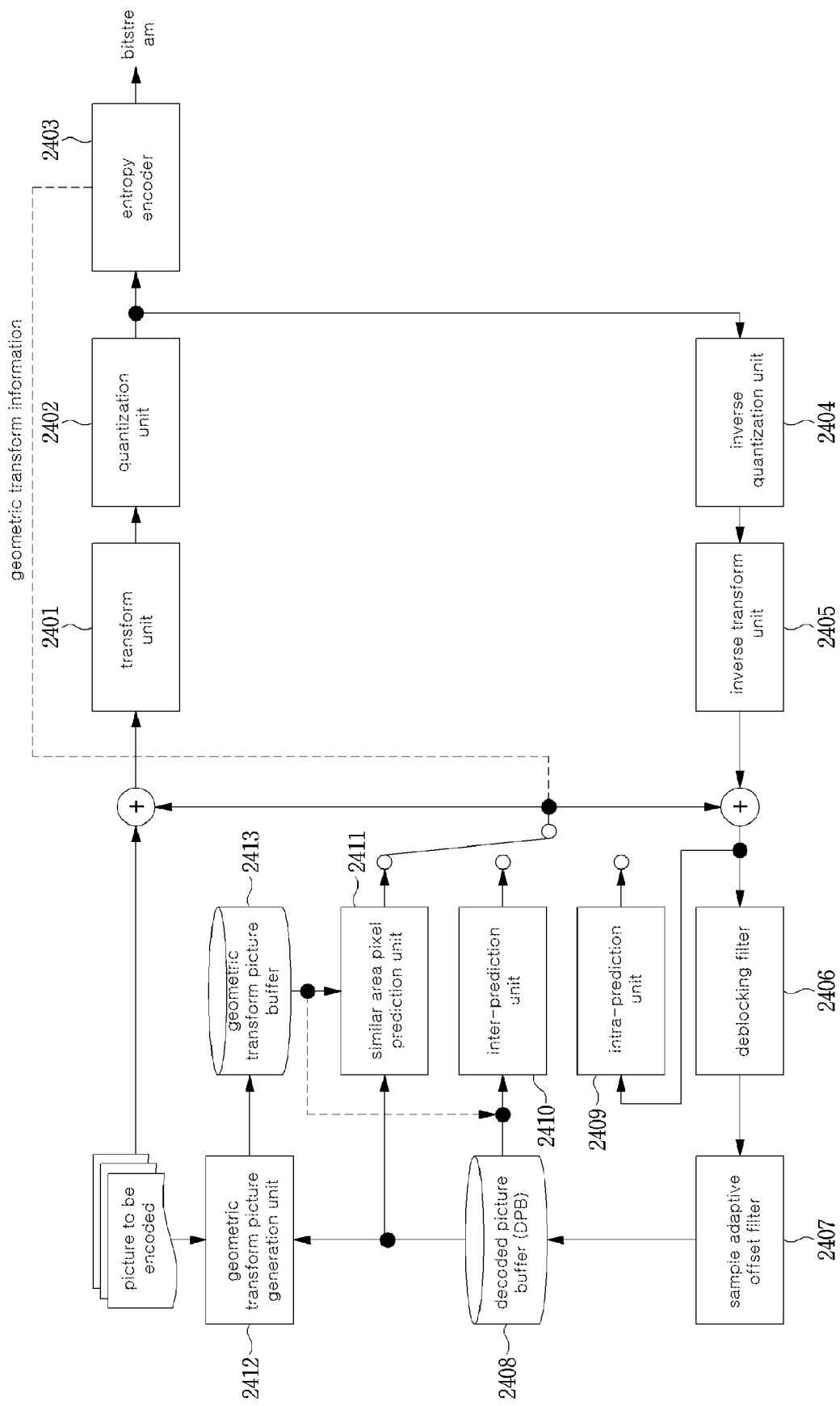
FIG. 24 is a view illustrating another embodiment of an encoder performing prediction using the pixel of the similar area in the reference picture.

FIG. 24 is a view illustrating another embodiment of an encoder performing prediction using the pixel of the similar area in the reference picture.

The encoder shown in FIG. 24 according to the present invention may include a transform unit 2401, a quantization unit 2402, an entropy encoder 2403, an inverse quantization unit 2404, an inverse transform unit 2405, a deblocking filter 2406, a sample adaptive offset filter 2407, a decoded picture buffer (DPB) 2408, an intra-prediction unit 2409, an inter-prediction unit 2410, a similar area pixel prediction unit 2411, a geometric transform picture generation unit 2412, and/or a geometric transform picture buffer 2413.

The similar area pixel prediction unit 2411 respectively receives a reference picture and/or a geometric-transform reference picture from the decoded picture buffer 2408 and/or the geometric transform picture buffer 2413, and performs prediction on the current picture. When the current picture is an inter picture, the similar area pixel prediction unit 2411 may perform Inter_DC prediction, Inter_Planar prediction, and/or Inter_Angular prediction by referring to the reference picture and/or the geometric-transform pixel of the similar area in the reference picture. In FIG. 24, the similar area pixel prediction unit 2411 is shown as a separate component, but may be included in the intra-prediction unit 2409 or the inter-prediction unit 2410. Alternatively, a function of the similar area pixel prediction unit 2411 may be realized by extending the configuration of the intra-prediction unit 2409 or the inter-prediction unit 2410.

Figure 25:
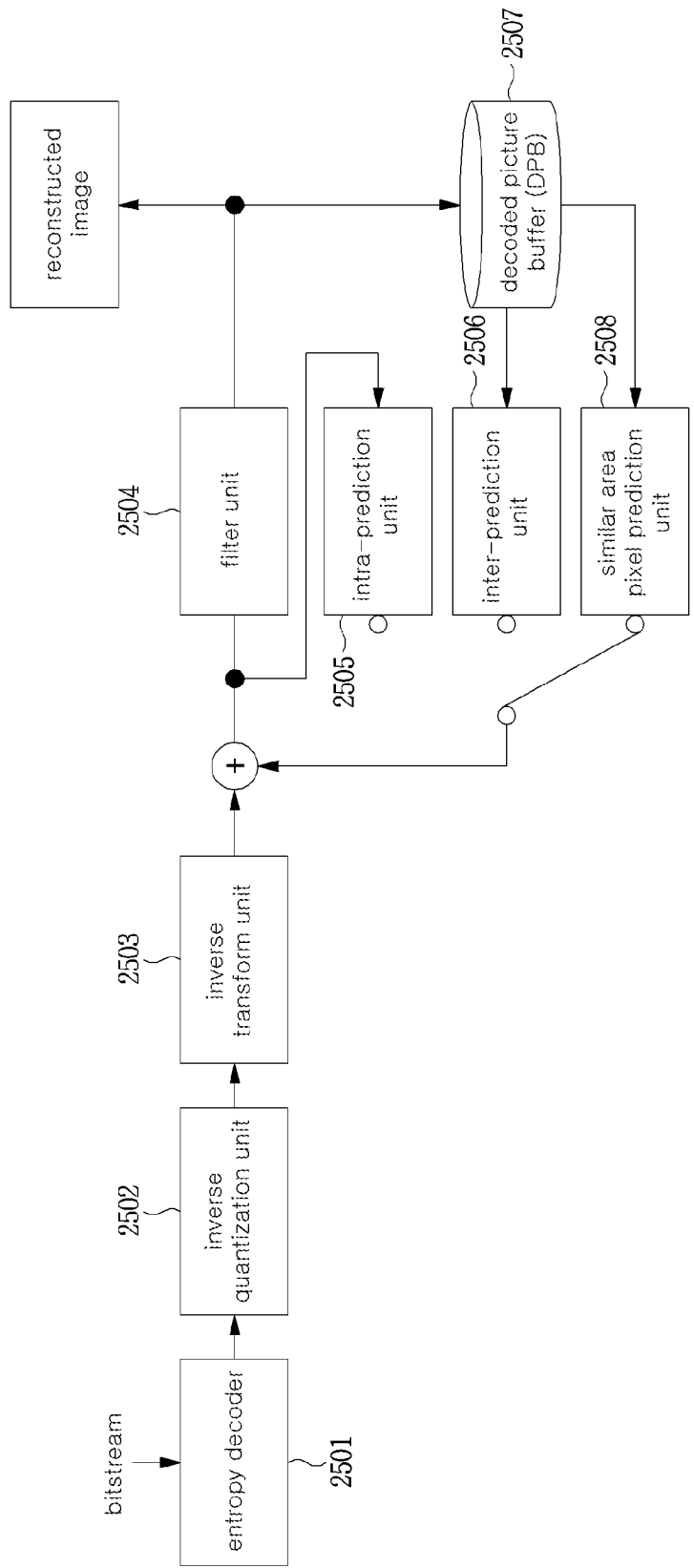
FIG. 25 is a view illustrating an embodiment of a decoder performing prediction using the pixel of the similar area in the reference picture.

FIG. 25 is a view illustrating an embodiment of a decoder performing prediction using the pixel of the similar area in the reference picture.

The decoder shown in FIG. 25 according to the present invention may include an entropy decoder 2501, an inverse quantization unit 2502, an inverse transform unit 2503, a filter unit 2504, an intra-prediction unit 2505, an inter-prediction unit 2506, a decoded picture buffer 2507, and/or a similar area pixel prediction unit 2508.

The similar area pixel prediction unit 2508 receives a reference picture from the decoded picture buffer 2507 and performs prediction on the current picture. The similar area pixel prediction unit 2508 may perform, based on prediction information received from the encoder, Inter_DC prediction, Inter_Planar prediction, and/or Inter_Angular prediction referring to the pixel of the similar area in the reference picture. In FIG. 25, the similar area pixel prediction unit 2508 is shown as a separate component, but may be included in the intra-prediction unit 2505 or the inter-prediction unit 2506. Alternatively, a function of the similar area pixel prediction unit 2508 may be realized by extending the configuration of the intra-prediction unit 2505 or the inter-prediction unit 2506.

Figure 26:
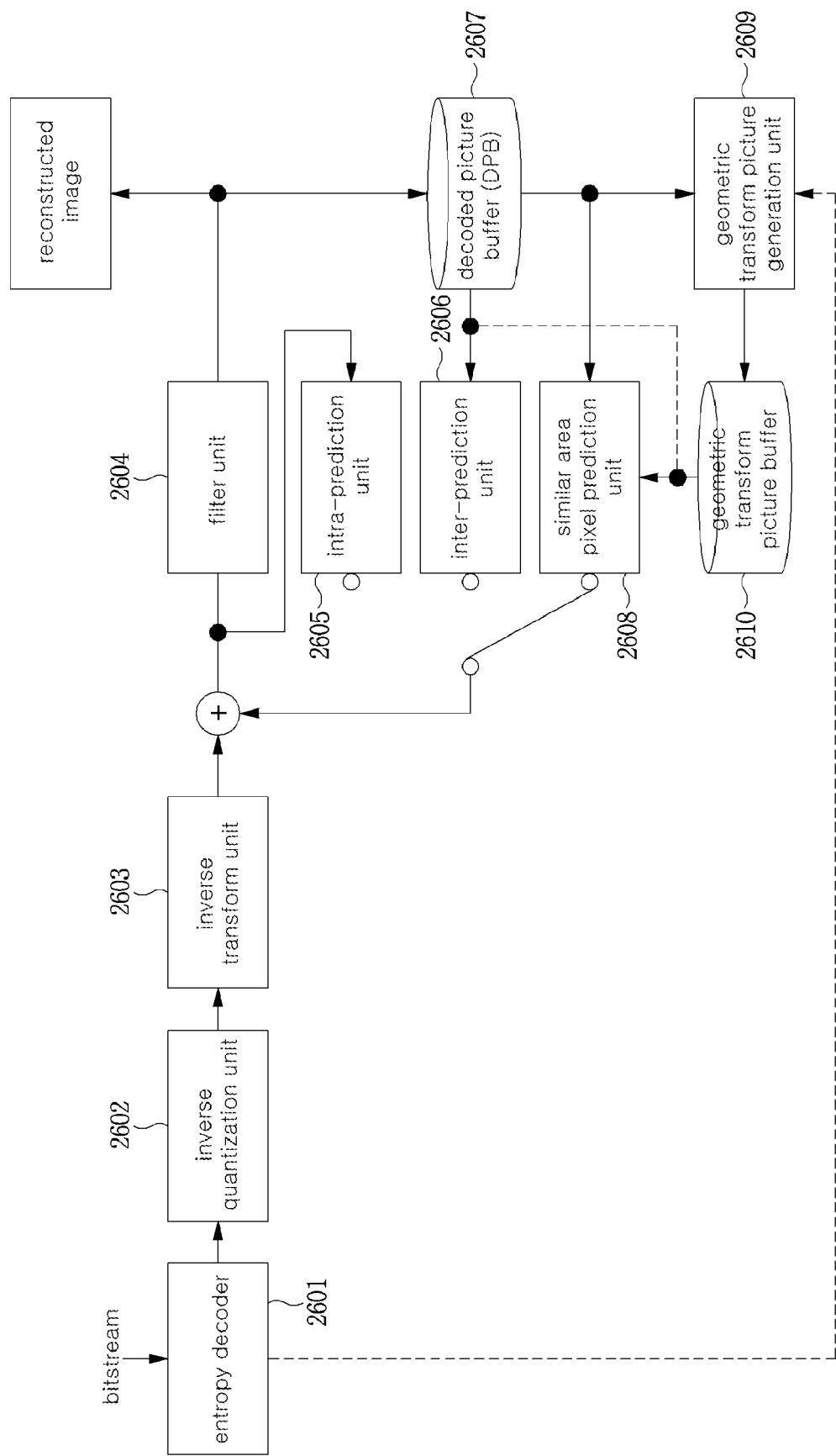
FIG. 26 is a view illustrating another embodiment of a decoder performing prediction using the pixel of the similar area in the reference picture.

FIG. 26 is a view illustrating another embodiment of a decoder performing prediction using the pixel of the similar area in the reference picture.

The decoder shown in FIG. 26 according to the present invention may include an entropy decoder 2601, an inverse quantization unit 2602, an inverse transform unit 2603, a filter unit 2604, an intra-prediction unit 2605, an inter-prediction unit 2606, a decoded picture buffer 2607, a similar area pixel prediction unit 2608, a geometric transform picture generation unit 2609, and/or a geometric transform picture buffer 2610.

The similar area pixel prediction unit 2608 respectively receives a reference picture and/or a geometric-transform reference picture from the decoded picture buffer 2607 and/or the geometric transform picture buffer 2610, and performs prediction on the current picture. The similar area pixel prediction unit 2608 may perform, based on prediction information received from the encoder, Inter_DC prediction, Inter_Planar prediction, and/or Inter_Angular prediction referring to the reference picture and/or the pixel of the similar area in the geometric-transform reference picture. In FIG. 26, the similar area pixel prediction unit 2608 is shown as a separate component, but may be included in the intra-prediction unit 2605 or the inter-prediction unit 2606.

Figure 27:
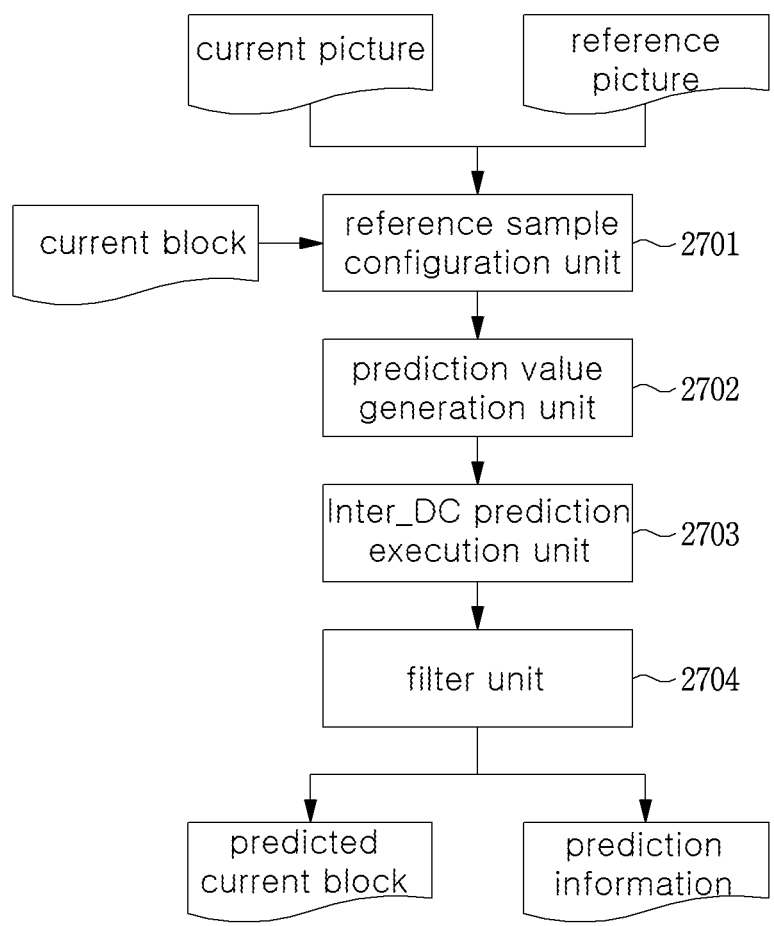
FIG. 27 is a view illustrating an embodiment of an apparatus for performing Inter_DC prediction in a similar area pixel prediction unit according to the present invention.

FIG. 27 is a view illustrating an embodiment of an apparatus for performing Inter_DC prediction in a similar area pixel prediction unit according to the present invention.

The similar area pixel prediction unit may include an Inter_DC prediction unit performing Inter_DC prediction. As shown in FIG. 27, the Inter_DC prediction unit may include a reference sample configuration unit 2701, a prediction value generation unit 2702, an Inter_DC prediction execution unit 2703, and/or a filter unit 2704.

The reference sample configuration unit 2701 receives the current picture, the reference picture, and/or the current block as input and configures a reference sample required in Inter_DC prediction. Information on the current block input to the reference sample configuration unit 2701 may be, for example, the position of the current block and/or the size of the current block in the current picture. The reference picture may be a picture reconstructed before the current picture and/or a geometric transform picture of a reference picture generated based on geometric transform information. The reference sample configuration unit 2701 determines the similar area in the reference picture, and configures the reference sample by using the pixel of the pre-reconstructed area in the current picture (e.g., the left and/or upper neighbor pixel of the current block) and the pixel of the similar area in the reference picture. The reference sample configuration unit 2701 may perform reference sample filtering if necessary.

The prediction value generation unit 2702 may calculate a prediction value based on the configured reference sample. In order to calculate the prediction value, an average or a weighted average of the configured reference samples may be used. The Inter_DC prediction execution unit 2703 may perform Inter_DC prediction on the current block based on the calculated prediction value.

The filter unit 2704 may perform filtering on an Inter_DC predicted block. For example, filtering may be performed on the boundary area or an inner area of the current block. For filtering, the pixel of the pre-reconstructed area in the current picture (e.g., the left and/or upper neighbor pixel of the current block), the pixel of the similar area in the reference picture, and/or the pixel of the predicted current block may be used.

The Inter_DC prediction unit may output the finally predicted current block and/or prediction information. The predicted current block may be a prediction block generated using the reference sample. The prediction information includes information generated through Inter_DC prediction, for example, information on a residual signal and/or the similar area.

Figure 28:
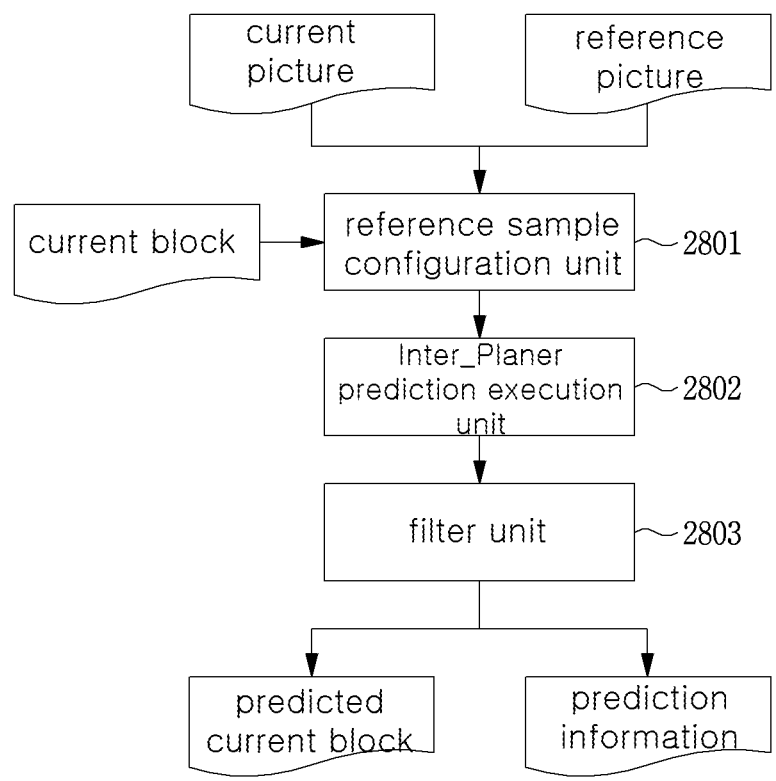
FIG. 28 is a view illustrating an embodiment of an apparatus for performing Inter_Planar prediction in a similar area pixel prediction unit according to the present invention.

FIG. 28 is a view illustrating an embodiment of an apparatus for performing Inter_Planar prediction in a similar area pixel prediction unit according to the present invention.

The similar area pixel prediction unit may include an Inter_Planar prediction unit performing Inter_Planar prediction. As shown in FIG. 28, the Inter_Planar prediction unit may include a reference sample configuration unit 2801, an Inter_Planar prediction execution unit 2802, and/or a filter unit 2803. The reference sample configuration unit 2801 may perform reference sample filtering if necessary.

In FIGS. 27 and 28, description of common input, output, and a configuration unit is the same, and difference will be mainly described below.

The prediction information, which is output of Intra_Planar prediction, includes information generated through Inter_Planar prediction, for example, information on a residual signal, on the similar area, and/or on a weighting.

The Inter_Planar prediction execution unit 2802 may predict the current block by using reference samples received from the reference sample configuration unit 2801. For Inter_Planar prediction, all pixels in the reference picture may be used as reference samples.

Figure 29:
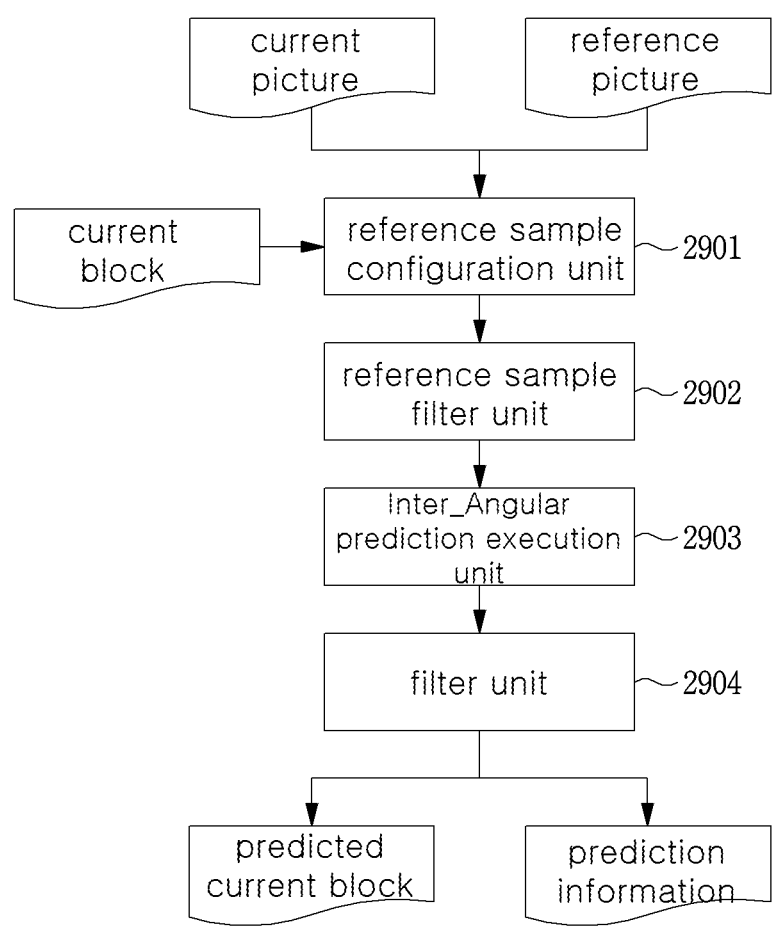
FIG. 29 is a view illustrating an embodiment of an apparatus for performing Inter_Angular prediction in a similar area pixel prediction unit according to the present invention.

FIG. 29 is a view illustrating an embodiment of an apparatus for performing Inter_Angular prediction in a similar area pixel prediction unit according to the present invention.

The similar area pixel prediction unit may include an Inter_Angular prediction unit performing Inter_Angular prediction. As shown in FIG. 29, the Inter_Angular prediction unit may include a reference sample configuration unit 2901, a reference sample filter unit 2902, an Inter_Angular prediction execution unit 2903, and/or a filter unit 2904.

In FIGS. 27 and 29, description of common input, output, and a configuration unit is the same, and difference will be mainly described below.

The prediction information, which is output of Intra_Angular prediction, includes information generated through Intra_Angular prediction, for example, information on a residual signal, on the similar area, and/or on a prediction direction.

The reference sample configuration unit 2901 may use all pixels in the reference picture and/or the geometric-transform reference picture as reference samples. Therefore, reference samples may be configured using all or some of pixels of the reference picture, and/or all or some of the right and lower pixels of the current block in the geometric-transform reference picture, and/or all or some of pixels in the current block.

The reference sample filter unit 2902 may perform filtering on the reference sample configured by the reference sample configuration unit 2901 so as to remove a high-frequency component existing in the configured reference sample. The reference sample filter unit 2902 may perform filtering on the reference sample by using all or some of pixels in the current picture and/or the geometric-transform reference picture.

Table 1 is an example of a syntax structure of a coding unit (CU) for signaling whether Inter_DC prediction has been performed.

TABLE 1

| coding_uint(x0, y0, log2CbSize) { | Descriptor |
|---|---|
| ... <br> Inter_DC_flag <br> if(Inter_DC_flag){ <br> Inter_DC_prediction (...) <br> ... | ae(v) |

Table 2 is an example of a syntax structure of a coding unit (CU) for signaling whether Inter_Planar prediction has been performed.

TABLE 2

| coding_uint(x0, y0, log2CbSize) { | Descriptor |
|---|---|
| ... <br> Inter_Planar_flag <br> if(Inter_Planar_flag){ <br> Inter_Planar_prediction (...) <br> ... | ae(v) |

Table 3 is an example of a syntax structure of a coding unit (CU) for signaling whether Inter_Angular prediction has been performed.

TABLE 3

| coding_uint(x0, y0, log2CbSize) { | Descriptor |
|---|---|
| ... <br> Inter_Angular_flag <br> if(Inter_Angular_flag){ <br> Inter_Angular_prediction (...) <br> ... | ae(v) |

Table 4 is an example of a syntax structure of a prediction unit (PU) for signaling whether Inter_DC prediction has been performed.

TABLE 4

| prediction_uint(x0, y0, nPbW, nPbH) { | Descriptor |
|---|---|
| ... <br> Inter_DC_flag <br> if(Inter_DC_flag){ <br> Inter_DC_prediction (...) <br> ... | ae(v) |

Table 5 is an example of a syntax structure of a prediction unit (PU) for signaling whether Inter_Planar prediction has been performed.

TABLE 5

| prediction_uint(x0, y0, nPbW, nPbH) { | Descriptor |
|---|---|
| ... <br> Inter_Planar_flag <br> if(Inter_Planar_flag){ <br> Inter_Planar_prediction (...) <br> ... | ae(v) |

Table 6 is an example of a syntax structure of a prediction unit (PU) for signaling whether Inter_Angular prediction has been performed.

TABLE 6

| prediction_uint(x0, y0, nPbW, nPbH) { | Descriptor |
|---|---|
| ... <br> Inter_Angular_flag <br> if(Inter_Angular_flag){ <br> Inter_Angular_prediction (...) <br> ... | ae(v) |

Table 7 is an example of a syntax structure of a coding unit for signaling whether prediction using the pixel of the similar area in the reference picture has been performed.

TABLE 7

| coding_uint(x0, y0, log2CbSize) { | Descriptor |
|---|---|
| ... <br> Using_SimilarArea_Refer_Mode_flag <br> if(Using_SimilarArea_Refer_Mode_flag){ <br> SimilarArea_Refer_prediction (...) <br> } <br> else{ <br> Intra_prediction (...) <br> ... | ae(v) |

Table 8 is an example of a syntax structure of a prediction unit for signaling whether prediction using the pixel of the similar area in the reference picture has been performed.

TABLE 8

| prediction_uint(x0, y0, nPbW, nPbH) { | Descriptor |
|---|---|
| ... <br> Using_SimilarArea_Refer_Mode_flag <br> if(Using_SimilarArea_Refer_Mode_flag){ <br> SimilarArea_Refer_prediction (...) <br> } <br> else{ <br> Intra_prediction (...) <br> ... | ae(v) |

As shown in tables 1 and 4, information (Inter_DC_flag) indicating whether Inter_DC prediction is performed on the current block may be signaled at the CU and/or PU level. The decoder may parse the Inter_DC_flag included in the CU or the PU, and may determine whether Inter_DC prediction is performed on the current block. For example, when the Inter_DC_flag indicates true, Inter_DC prediction may be performed on the current block. When the Inter_DC_flag indicates false, Intra_DC prediction may be performed on the current block.

As shown in tables 2 and 5, information (Inter_Planar_flag) indicating whether Inter_Planar prediction is performed on the current block may be signaled at the CU and/or PU level. The decoder may parse the Inter_Planar_flag included in the CU or the PU, and may determine whether Inter_Planar prediction is performed on the current block. For example, when the Inter_Planar_flag indicates true, Inter_Planar prediction is performed on the current block. When the Inter_Planar_flag indicates false, Intra_Planar prediction is performed on the current block.

As shown in tables 3 and 6, information (Inter_Angular_flag) indicating whether Inter_Angular prediction is performed on the current block may be signaled at the CU and/or PU level. The decoder may parse the Inter_Angular_flag included in the CU or the PU, and may determine whether Inter_Angular prediction is performed on the current block. For example, when the Inter_Angular_flag indicates true, Inter_Angular prediction is performed on the current block. When the Inter_Angular_flag indicates false, Intra_Angular prediction is performed on the current block.

As shown in tables 7 and 8, according to the present invention, information (Using_SimilarArea_Refer_Mode_flag) indicating whether prediction using the pixel of the similar area in the reference picture is performed may be signaled at the CU and/or PU level. In tables 7 and 8, an algorithm and/or a syntax structure according to the present invention may be defined as SimilarArea_Refer_prediction( ) The decoder may parse the Using_SimilarArea_Refer_Mode_flag, and may determine whether prediction using the pixel of the similar area in the reference picture is performed on the current block. For example, when the Using_SimilarArea_Refer_Mode_flag indicates true, the SimilarArea_Refer_prediction( ) may be decoded and prediction using the pixel of the similar area in the reference picture may be performed. When the Using_SimilarArea_Refer_Mode_flag indicates false, prediction using the pixel of the pre-reconstructed area in the current picture may be performed.

Tables 1 to 8 show the cases of signaling information (flag) on a prediction mode using the pixel of the similar area in the reference picture. However, as described above, information on the prediction mode may not signaled when the encoder and the decoder can derive the prediction mode of the current block through the same method without signaling the information.

Hereinafter, among methods of configuring a reference sample of intra prediction, reference sample padding and reference sample filtering will be described in detail.

Figure 30:
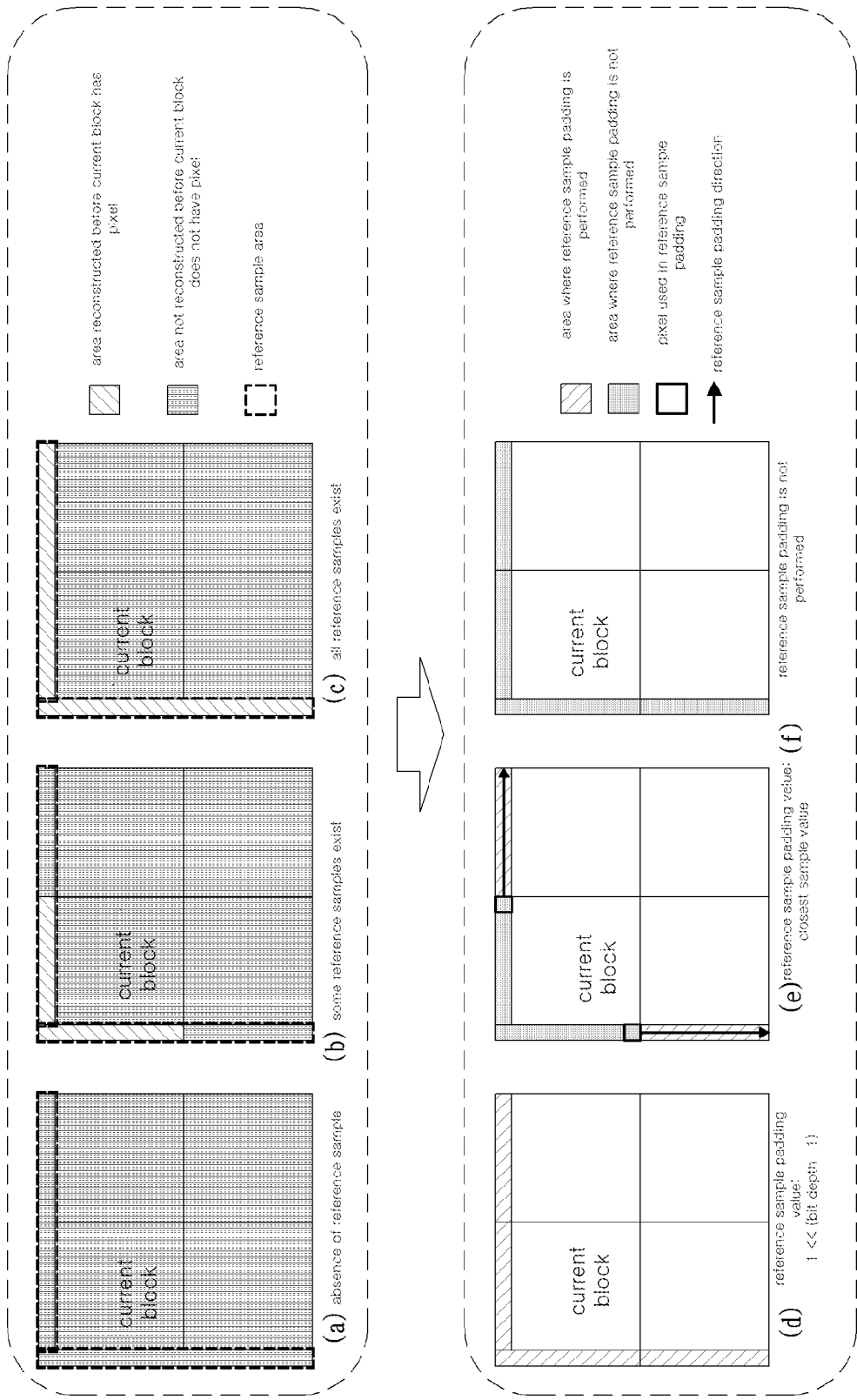
FIG. 30 is a view illustrating reference sample padding.

FIG. 30 is a view illustrating reference sample padding.

In FIG. 30(a), a reference pixel required in intra prediction of the current block does not exist. In this case, as shown in FIG. 30(d), reference sample padding may be performed with a value of 1<<(the bit depth−1). For example, when all reference pixel required in intra prediction of the current block do not exist in an 8-bit image, all reference samples may be padded using a pixel value of 1<<(8−1)=128.

In FIG. 30(b), some reference pixels required in intra prediction of the current block do not exist. In this case, as shown in FIG. 30(e), the reference samples may be padded using a reference pixel value of an area closest to the area where a reference pixel does not exist.

As shown in FIG. 30(c), when all reference pixels required in intra prediction of the current block exist, reference sample padding may not be performed as shown in FIG. 30(f).

FIG. 31 is a view illustrating reference sample filtering.

In FIG. 31, the bold broken line area is a reference sample area. FIG. 31(a) illustrates pixels of a reference sample before filtering the reference sample, and FIG. 31(b) illustrates pixels of a filtered reference sample. In FIG. 31(a), since the pixels in the reference sample area use reconstructed pixel values rather than original pixel values, errors may occur during a reconstruction process. Therefore, by performing filtering between reference samples, such as linear filtering, and bilinear filtering, errors contained in the reference sample may be mitigated. As shown in FIG. 31(b), after reference sample filtering, errors contained in the reference sample may be mitigated.

Since all or some of reference samples do not exist, in performing reference sample padding, when similarity between the original pixel of an area where a reference sample does not exist and a pixel used in reference sample padding is low, accuracy of intra prediction may decrease. Considering this case, reference sample padding may be performed using the pixel of the reference picture.

Figure 32:
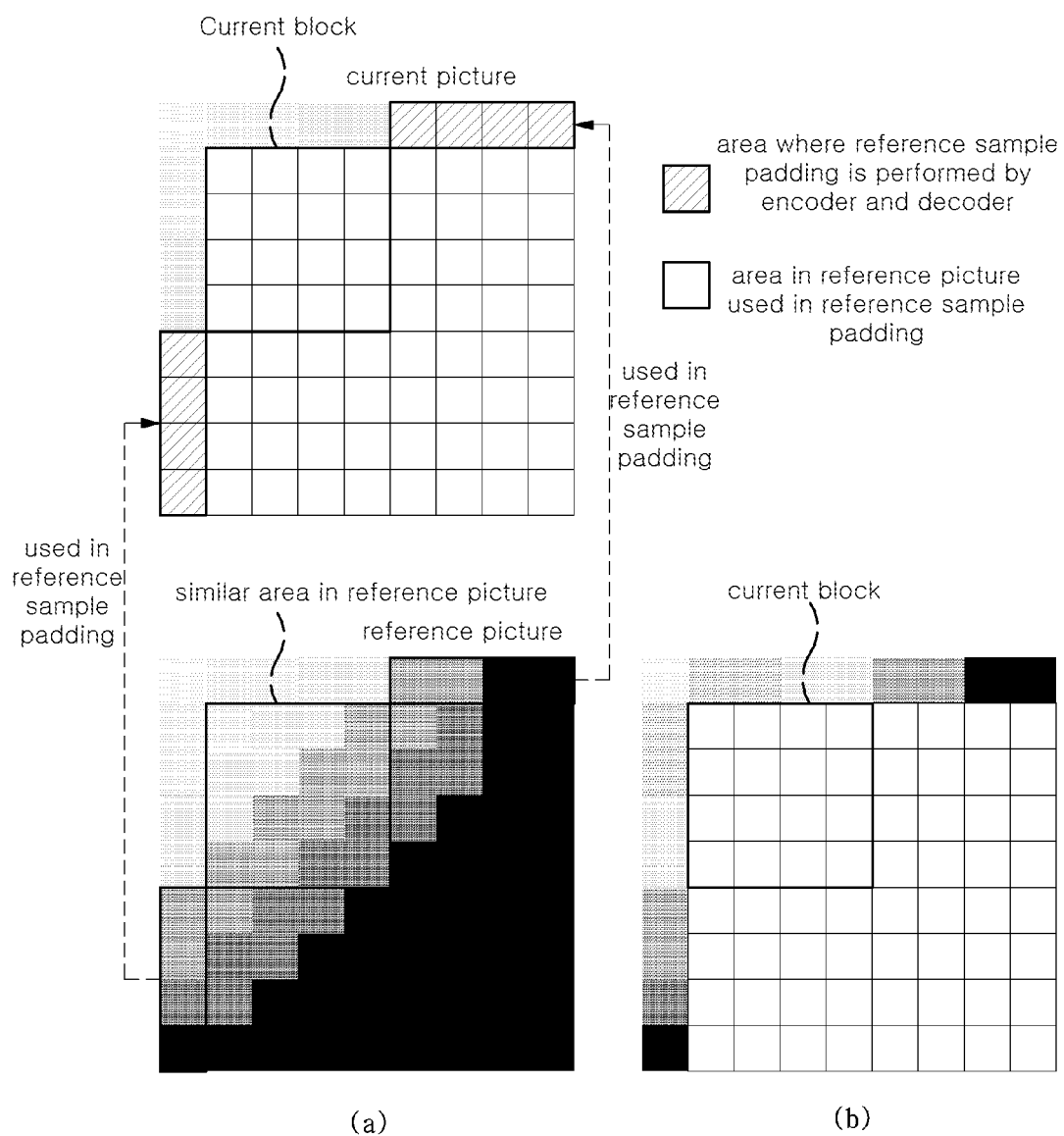
FIG. 32 is a view illustrating a method of performing reference sample padding using the pixel of the reference picture when some reference pixels of intra prediction do not exist.

FIG. 32 is a view illustrating a method of performing reference sample padding using the pixel of the reference picture when some reference pixels of intra prediction do not exist. In the example shown in FIG. 32, reference sample padding is performed on lower left and upper right areas of the current block. However, without being limited thereto, for example, reference sample padding may be performed on at least one of left, lower left, upper left, upper, and upper right areas.

Figure 33:
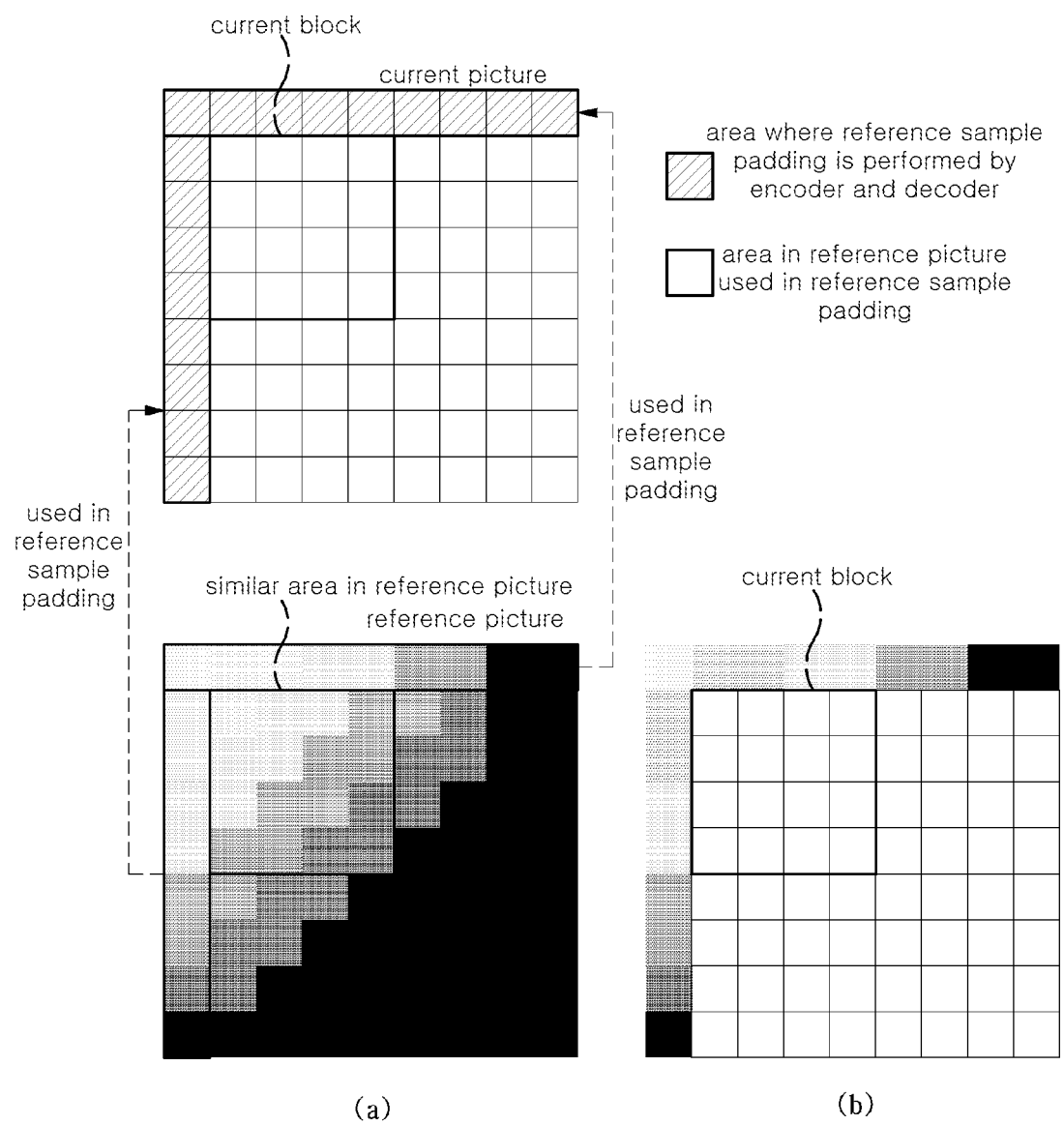
FIG. 33 is a view illustrating a method of performing reference sample padding using the pixel of the reference picture when all reference pixels of intra prediction do not exist.

FIG. 33 is a view illustrating a method of performing reference sample padding using the pixel of the reference picture when all reference pixels of intra prediction do not exist.

As shown in FIG. 32(a) and FIG. 33(a), when a reference pixel required in intra prediction of the current block does not exist, the reference pixel that does not exist may be padded using the pixel of the reference picture. For example, the similar area in the reference picture is specified, and the pixel in the reference picture, such as a neighbor pixel adjacent to the specified similar area and/or the pixel in the similar area, may be used so as to perform reference sample padding. The specifying of the similar area in the reference picture may be performed by the above-described method. That is, the similar area in the reference picture may be specified by using a motion vector or pixel distribution near the current block, or encoding/decoding information on the position of the similar area. Also, the geometric-transform reference picture may be used instead of the reference picture.

FIG. 32(b) and FIG. 33(b) illustrate reference pixels after reference sample padding using the pixel of the reference picture. A reference pixel closer to the original image may be generated and accuracy of prediction may be enhanced, compared to the case when padding is performed using the closest available pixel value or a bit depth-based pixel value.

As explained above with reference to FIGS. 32 and 33, a process of padding a reference sample required in intra prediction by using the pixel of the reference picture is referred to as "inter reference sample padding" below. In contrast, reference sample padding described with reference to FIG. 30 is referred to as "intra reference sample padding" below.

Reference sample padding according to the present invention may be adaptively performed depending on the type of the current picture. For example, when the current picture is an inter picture, inter reference sample padding may be performed. When the current picture is not the inter picture, intra reference sample padding may be performed.

Also, reference sample padding according to the present invention may be performed selectively as one of inter reference sample padding and intra reference sample padding. Alternatively, reference sample padding may be performed in a combination thereof.

Figure 34:
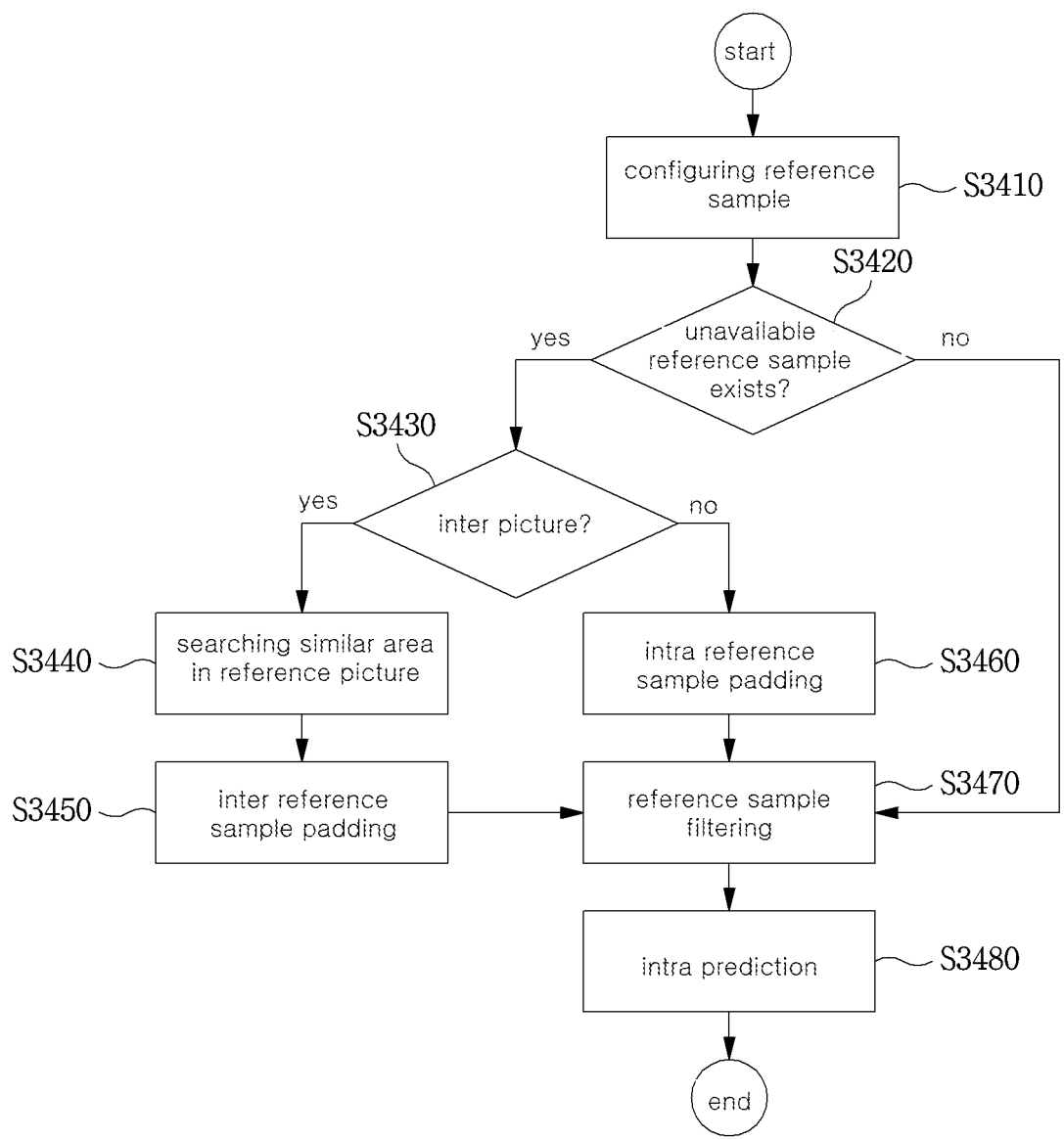
FIG. 34 is a view illustrating an embodiment of reference sample padding according to the present invention.

FIG. 34 is a view illustrating an embodiment of reference sample padding according to the present invention.

First, at step S3410, a reference sample may be configured. At step S3420, whether an area where a reference sample does not exist, i.e., an unavailable reference sample, exists may be determined. When the unavailable reference sample exists, whether the current picture is an inter picture may be determined at step S3430. When the current picture is the inter picture, the similar area in the reference picture is searched at step S3440 and inter reference sample padding is performed at step S3450. When the current picture is not the inter picture, intra reference sample padding is performed at step S3460.

When the unavailable reference sample does not exist or reference sample padding is completed, reference sample filtering is performed at step S3470, and then, intra prediction is performed at step S3480.

Figure 35:
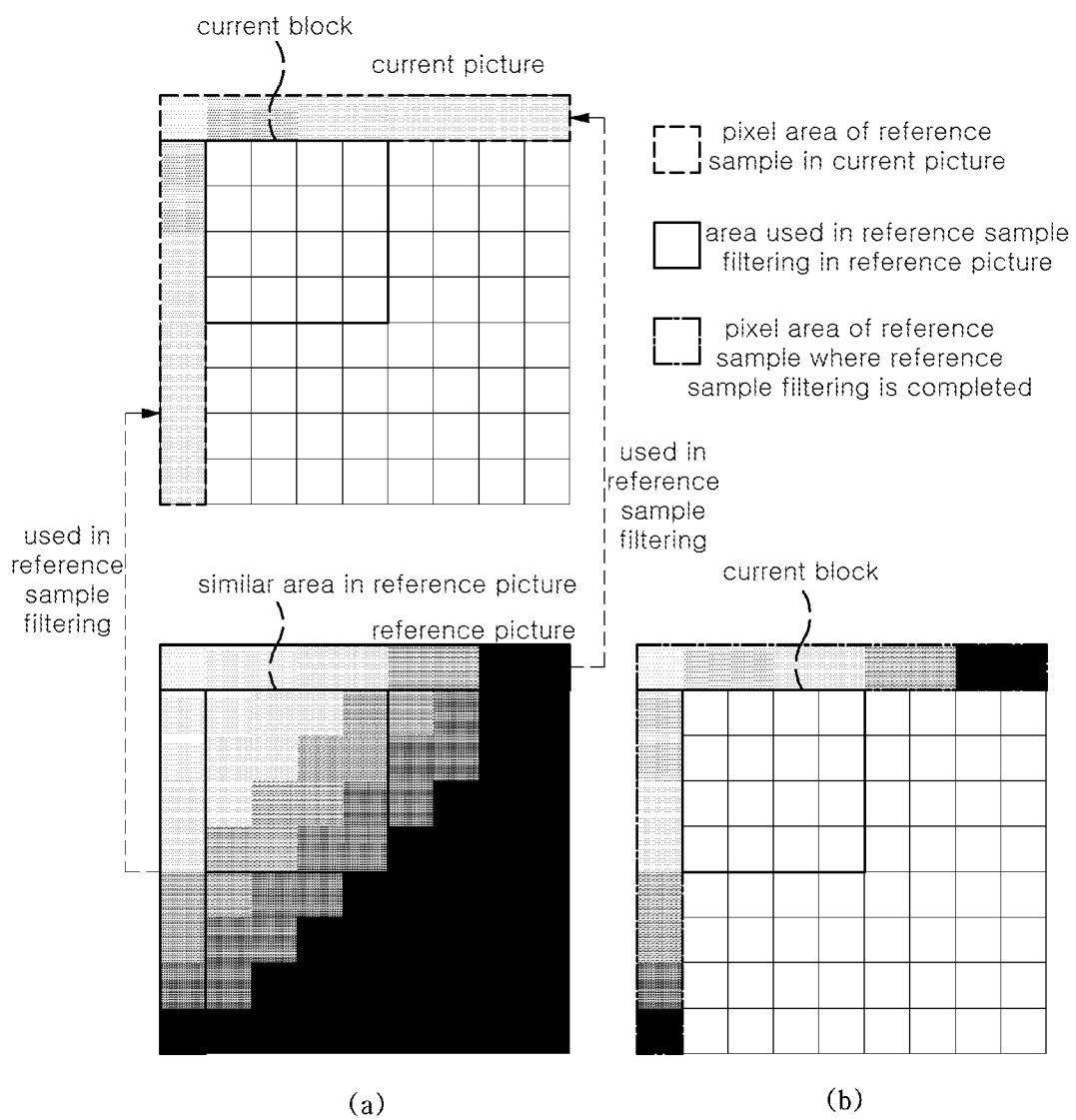
FIG. 35 is a view illustrating reference sample filtering using the pixel of the reference picture.

FIG. 35 is a view illustrating reference sample filtering using the pixel of the reference picture.

FIG. 35(*a*) illustrates an example of pixels in the reference picture used in reference sample filtering.

FIG. 35(*b*) illustrates an example of a reference sample after reference sample filtering.

As shown in FIG. 35(*a*), the similar area in the reference picture is specified, and the pixel in the reference picture, such as a neighbor pixel adjacent to the specified similar are and/or the pixel in the similar area, is used so as to perform reference sample padding. The specifying of the similar area in the reference picture may be performed by the above-described method. Also, the geometric-transform reference picture may be used instead of the reference picture.

As described above with reference to FIG. 35, a process of filtering the reference sample required in intra prediction by using the pixel of the reference picture is referred to as "inter reference sample filtering" below. In contrast, reference sample filtering described with reference to FIG. 31 is referred to as "intra reference sample filtering" below.

Figure 36:
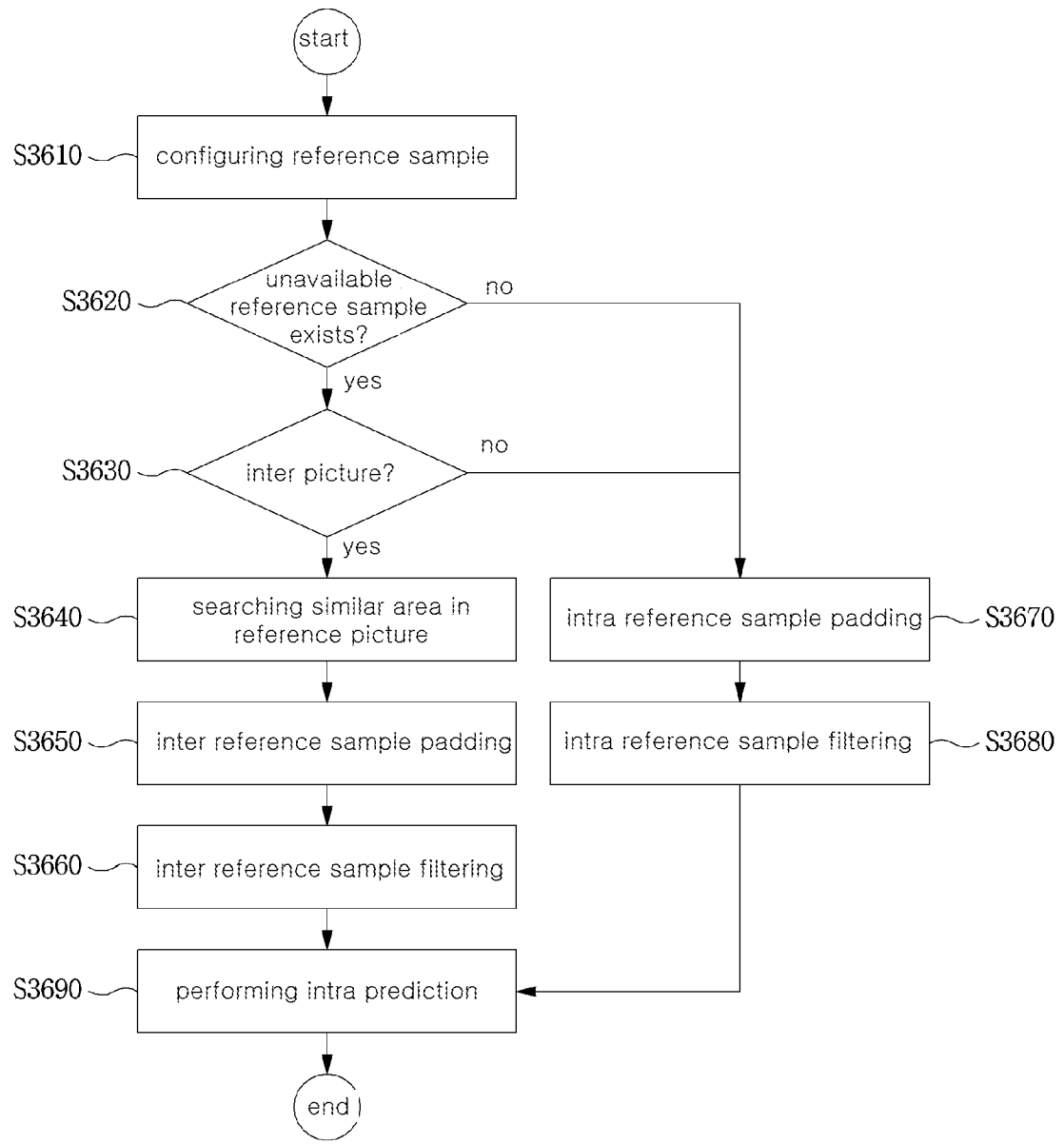
FIG. 36 is a view illustrating an embodiment of reference sample filtering according to the present invention.

FIG. 36 is a view illustrating an embodiment of reference sample filtering according to the present invention.

First, at step S3610, the reference sample may be configured. At step S3620, whether the unavailable reference sample exists may be determined. When the unavailable reference sample exists, whether the current picture is the inter picture is determined at step S3630. Step S3630 may or may not be performed selectively. When the current picture is the inter picture, the similar area in the reference picture is searched at step S3640, inter reference sample padding at step S3650 and inter reference sample filtering at step S3660 are performed, and intra prediction is performed at step S3690. When the current picture is not the inter picture, intra reference sample padding at step S3670 and intra reference sample filtering at step S3680 are performed, and intra prediction is performed at step S3690.

Filters used in inter reference sample filtering and intra reference sample filtering may be the same or different. A different filter means that at least one of the number of taps of the filter, a filter coefficient, a filtering direction, and a filter type is differ. One of the filters may be a bidirectional filter in vertical and horizontal directions, and only one of inter reference sample padding at step S3650 and inter reference sample filtering at step S3660 may be performed. For example, when the unavailable reference sample exists, intra reference sample padding may be performed. When the current picture is the inter picture, searching of the similar area in the reference picture and inter reference sample filtering may be performed.

Alternatively, after inter reference sample padding, intra reference sample filtering may or may not be performed.

Figure 37:
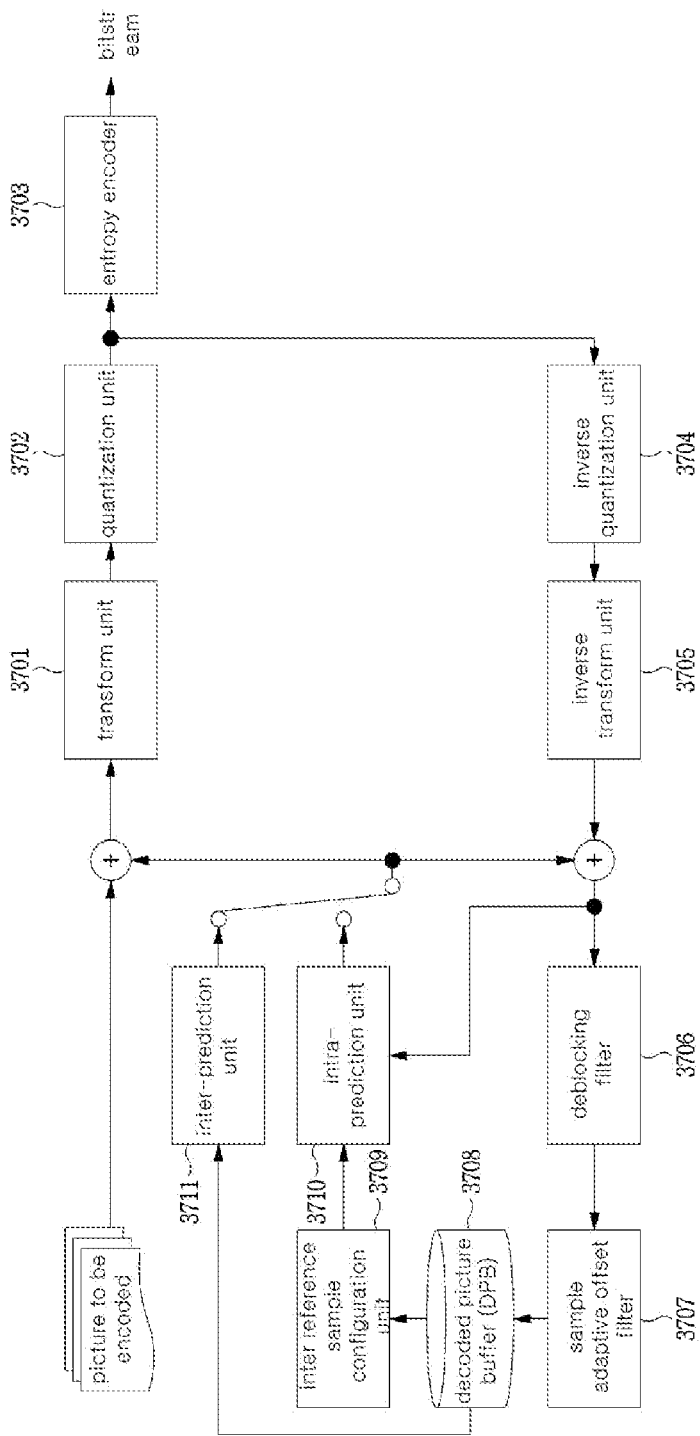
FIG. 37 is a view illustrating an embodiment of an encoder that performs inter reference sample padding and/or inter reference sample filtering according to the present invention.

FIG. 37 is a view illustrating an embodiment of an encoder that performs inter reference sample padding and/or inter reference sample filtering according to the present invention.

The encoder shown in FIG. 37 according to the present invention may include a transform unit 3701, a quantization unit 3702, an entropy encoder 3703, an inverse quantization unit 3704, an inverse transform unit 3705, a deblocking filter 3706, a sample adaptive offset filter 3707, a decoded picture buffer (DPB) 3708, an inter reference sample configuration unit 3709, an intra-prediction unit 3710, and/or an inter-prediction unit 3711.

The inter reference sample configuration unit 3709 receives the reference picture from the decoded picture buffer 3708 and configures the reference sample required in prediction of the current block. When the current picture is the inter picture, the inter reference sample configuration unit 3709 may configure a reference sample be referring to the pixel of the similar area in the reference picture. The inter reference sample configuration unit 3709 may be combined with various application encoders, such as a scalable video encoder, an encoder capable of parallel processing, etc., and may be provided in a structure different from a structure shown in FIG. 37 depending on the application order.

Figure 38:
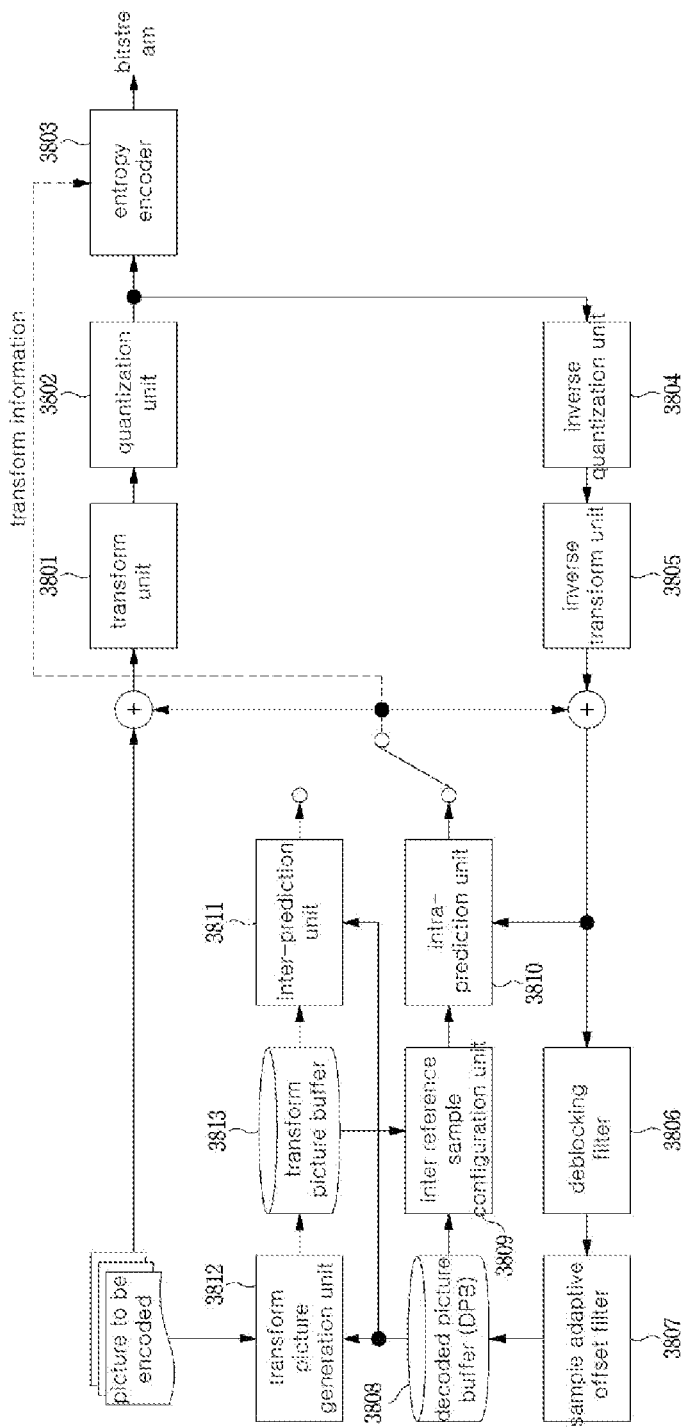
FIG. 38 is a view illustrating another embodiment of an encoder that performs inter reference sample padding and/or inter reference sample filtering according to the present invention.

FIG. 38 is a view illustrating another embodiment of an encoder that performs inter reference sample padding and/or inter reference sample filtering according to the present invention.

The encoder shown in FIG. 38 according to the present invention may include a transform unit 3801, a quantization unit 3802, an entropy encoder 3803, an inverse quantization unit 3804, an inverse transform unit 3805, a deblocking filter 3806, a sample adaptive offset filter 3807, a decoded picture buffer (DPB) 3808, an inter reference sample configuration unit 3809, an intra-prediction unit 3810, an inter-prediction unit 3811, a transform picture generation unit 3812, and/or a transform picture buffer 3813.

The inter reference sample configuration unit 3809 receives the reference picture and/or the transform picture from the decoded picture buffer 3808 and/or the transform picture buffer 3813, and configures the reference sample required in prediction. When the current picture is the inter picture, the inter reference sample configuration unit 3809 may configured the reference sample by referring to the pixel of the similar area in the reference picture and/or the transform picture. The inter reference sample configuration unit 3809 may be combined with various application encoders, such as a scalable video encoder, an encoder capable of parallel processing, etc., and may be provided in a structure different from a structure shown in FIG. 38 depending on the application order.

Information on whether inter reference sample padding and/or filtering is applied and/or prediction information according to the present invention may be signaled from the encoder to the decoder.

Figure 39:
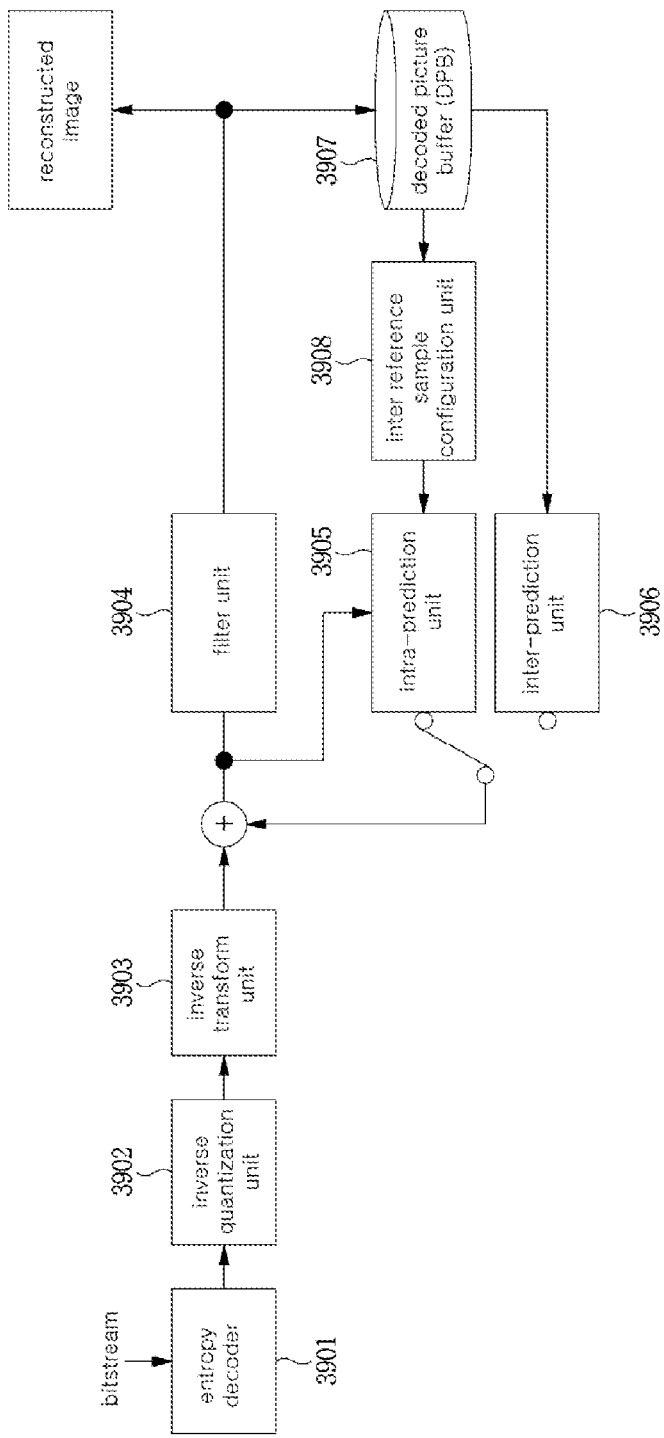
FIG. 39 is a view illustrating an embodiment of a decoder that performs inter reference sample padding and/or inter reference sample filtering according to the present invention.

FIG. 39 is a view illustrating an embodiment of a decoder that performs inter reference sample padding and/or inter reference sample filtering according to the present invention.

The decoder shown in FIG. 39 according to the present invention may include an entropy decoder 3901, an inverse quantization unit 3902, an inverse transform unit 3903, a filter unit 3904, an intra-prediction unit 3905, an inter-prediction unit 3906, a decoded picture buffer 3907, and/or an inter reference sample configuration unit 3908.

The inter reference sample configuration unit 3908 receives the reference picture from the decoded picture buffer 3907, and configures the reference sample required in prediction in the same manner as the encoder. The inter reference sample configuration unit 3908 may be provided separate from the inter-prediction unit 3906 and the intra-prediction unit 3905, or may be provided as being included in at least one of the inter-prediction unit and the intra-prediction unit. Also, the inter reference sample configuration unit 3908 may be combined with various application decoders, such as a scalable video decoder, a decoder capable of parallel processing, etc., and may be provided in a structure different from a structure shown in FIG. 39 depending on the application order.

Figure 40:
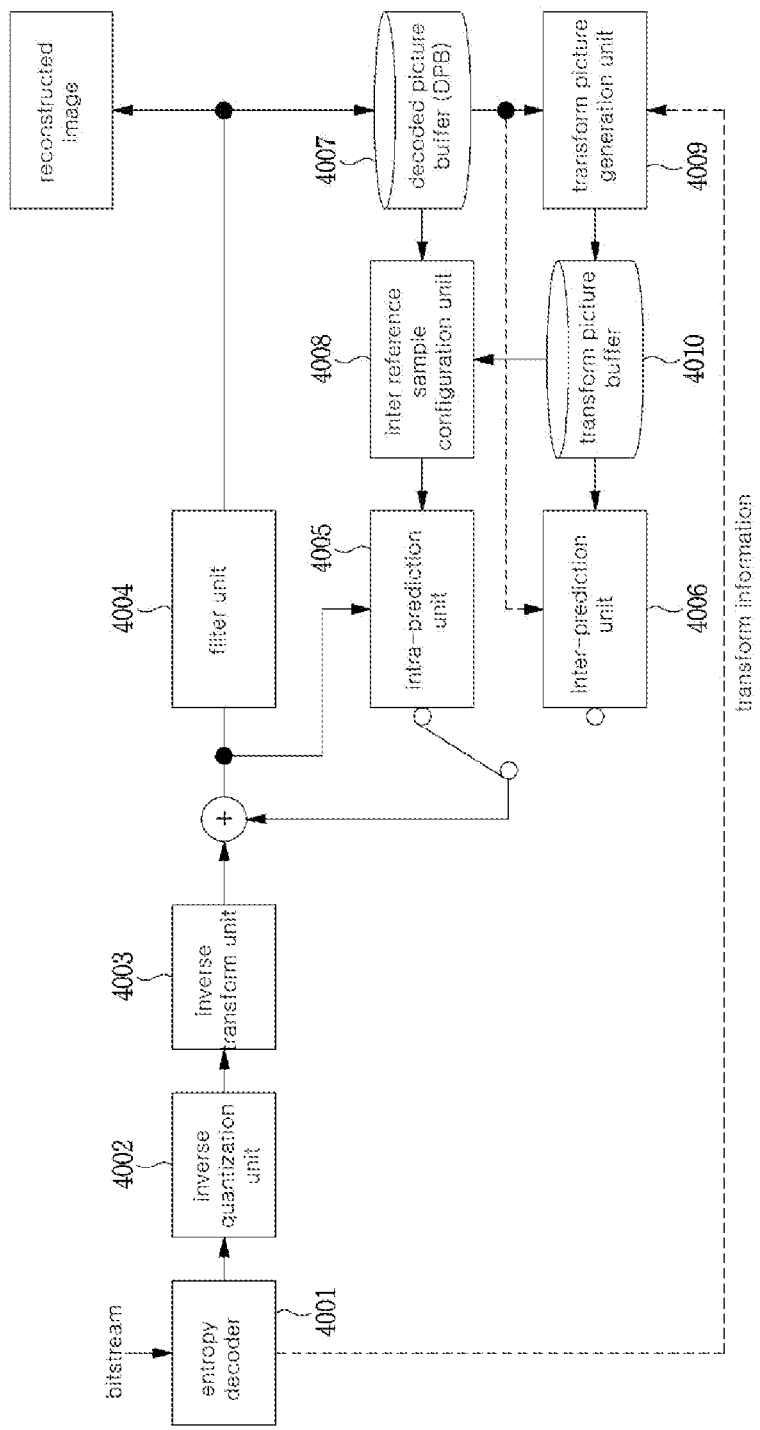
FIG. 40 is a view illustrating another embodiment of a decoder that performs inter reference sample padding and/or inter reference sample filtering according to the present invention.

FIG. 40 is a view illustrating another embodiment of a decoder that performs inter reference sample padding and/or inter reference sample filtering according to the present invention.

The decoder shown in FIG. 40 according to the present invention may include an entropy decoder 4001, an inverse quantization unit 4002, an inverse transform unit 4003, a filter unit 4004, an intra-prediction unit 4005, an inter-prediction unit 4006, a decoded picture buffer 4007, an inter reference sample configuration unit 4008, a transform picture generation unit 4009, and/or a transform picture buffer 4010.

The inter reference sample configuration unit 4008 receives the reference picture and/or the transform reference picture from the decoded picture buffer 4007 and/or the transform picture buffer 4010, and configures the reference sample required in prediction in the same manner as the encoder. The inter reference sample configuration unit 4008 may be provided separate from the inter-prediction unit 4006 and the intra-prediction unit 4005, or may be provided as being included in at least one of the inter-prediction unit and the intra-prediction unit. Also, the inter reference sample configuration unit 4008 may be combined with various application decoders, such as a scalable video decoder, an decoder capable of parallel processing, etc., and may be provided in a structure different from a structure shown in FIG. 40 depending on the application order.

The decoder according to the present invention may receive information on whether inter reference sample padding and/or filtering is applied and/or prediction information from the encoder.

Figure 41:
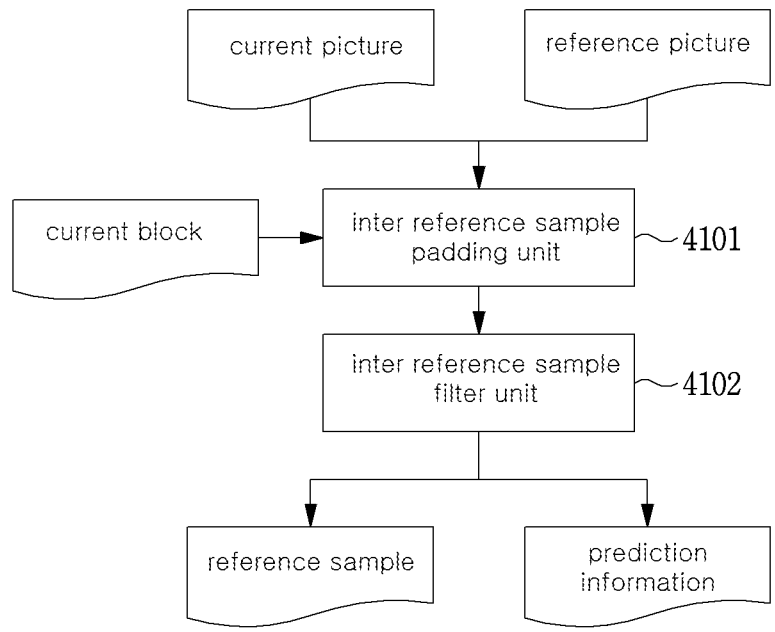
FIG. 41 is a view illustrating an embodiment of a detailed configuration of the inter reference sample configuration unit according to the present invention.

FIG. 41 is a view illustrating an embodiment of a detailed configuration of the inter reference sample configuration unit according to the present invention.

The inter reference sample configuration unit according to the present invention may include an inter reference sample padding unit 4101 and/or an inter reference sample filter unit 4102.

Input of the inter reference sample configuration unit is the current picture, the reference picture, and/or the current block. The current block may be information on the position and/or size of the current block in the current picture. The reference picture may be a picture reconstructed before the current picture and/or a geometric transform picture.

Output of the inter reference sample configuration unit is the reference sample and/or prediction information. The reference sample is information on the reference pixel used in intra prediction. The prediction information may be information on whether inter reference sample padding is used, information on whether inter reference sample filtering is used, and/or information on the similar area.

The inter reference sample padding unit 4101 may determine the similar area in the reference picture, and may configure the reference sample by using the reference sample of the current block in the current picture and/or the pixel of the similar area in the reference picture. The inter reference sample filter unit 4102 may filter the reference sample by using the reference sample of the current block in the current picture and/or the pixel of the similar area in the reference picture.

In the embodiment explained with reference to FIG. 41, when the encoder and the decoder are able to determine whether inter reference sample padding and/or inter reference sample filtering is performed in a determined method, relevant prediction information may not be signaled.

Hereinafter, generation of the geometric-transform reference picture will be described in detail. In the description, the reference picture may include or may be replaced with the geometric-transform reference picture. Also, in the description, the geometric-transform reference picture may be a geometric transform picture, a transform reference picture, a transform picture, a geometric transform video, a transform reference video, a transform video, etc. Also, in the description, transform information may be geometric transform information.

FIGS. 42 to 52 are diagrams showing a method of generating a geometric modified image by geometrically modifying an image.

A geometric modification of an image may refer to geometrically modifying light information of the image. The light information may refer to luminance, color, or chrominance of each point of the image. Alternatively, the light information may refer to a pixel value in a digital image. The geometric modification may refer to a parallel movement of each point within an image, a rotation of an image, a size change of an image, etc.

FIGS. 42 to 46 are diagrams respectively showing a geometric modification of an image according to the present invention. (x, y) of each figure refers to a point of an original image before the modification. (x', y') refers to a point that corresponds to the point (x, y) after the modification. Herein, the corresponding point refers to a point in which light information of the (x, y) is moved by the geometric modification.

Figure 42:
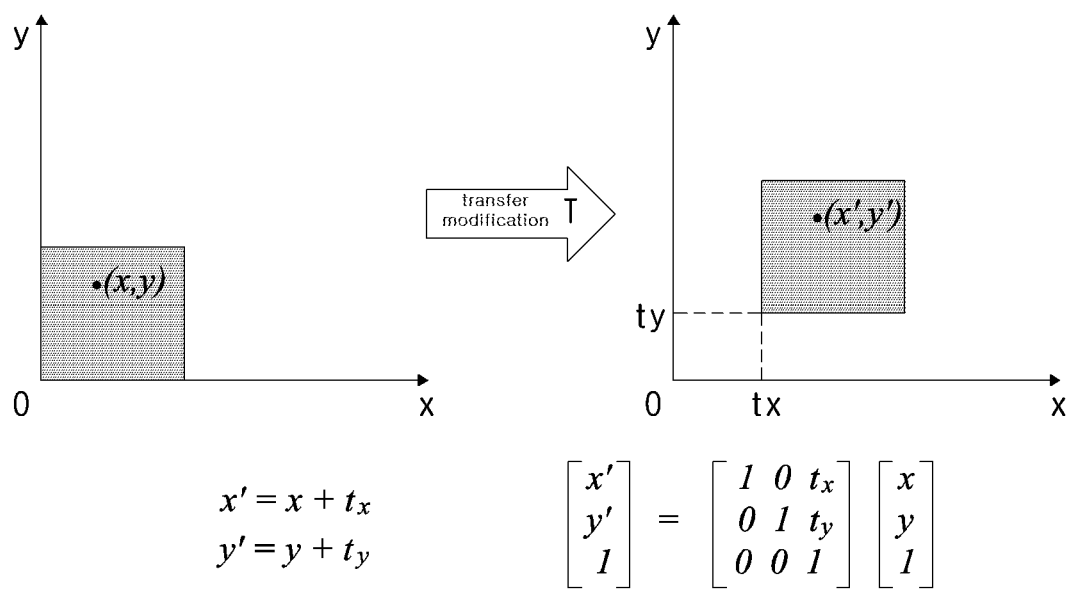
FIG. 42 is a diagram showing a transfer modification of an embodiment of the geometric modification of the image according to the present invention.

FIG. 42 is a diagram showing a transfer modification of an embodiment of the geometric modification of the image according to the present invention.

In FIG. 42, tx refers to a displacement of each point that has transferred in an x-axis, and ty refers to a displacement of each point that has transferred in a y-axis. Therefore, a point (x', y') within the image is derived by adding tx and ty to a point (x, y) that is a point within the image before the modification. The transform modification may be represented in a matrix shown in FIG. 42.

Figure 43:
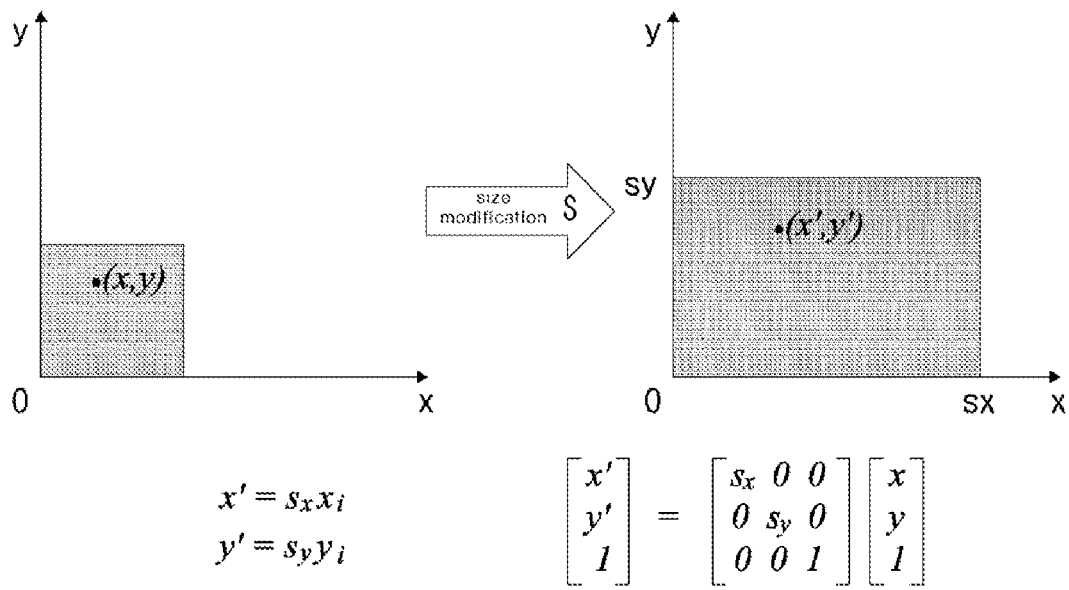
FIG. 43 is a diagram showing a size modification of an embodiment of a geometrical modification of an image according to the present invention.

FIG. 43 is a diagram showing a size modification of an embodiment of a geometrical modification of an image according to the present invention.

In FIG. 43, sx refers to a size modification multiple in a direction of an x-axis and sy refers to a size modification multiple in a direction of a y-axis. The size modification multiple may refer to a size ratio of an image before the modification to an image after the modification. When size modification multiple is equal to 1, it means that a size of the image before the modification is equal to a size of the image after the modification. When size modification multiple is larger than 1, it means that a size of the image is enlarged after the modification. When size modification multiple is smaller than 1, it means that a size of the image is reduced after the modification. The size modification multiple always has a value greater than 0. Therefore, a point (x', y') within the size-modified image after the modification is derived by multiplying sx and sy to a point (x, y) within the image before the modification. The size modification may be represented in a matrix shown in FIG. 43.

Figure 44:
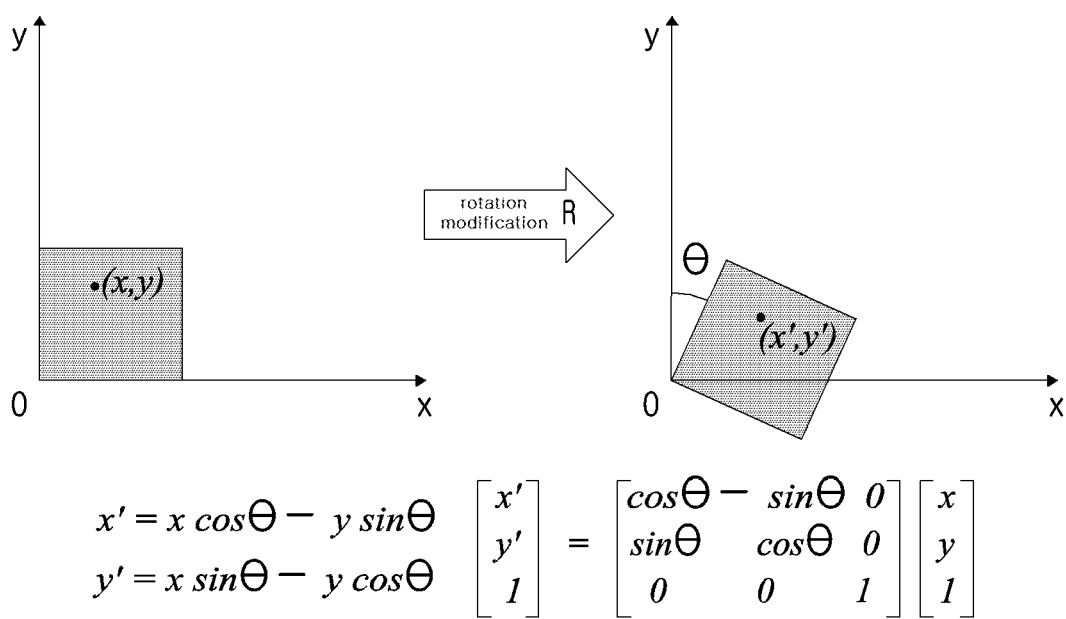
FIG. 44 is a diagram showing a rotation modification of an embodiment of a geometrical modification of an image according to the present invention.

FIG. 44 is a diagram showing a rotation modification of an embodiment of a geometrical modification of an image according to the present invention.

In FIG. 44, θ refers to a rotation angle of an image. In the embodiment of FIG. 44, a rotation is performed centering around a point (0, 0) of an image before the modification. A point (x', y') within the rotation-modified image after the modification may be derived by using θ and a trigonometrical function. The rotation modification may be represented in a matrix shown in FIG. 44.

Figure 45:
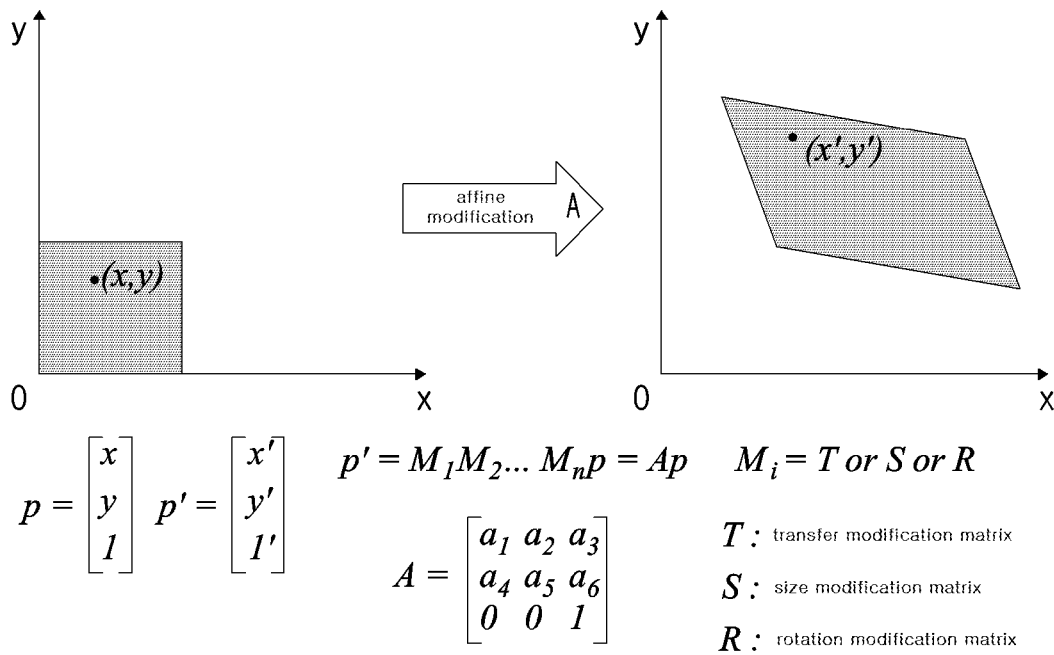
FIG. 45 is a diagram showing an affine modification of an embodiment of a geometrical modification of an image according to the present invention.

FIG. 45 is a diagram showing an affine modification of an embodiment of a geometrical modification of an image according to the present invention.

The affine modification refers to the case where a transfer modification, a size modification, and a rotation modification are complexly performed. A geometric modification of the affine modification may be varied according to orders of the transfer modification, the size modification, and/or the rotation modification that are applied to the image. The image may be modified in the form of tilting as well as the transfer modification, the size modification, and the rotation modification according to the order of applying among a plurality of the modifications composing the affine modification and complex of each of the modifications.

In FIG. 45, $M_t$ may be a 3×3 matrix for a transfer modification, a size modification, or a rotation modification. According to an order of modifications composing the affine modification, a 3×3 matrix may be obtained by matrix product each of matrixes for the modifications by each other. In FIG. 45, matrix A may correspond to a 3×3 matrix obtained by matrix product a matrix $M_1$ to matrix $M_n$. The matrix A may consist of elements a1 to a6. A matrix p is a point within an image before the modification that is represented in a matrix. A matrix p' is a point within an image after the modification and corresponds to the point p within the image before the modification. Therefore, the affine modification may be represented as a matrix equation p'=Ap.

Figure 46:
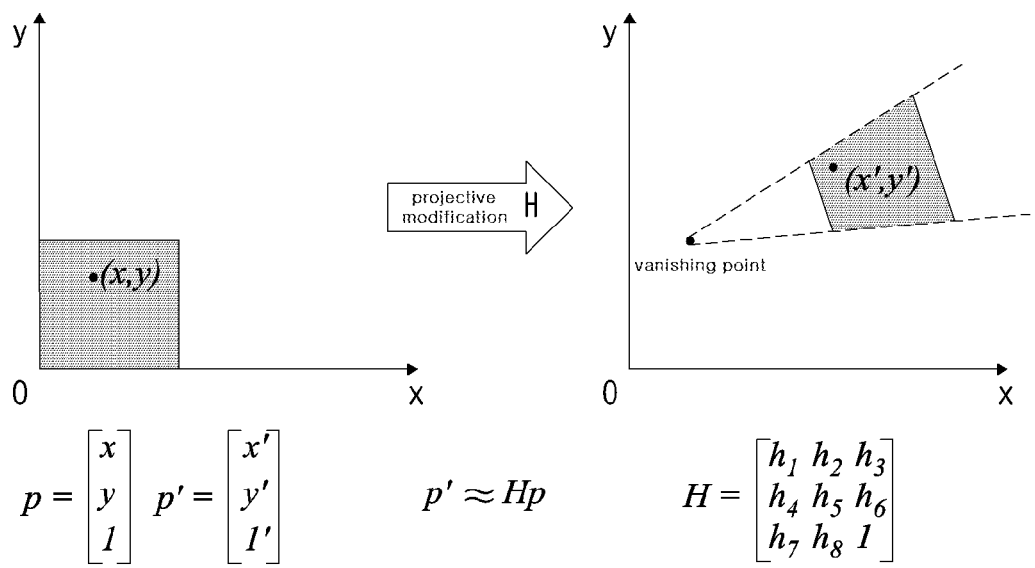
FIG. 46 is a diagram showing a projective modification of an embodiment of a geometrical modification of an image according to the present invention.

FIG. 46 is a diagram showing a projective modification of an embodiment of a geometrical modification of an image according to the present invention.

The projective modification may be an extended affine modification in which a perspective modification is added to the affine modification. When an object in a three-dimensional space is projected into a two-dimensional plane, a perspective modification may occur according to a viewing angle of a camera or an observer. In the perspective modification, objects far away are represented to be small and objects near are represented to be large.

In FIG. 46, a matrix H may be used for the projective modification. Elements h1 to h6 constituting the matrix H may correspond to the elements a1 to a6 constituting the matrix A for the affine modification of FIG. 45. Thereby, the projective modification may include the affine modification. Elements h7 and h8 constituting the matrix H may be elements related to the perspective modification.

A geometric modification of an image is a method for geometrically modifying the image to a specific form. A point within an image after a geometric modification that corresponds to a point within the image before the geometric modification may be calculated by a geometric modification defined in a matrix. On the contrary, a homography refers to a method of reversely deriving a mutual geometric modification matrix from two images respectively having points corresponding to each other.

Figure 47:
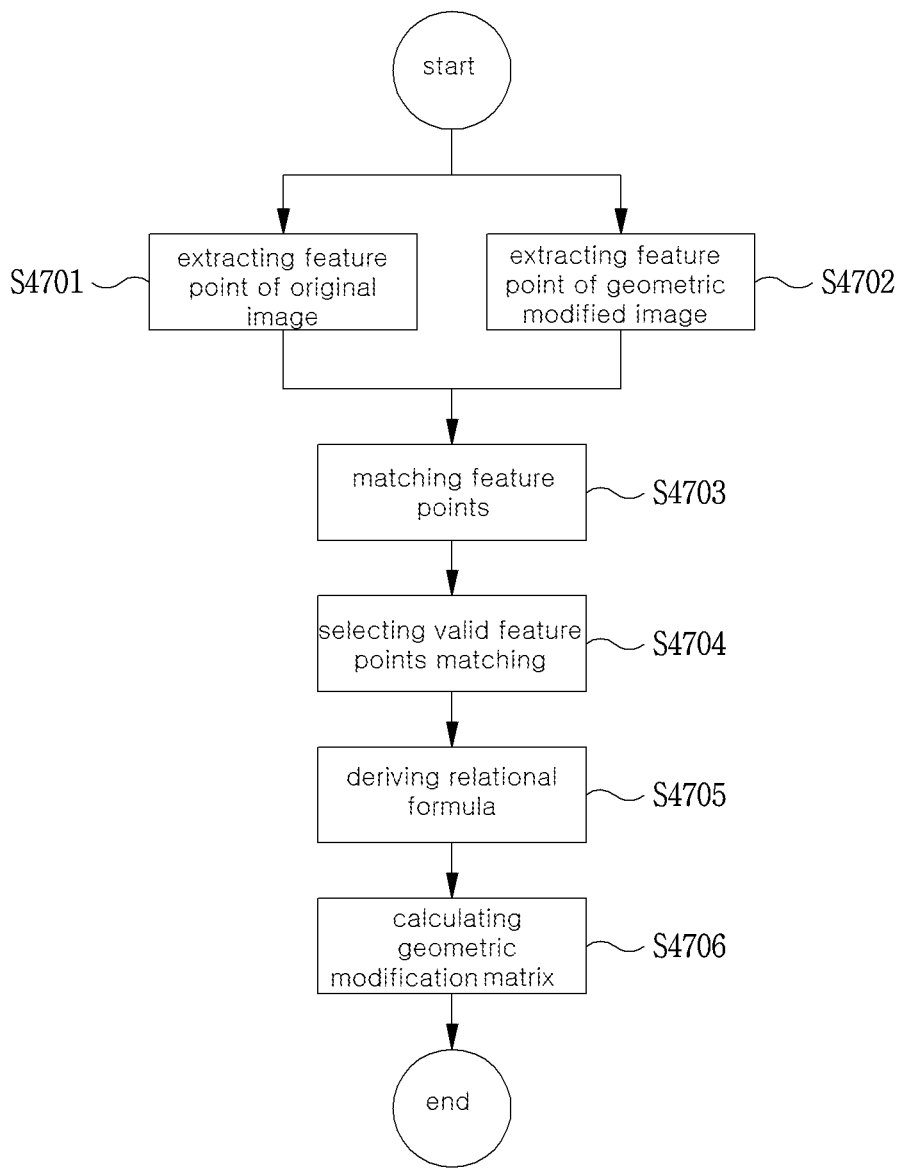
FIG. 47 is a diagram showing an example method of implementing a homography according to the present invention.

FIG. 47 is a diagram showing an example method of implementing a homography according to the present invention.

The homography may derive a geometric modification relation between two images based on an identification of two points within two images and correspond with each other. For this, a feature point matching may be used. A feature point of an image refers to a point that has a descriptive feature within the image.

In steps S4701 and S4702, the homography implementing method may extract feature points from an original image and a geometric modified image. A feature point of an image may be differently extracted according to an extracting method, or according to a usage purpose. A point within an image in which a luminance value thereof is dramatically changed, a center point of an area which has a specific shape, or a corner point of an object within the image may be used as the feature point. The feature point may be extracted by using algorithms such as scale-invariant feature transform (SIFT), speeded up robust feature (SURF), Blob Detection, etc.

In step S4703, the homography implementing method may match the feature point based on the feature points extracted from the original image and the geometric modified image. In detail, each of the extracted feature points are descriptive, the feature point between the two images may be matched by finding points having similar description information. The matched feature points may be used as a point in which the original image and the geometric modified image correspond with each other.

However, the feature point matching may not match points that actually correspond with each other. Therefore, in step S4704, a valid feature point among the derived feature points may be selected. The method of selecting the valid feature point may be varied according to a calculation algorithm. For example, methods such as a method of excluding a feature point that does not satisfy a baseline based on the description information, a method of excluding a feature point in which a coherency is very low through a distribution of matched results, or a method of using a random sample consensus (RANSAC) algorithm may be used. The homography implementing method may selectively perform the step S4704 according to a matching result of the feature points. In other words, the step S4704 may not be performed according to circumstances. Alternatively, the steps S4703 and S4704 may be merged. Alternatively, the homography implementing method may perform a matching process of a valid feature point instead of performing steps S4703 and S4704.

In step S4705, the homography implementing method may derive a relation formula between the original image and the geometric modified image by using the selected valid points. In step S4706, the homography implementing method may derive a geometric matrix by using the derived formula. Alternatively, the homography implementing method may not perform the step S4706, and output information of the derived formula obtained the step S4705 in a different form except for a geometric modification matrix.

FIG. 48 is an example method of deriving a relational formula between two points corresponding within two images according to the present invention.

A geometric modification of an image may be performed by a 3×3 matrix H. Therefore, simultaneous equations including elements h1 to h9 of the matrix H as unknown quantity may be derived from a matrix formula p'=Hp. Herein, p means a point within an original image, and p' means a point within a geometric modified image that corresponds to the point p. The equation may be simply calculated by fixing the h9 to 1 by dividing all elements of the matrix H into h9. Also, the number of unknown quantity may be reduced to 8 from 9.

Elements k1 to k8 of FIG. 48 correspond to values in which h1 to h8 is divided by h9. A geometric matrix in which h9 is changed in 1, and h1 to h8 are changed in k1 to k8, respectively, may perform an identical geometric modification. Therefore, 8 unknown values may be needed to be calculated. In FIG. 48, the final formula for one pair of points matching with each other in a single point may be expressed in two forms for x' and y'. At least 4 pairs of points matching with each other may be needed since there are 8 unknown values. However, the pair points may mismatch with each other as described above. Alternatively, the pair points may match with an error. Such an error may occur even when valid feature points are selected. Such an error may be reduced by using many pair points matching with each other while calculating the geometric modified matrix. Therefore, a number of the pair points that will be used may be determined considering such features.

FIG. 49 is a diagram showing a method of generating a geometrically modified image based on a geometric modification matrix and an original image according to the present invention.

As shown in FIG. 49, generation of a geometric modified image may correspond to a generation of light information of a corresponding point within the geometric modified image by using light information of a point within an original image. (x0, y0), (x1, y1), and (x2, y2) of FIG. 49 refer to different points within the original image. In addition, (x'0, y'0), (x'1, y'1), and (x'2, y'2) are points within the geometric modified image that respectively correspond to (x0, y0), (x1, y1), and (x2, y2). A function f calculates a corresponding x' coordinate of an x-axis within the geometric modified image by using the point (x, y) within the original image and additional information a that is used for the geometric modification. A function g calculates a corresponding y' coordinate of a y-axis within the geometric modified image by using the point (x, y) within the original image and additional information β that is used for the geometric modification. When (x, y), (x', y'), function f, and function g are expressed in a matrix formula, a matrix H may refer to a geometric modification method. Therefore, points that mutually correspond to each other within the original image and the geometric modified image may be found by using the matrix H.

The geometric modification method of FIG. 49 may be problematic in a discrete sample image signal, since light information is only included in points having an integer number coordinate of the discrete image signal. Therefore, when a point within the geometric modified image and corresponding to a point within the original image has a real number coordinate, light information of the closest integer number coordinate is assigned to the point within the geometric modified image. Thus, light information may be overlapped to a part of points having a real number coordinate within the geometric modified image or the light information may not be assigned. In this case, inverse mapping may be used.

Figure 50:
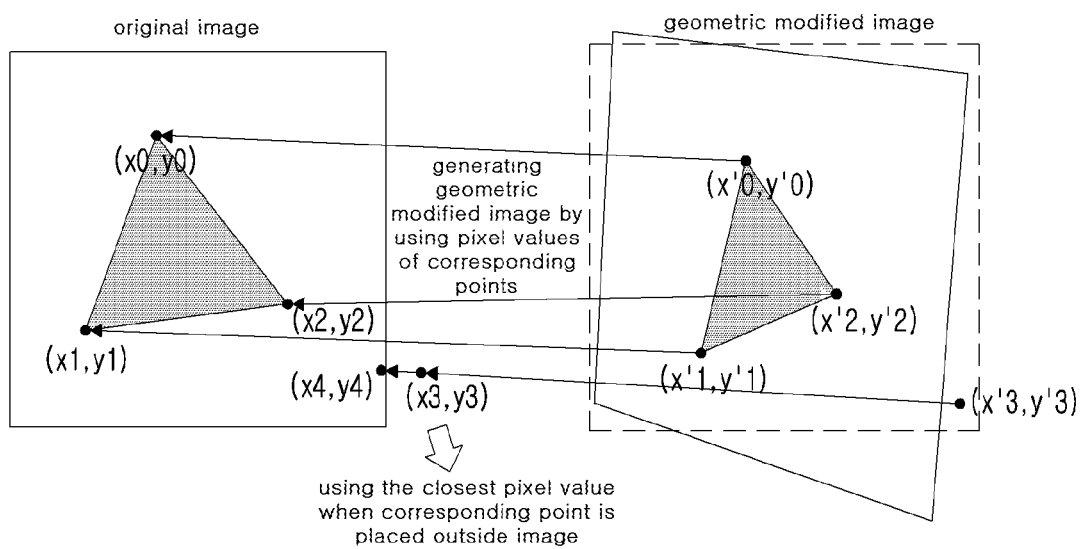
FIG. 50 is a diagram showing a method of generating a geometrically modified image by using inverse mapping according to the present invention.

FIG. 50 is a diagram showing a method of generating a geometrically modified image by using inverse mapping according to the present invention.

A dotted rectangular area of FIG. 50 refers to an area that is actually observed. Points within an original image corresponding to each point within the dotted rectangular area may be derived. Therefore, light information of the original image may be assigned to all points within the geometric modified image. However, a point (x3, y3) corresponding to (x'3, y'3) may place outside of the original image. In this case, light information of the original image may not be assigned to the point (x'3, y'3). In points where light information of the original image is not assigned, neighboring light information of the original image may be assigned. In other words, light information of the closest point within the original image, for example, (x4, y4), may be assigned.

Figure 51:
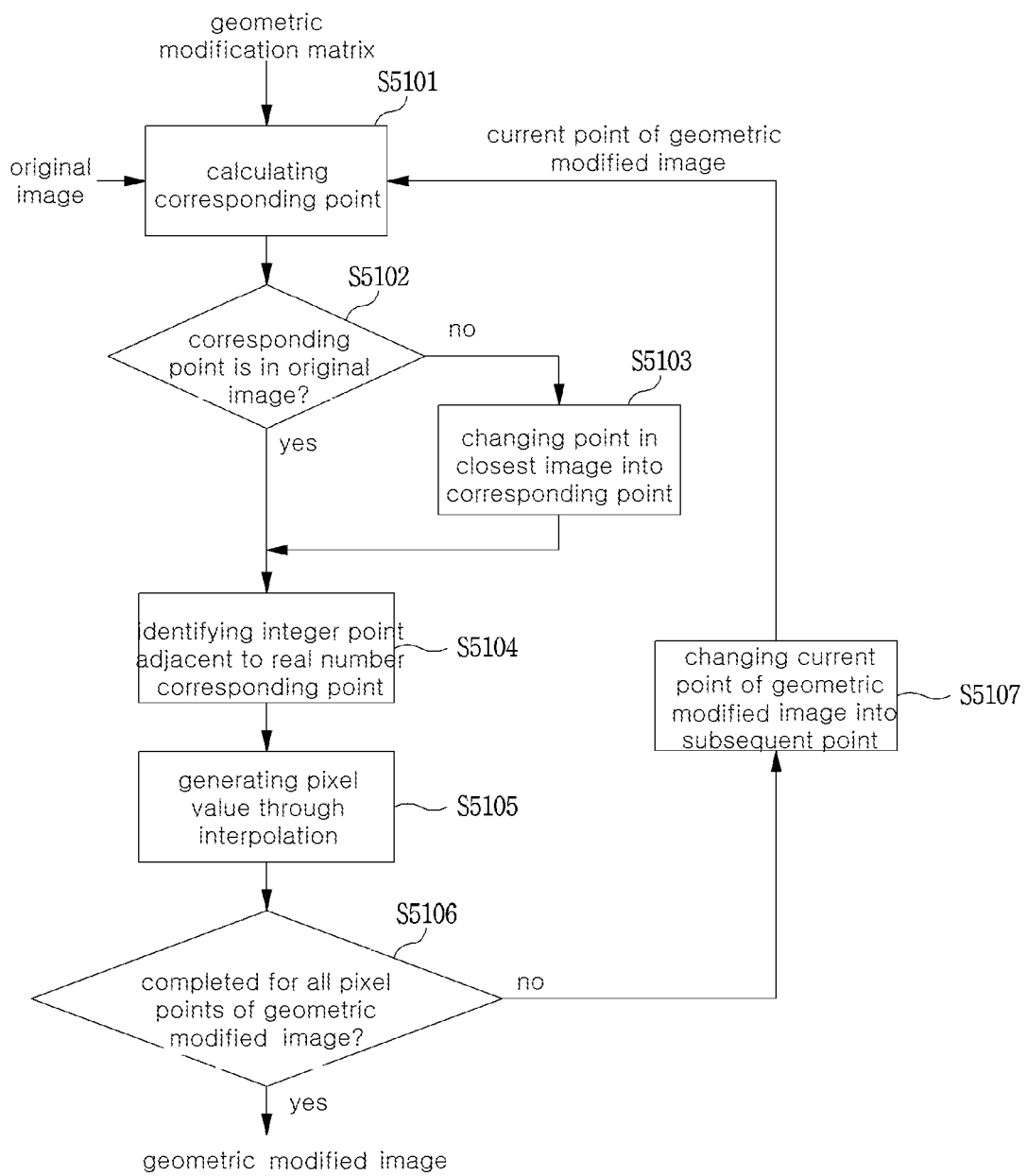
FIG. 51 is a diagram showing a method of generating a geometric modified image based on a geometric modification matrix and an original image according to the present invention

FIG. 51 is a diagram showing a method of generating a geometric modified image based on a geometric modification matrix and an original image according to the present invention wherein the geometric modification matrix may correspond to geometric modification information.

In step S5101, the generation method may receive input an original image, a geometric modification matrix and/or information on the current point of a geometric modified image. The generation method may calculate a point of the original image corresponding to the current point of the geometric modified image by using the original image and the geometric modified matrix. The calculated corresponding point of the original image may be a real number corresponding point having a real number coordinate.

In step S5102, the generation method may determine whether or not the calculated corresponding point is placed inside the original image.

In step S5102, when the calculated corresponding point is not placed inside the original image, in step S5103, the generation method may change the point closest to the calculated corresponding point within the original image with the corresponding point.

In step S5102, when the calculated corresponding point is placed inside the original image, the generation method may perform step S5104. The generation method may perform the step S5104 when the calculated corresponding point is changed in step S5103.

In step S5104, when the corresponding point has a real number coordinate, the generation method may identify a closest point having an integer number coordinate. When the corresponding point has an integer number coordinate, the generation method may skip steps S5104 and S5105, and perform step S5106.

In step S5105, the generation method may generate light information of the point having a real number coordinate by interpolating light information of the identified point having an integer number coordinate (for example, a pixel value). As methods of interpolating, Lanczos interpolation, S-Spline interpolation, Bicubic interpolation may be used.

In step S5106, the generation method may check all points within the geometric modified image whether or not the geometric modifications thereof are completed. Then, the generation method may finally output the generated geometric modified image.

When it is determined that the geometric modifications are not completed in step S5106, in step S5107, the generation method may change a current point of the geometric modified image to another point, and may repeat steps S5101 to S5106.

Figure 52:
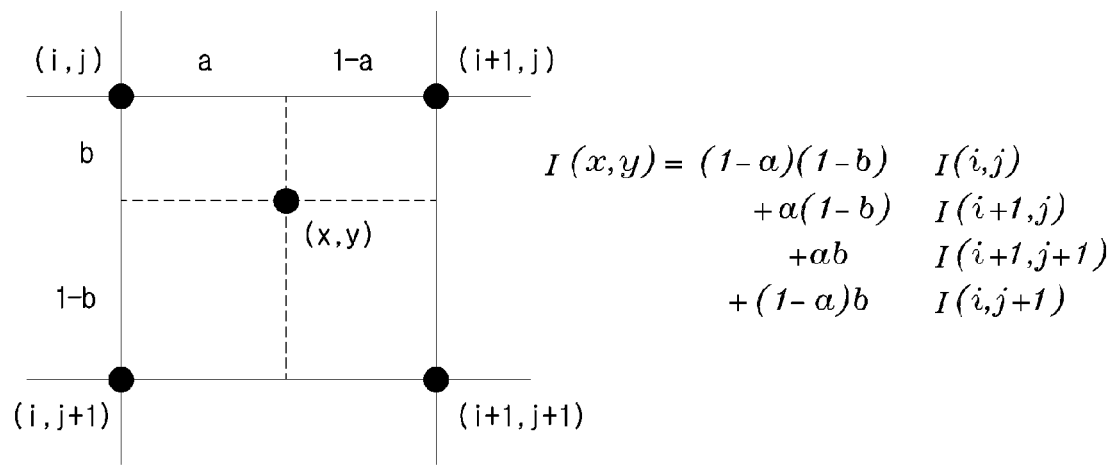
FIG. 52 is a diagram showing a bilinear interpolation among various interpolation methods explained with reference to FIG. 51 according to an embodiment the present invention.

FIG. 52 is a diagram showing a bilinear interpolation among various interpolation methods explained with reference to FIG. 51 according to an embodiment the present invention.

In FIG. 52, a real number coordinate (x, y) may correspond to the real number corresponding point mentioned in step S5104 of FIG. 51. 4 points (i,j), (i,j+1), (i+1,j), and (i+1,j+1) that are adjacent to the coordinate (x, y) may correspond to the closest point having an integer number coordinate that is mentioned in step S5104 of FIG. 51. I(x,y) may refer to light information of the point (x,y) such as luminance. a refers to an x-axis distance between i and x, and b refers to a y-axis distance between j and y. 1−a refers to an x-axis distance between i+1 and x, and 1−b refers to a y-axis distance between j+1 and y. Light information of the point (x, y) may be calculated from light information of points (i, j), (i, j+1), (i+1, j), and (i+1, j+1) by using a ratio of a to 1−a in the x-axis, and a ratio of b to 1−b in the y-axis.

After generating a sample value of a point of the geometric modified image thorough the interpolation method, the same process is repeated for other points of the geometric modified image. The generation of the geometric modified image is completed when sample values for all points of the geometric modified image are generated.

The above embodiments may be performed in the same method in an encoder and a decoder.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type to which the above embodiments of the present invention are applied may be defined, and the above embodiments may be applied depending on the corresponding slice type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in encoding/decoding an image.

The invention claimed is:

1. An image encoding method performed by an image encoding apparatus, the method comprising:
generating a geometric transform matrix based on geometric transform information, the geometric transform information comprising at least one of transfer modification information, size modification information and rotation modification information;
determining a prediction mode of a current block;
determining a reference block of the current block from a reference picture based on reference points modified by the geometric transform matrix; and
predicting the current block by referring to the reference block,
wherein,
the generating the geometric transform matrix comprises:
when the geometric transform information comprises the transfer modification information, determining movement factors for the geometric transform matrix based on the transfer modification information, and
when the geometric transform information comprises the size modification information and the rotation modification information, determining zooming and rotation factors for the geometric transform matrix based on the size modification information and the rotation modification information.

2. An image encoding apparatus comprising an intra-prediction unit configured to:
generate a geometric transform matrix based on geometric transform information, the geometric transform information comprising at least one of transfer modification information, size modification information and rotation modification information;
determine a prediction mode of a current block;
determine a reference block of the current block from a reference picture based on reference points modified by the geometric transform matrix; and
predict the current block by referring to the reference block,
wherein,
the generating the geometric transform matrix comprises:
when the geometric transform information comprises the transfer modification information, determining movement factors for the geometric transform matrix based on the transfer modification information, and
when the geometric transform information comprises the size modification information and the rotation modification information, determining zooming and rotation factors for the geometric transform matrix based on the size modification information and the rotation modification information.

3. An image decoding method performed by an image decoding apparatus, the method comprising:
generating a geometric transform matrix based on geometric transform information, the geometric transform information comprising at least one of transfer modification information, size modification information and rotation modification information;
decoding a prediction mode of a current block;
determining a reference block of the current block from a reference picture based on reference points modified by the geometric transform matrix; and
predicting the current block by referring to the reference block,
wherein,
the generating the geometric transform matrix comprises:
when the geometric transform information comprises the transfer modification information, determining movement factors for the geometric transform matrix based on the transfer modification information, and
when the geometric transform information comprises the size modification information and the rotation modification information, determining zooming and rotation factors for the geometric transform matrix based on the size modification information and the rotation modification information.

4. An image decoding apparatus comprising an intra-prediction unit configured to;
generate a geometric transform matrix based on geometric transform information, the geometric transform information comprising at least one of transfer modification information, size modification information and rotation modification information;
decode a prediction mode of a current block;
determine a reference block of the current block from a reference picture based on reference points modified by the geometric transform matrix; and
predict the current block by referring to the reference block,
wherein,
the generating the geometric transform matrix comprises:
when the geometric transform information comprises the transfer modification information, determining movement factors for the geometric transform matrix based on the transfer modification information, and
when the geometric transform information comprises the size modification information and the rotation modification information, determining zooming and rotation factors for the geometric transform matrix based on the size modification information and the rotation modification information.

5. A non-transitory readable medium storing a bitstream formed by an image encoding method, the image encoding method including:
generating a geometric transform matrix based on geometric transform information, the geometric transform information comprising at least one of transfer modification information, size modification information and rotation modification information;
determining a prediction mode of a current block;
determining a reference block of the current block from a reference picture based on reference points modified by the geometric transform matrix; and
predicting the current block by referring to the reference block,
wherein,
the generating the geometric transform matrix comprises:
when the geometric transform information comprises the transfer modification information, determining movement factors for the geometric transform matrix based on the transfer modification information, and when the geometric transform information comprises the size modification information and the rotation modification information, determining zooming and rotation factors for the geometric transform matrix based on the size modification information and the rotation modification information.

\* \* \* \* \*